(12) United States Patent
Peterson et al.

(10) Patent No.: US 11,423,209 B2
(45) Date of Patent: Aug. 23, 2022

(54) DEVICE, METHOD, AND GRAPHICAL USER INTERFACE FOR CLASSIFYING AND POPULATING FIELDS OF ELECTRONIC FORMS

(71) Applicant: Apple Inc., Cupertino, CA (US)

(72) Inventors: Adele C. Peterson, Los Gatos, CA (US); Chelsea Elizabeth Pugh, San Francisco, CA (US); Conrad Aarne Schultz, San Jose, CA (US); Jessie Leah Berlin, San Jose, CA (US); Richard Mondello, Mountain View, CA (US); Steven Jon Falkenburg, Los Altos, CA (US); Zhuo Li, Santa Clara, CA (US); Patrick Lee Coffman, San Francisco, CA (US); Maureen Grace Daum, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/609,477

(22) Filed: May 31, 2017

(65) Prior Publication Data

US 2017/0357627 A1 Dec. 14, 2017

Related U.S. Application Data

(60) Provisional application No. 62/348,787, filed on Jun. 10, 2016.

(51) Int. Cl.
*G06F 40/14* (2020.01)
*G06F 7/02* (2006.01)
*G06F 3/0488* (2022.01)
*G06F 40/174* (2020.01)

(52) U.S. Cl.
CPC ............ *G06F 40/14* (2020.01); *G06F 3/0488* (2013.01); *G06F 7/023* (2013.01); *G06F 40/174* (2020.01)

(58) Field of Classification Search
CPC .. G06F 17/2247; G06F 17/243; G06F 3/0488; G06F 7/023
See application file for complete search history.

(56) References Cited

U.S. PATENT DOCUMENTS 9,465,786 B2 * 10/2016 Lurey .................. G06F 40/174
2003/0028792 A1 * 2/2003 Plow ..................... G06Q 30/02
713/193

(Continued)

*Primary Examiner* — Stephen S Hong
*Assistant Examiner* — Nicholas Hasty
(74) *Attorney, Agent, or Firm* — Fernando & Partners, LLP

(57) ABSTRACT

An electronic device: displays an electronic form with a plurality of fields; detects an autofill input that corresponds to a field of the plurality of fields in the electronic form; and in response to detecting the autofill input, updates the electronic form to display fields that have been populated based on a user profile. If the autofill input is associated with a first category of information in the user profile, updating the electronic form includes populating at least two of the plurality of fields using information from the user profile that corresponds to the first category of information. If the autofill input is associated with a second category of information in the user profile, updating the electronic form includes populating at least two of the plurality of fields using information from the user profile that corresponds to the second category of information.

30 Claims, 76 Drawing Sheets

(56) References Cited

U.S. PATENT DOCUMENTS

| | | | |
|---|---|---|---|
| 2005/0257148 A1* | 11/2005 | Goodman | G06F 17/243 715/226 |
| 2008/0066020 A1* | 3/2008 | Boss | G06F 16/2457 715/780 |
| 2009/0006940 A1* | 1/2009 | Hardt | G06F 40/174 715/224 |
| 2014/0258828 A1* | 9/2014 | Lymer | G06F 17/243 715/224 |
| 2015/0205776 A1* | 7/2015 | Bhatia | G06F 17/243 715/226 |
| 2017/0262421 A1* | 9/2017 | Yue | H04L 63/00 |
| 2018/0260085 A1* | 9/2018 | Whitelaw | G06F 40/174 |

* cited by examiner

1000

1002 At a device with one or more processors, non-transitory memory, a display, and an input device:

Display, on the display, an electronic form having a text input field populated with a first text string from a first user profile based on a classification of the text input field associated with an autofill process, where the classification classifies the text input field as accepting a first type of information, and selection of the first text string is based at least in part on the classification

1004 The autofill process includes:

Determining the classification for the text input field; and

Populating the text input field with the first text string based on the classification of the text input field, wherein the first text string corresponds to the first type of information from the first user profile

1006 Determining the classification for the text input field includes generating an initial classification for the text input field based at least in part on a content-based heuristic

1008 Determining the classification for the text input field includes generating an initial classification for the text input field based at least in part on a first classification determined based on a previous user amendment of the text input field by a user of the device

1010 Determining the classification for the text input field includes generating an initial classification for the text input field based at least in part on a second classification determined based on aggregate amendments of the text input field by other users

1012 The first and second classifications supersede a classification generated by the content-based heuristic, and the first classification supersedes the second classification

1014 Obtain at least one aggregate amendment associated with a different classification for the text input field from the remote server, where the at least one crowd-sourced user amendment satisfies a frequency threshold

Figure 10A

DEVICE, METHOD, AND GRAPHICAL USER INTERFACE FOR CLASSIFYING AND POPULATING FIELDS OF ELECTRONIC FORMS

CROSS-REFERENCE TO RELATED-APPLICATIONS

This application claims the benefit of U.S. Provisional Patent App. No. 62/348,787, filed on Jun. 10, 2016, which is incorporated by reference in its entirety.

TECHNICAL FIELD

This relates generally to electronic devices with displays and input devices, including but not limited to electronic devices with displays and input devices that classify and populate fields of electronic forms.

BACKGROUND

The use of touch-sensitive surfaces as input devices for computers and other electronic computing devices has increased significantly in recent years. Examples of touch-sensitive surfaces include touch pads and touch screen displays. Such surfaces are widely used to manipulate user interface objects on a display.

Some examples of actions involving management of the displays of other devices include displaying a particular content item, launching a particular application, and locking the displays of the other devices, enabled with one or more user interface objects or by manipulating user interfaces. Examples of user interface objects include digital images, video, text, icons, control elements such as buttons and other graphics. A user will, in some circumstances, need to perform such actions enabling management of the displays of other devices in association with a file management program (e.g., Finder from Apple Inc. of Cupertino, Calif.), an image management application (e.g., Aperture or iPhoto from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

Computing devices are increasingly used in group settings to access and share content (e.g., webpages, textbooks, images). However, in some circumstances users are unfamiliar with navigating electronic devices and/or not paying attention when instructions for navigating to content on a device are provided. This can make it more difficult to use computing devices to share content rather than simply using a common text book or shared display.

SUMMARY

Accordingly, there is a need for electronic devices with faster, more efficient methods and interfaces for classifying and populating fields of electronic forms. Such methods and interfaces optionally complement or replace conventional methods for classifying and populating fields of electronic forms. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at a device with one or more processors, non-transitory memory, a display, and an input device. The method includes: displaying, on the display, an electronic form having a text input field populated with a first text string from a first user profile based on a classification of the text input field associated with an autofill process, where the classification classifies the text input field as accepting a first type of information, and selection of the first text string is based at least in part on the classification; receiving, by the input device, an input that corresponds to a change to at least a portion of the first text string; in response to receiving the input, changing the first text string to a second text string; and in accordance with a determination that the second text string is characterized by a second type of information that is different from the first type of information, changing the classification of the text input field.

In accordance with some embodiments, a method is performed at a device with one or more processors, non-transitory memory, a display, and an input device. The method includes: displaying, on the display, an electronic form with a plurality of fields; while displaying the electronic form with the plurality of fields on the display, detecting, by the input device, a first autofill input that corresponds to a first field of the plurality of fields in the electronic form; and in response to detecting the first autofill input, updating the electronic form to display, on the display, fields that have been populated based on a first user profile, where: in accordance with a determination that the first autofill input is associated with a first category of information in the first user profile, updating the electronic form includes populating at least two of the plurality of fields using information from the first user profile that corresponds to the first category of information, and in accordance with a determination that the first autofill input is associated with a second category of information in the first user profile, updating the electronic form includes populating at least two of the plurality of fields using information from the first user profile that corresponds to the second category of information.

In accordance with some embodiments, an electronic device includes: a display unit configured to display a user interface; one or more input units configured to receive contacts; and a processing unit coupled with the display unit and the one or more input units. The processing unit is configured to: enable display of an electronic form on the display unit having a text input field populated with a first text string from a first user profile based on a classification of the text input field associated with an autofill process, where the classification classifies the text input field as accepting a first type of information, and selection of the first text string is based at least in part on the classification; receive an input by the one of more input units that corresponds to a change to at least a portion of the first text string; in response to receiving the input, change the first text string to a second text string; and in accordance with a determination that the second text string is characterized by a second type of information that is different from the first type of information, change the classification of the text input field.

In accordance with some embodiments, an electronic device includes: a display unit configured to display a user interface; one or more input units configured to receive contacts; and a processing unit coupled with the display unit and the one or more input units. The processing unit is configured to: enable display of an electronic form with a plurality of fields on the display unit; while displaying the electronic form with the plurality of fields on the display unit, detect a first autofill input by the one or more input unit that corresponds to a first field of the plurality of fields in the electronic form; and in response to detecting the first autofill input, update the electronic form to display fields that have been populated based on a first user profile on the display unit, where: in accordance with a determination that the first autofill input is associated with a first category of information in the first user profile, updating the electronic form includes populating at least two of the plurality of fields using information from the first user profile that corresponds to the first category of information, and in accordance with a determination that the first autofill input is associated with a second category of information in the first user profile, updating the electronic form includes populating at least two of the plurality of fields using information from the first user profile that corresponds to the second category of information.

In accordance with some embodiments, an electronic device includes a display, an input device, one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which, when executed by an electronic device with a display and an input device, cause the electronic device to perform or cause performance of the operations of any of the methods described herein. In accordance with some embodiments, a graphical user interface on an electronic device with a display, an input device, a non-transitory memory, and one or more processors to execute one or more programs stored in the non-transitory memory includes one or more of the elements displayed in any of the methods described above, which are updated in response to inputs, as described in any of the methods described herein. In accordance with some embodiments, an electronic device includes: a display, an input device, and means for performing or causing performance of the operations of any of the methods described herein. In accordance with some embodiments, an information processing apparatus, for use in an electronic device with a display and an input device, includes means for performing or causing performance of the operations of any of the methods described herein.

Thus, electronic devices with displays, touch-sensitive surfaces and optionally one or more sensors to detect intensity of contacts with the touch-sensitive surface are provided with faster, more efficient methods and interfaces for classifying and populating fields of electronic forms, thereby increasing the effectiveness, efficiency, and user satisfaction with such devices. Such methods and interfaces may complement or replace conventional methods for classifying and populating fields of electronic forms.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 10A-10C illustrate a flow diagram of a method of changing a classification for a field in an electronic form in accordance with some embodiments.

DESCRIPTION OF EMBODIMENTS

Figure 1A:
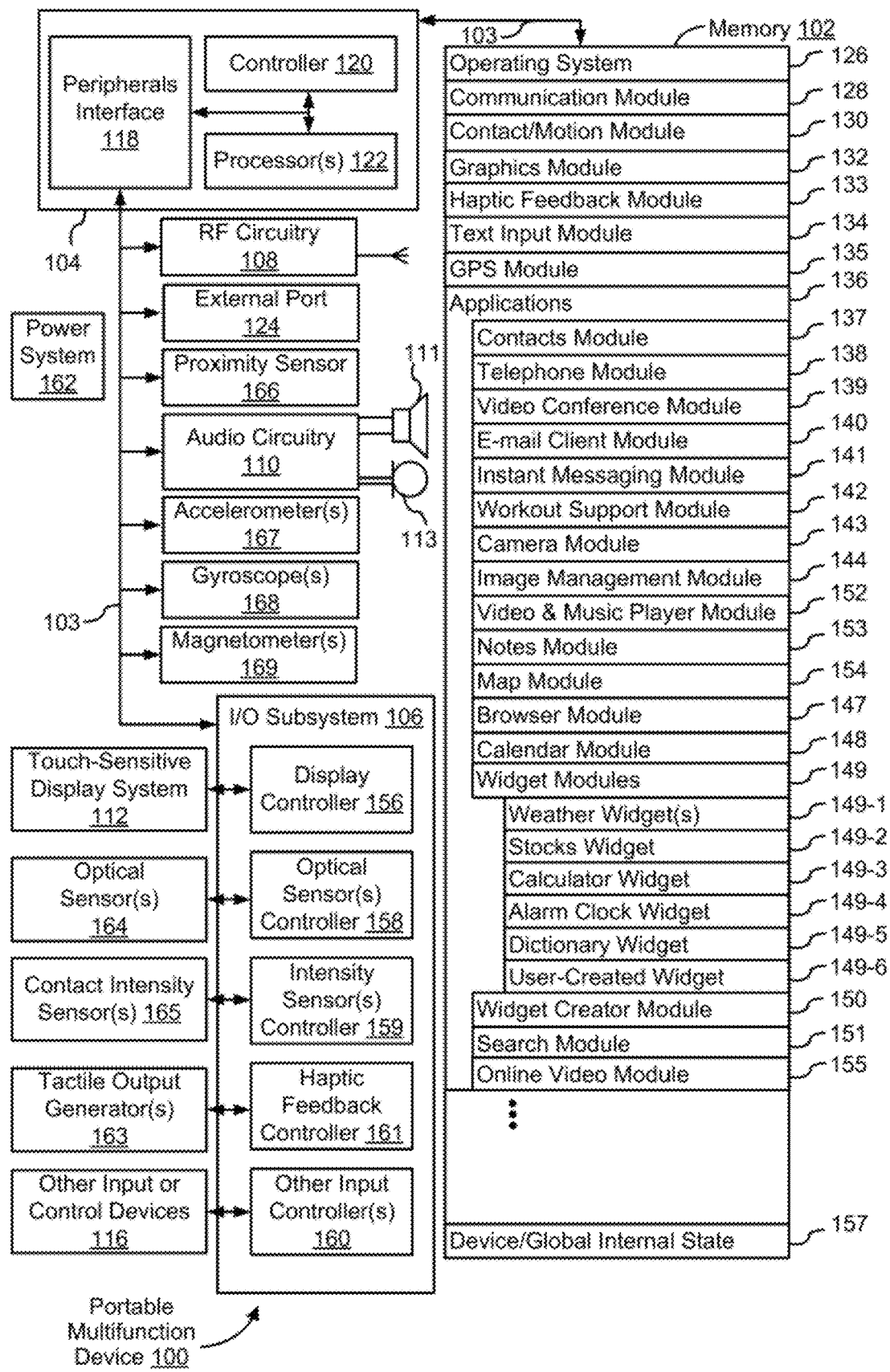
FIG. 1A is a block diagram illustrating a portable multifunction device with a touch-sensitive display in accordance with some embodiments.

The use of electronic devices with touch-based user interfaces (e.g., devices such as the iPhone®, iPod Touch®, iPad®, MacBook®, and iMac® devices from Apple Inc. of Cupertino, Calif.) has increased significantly in recent years. These devices use touch-sensitive surfaces, such as a touch screen display or a touch pad, as the main input for manipulating user interface objects on a display and/or controlling the device. These devices may also have contact intensity sensor for determining a force or pressure of contacts with the touch-sensitive surfaces.

Described below are devices and methods that enable an autofill process to learn from user amendments/corrections to text strings in fields of an electronic form that were populated by the autofill process. In some embodiments, a change is made to the classifications for the fields based on the user amendments/corrections. The autofill process does not store or remember the text string that the user previously entered as part of the amendment/correction. Instead, for subsequent visits to the electronic form that includes the text input field, the autofill process correctly populates the fields based on the changed classifications.

Described below are devices and methods that enable a user to populate fields of an electronic form. In some embodiments, selection of one of a plurality of autofill profile affordances associated with different categories of information from a user profile (e.g., custom, home, and work data sets) causes population of at least some of a plurality of fields in an electronic form. In some embodiments, one of the plurality of autofill profile affordances corresponds to a data set associated with a third party contact. As such, the user is able to choose between multiple user-specific and third party data sets for populating fields of the electronic form.

Below, FIGS. 1A-1B, 2-3, and 4A-4B provide a description of example devices. FIGS. 5A-5V illustrate example user interfaces for amendments to fields populated by an autofill process. FIGS. 8A-8W and 9A-9N illustrate example user interfaces for populating fields of an electronic form. FIGS. 10A-10C illustrate a flow diagram of a method of changing a classification for a field in an electronic form. FIGS. 11A-11D illustrate a flow diagram of a method of populating fields of an electronic form. The user interfaces in FIGS. 5A-5V are used to illustrate the processes in FIGS. 10A-10C. The user interfaces in FIGS. 8A-8W and 9A-9N are used to illustrate the processes in FIGS. 11A-11D.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver (not shown) for obtaining information concerning the location of device 100.

Figure 3:
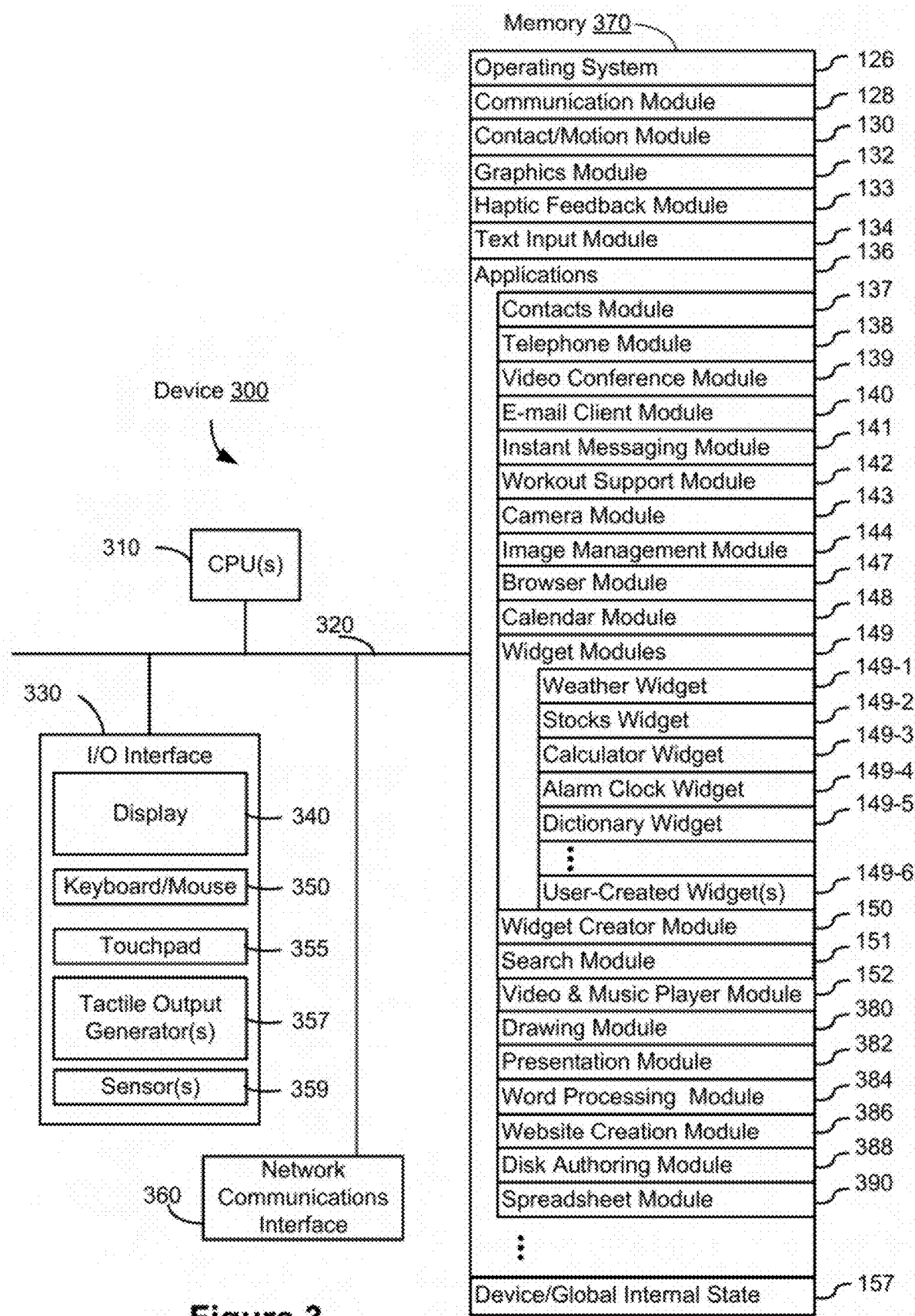
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 163 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
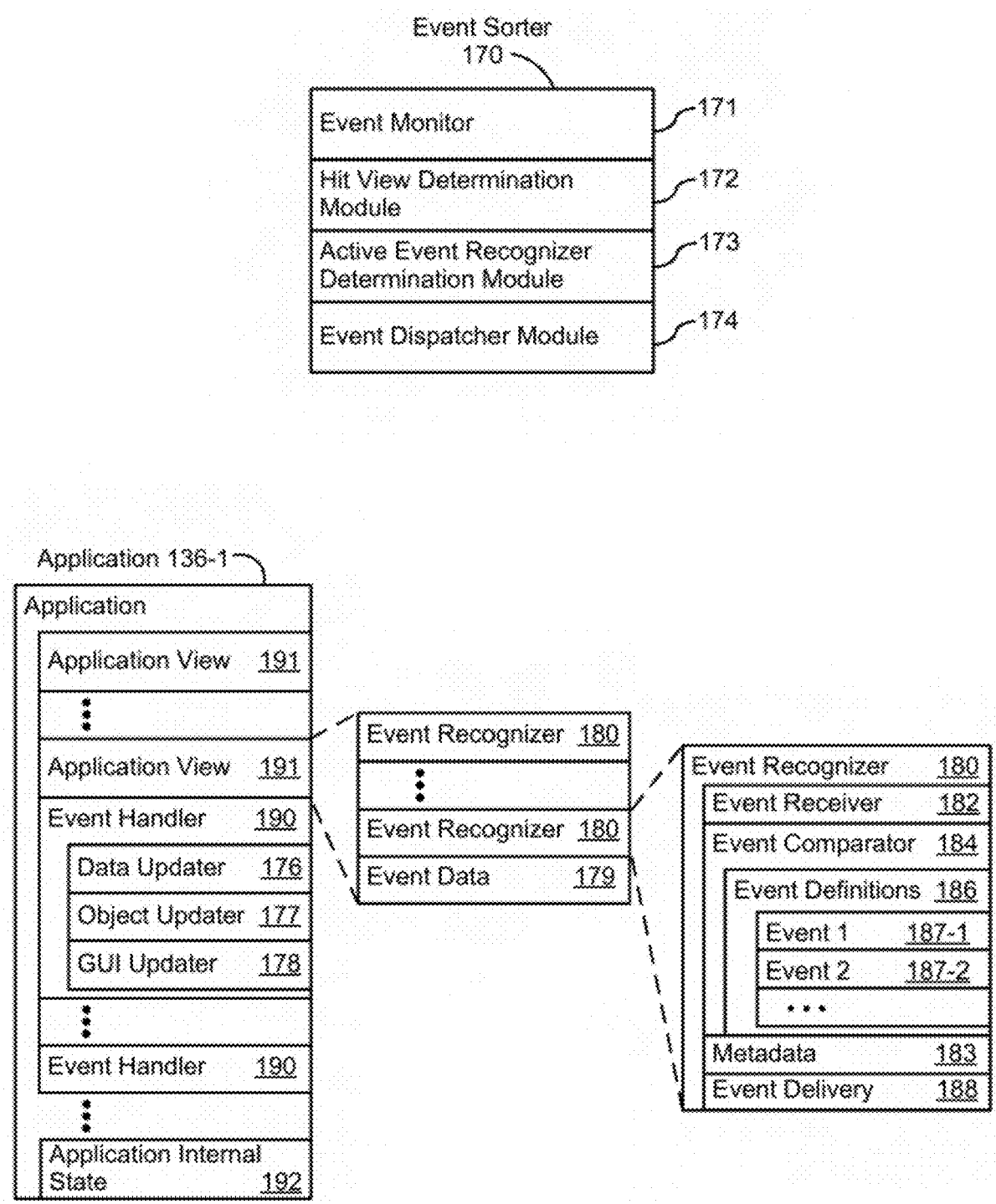
FIG. 1B is a block diagram illustrating exemplary components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
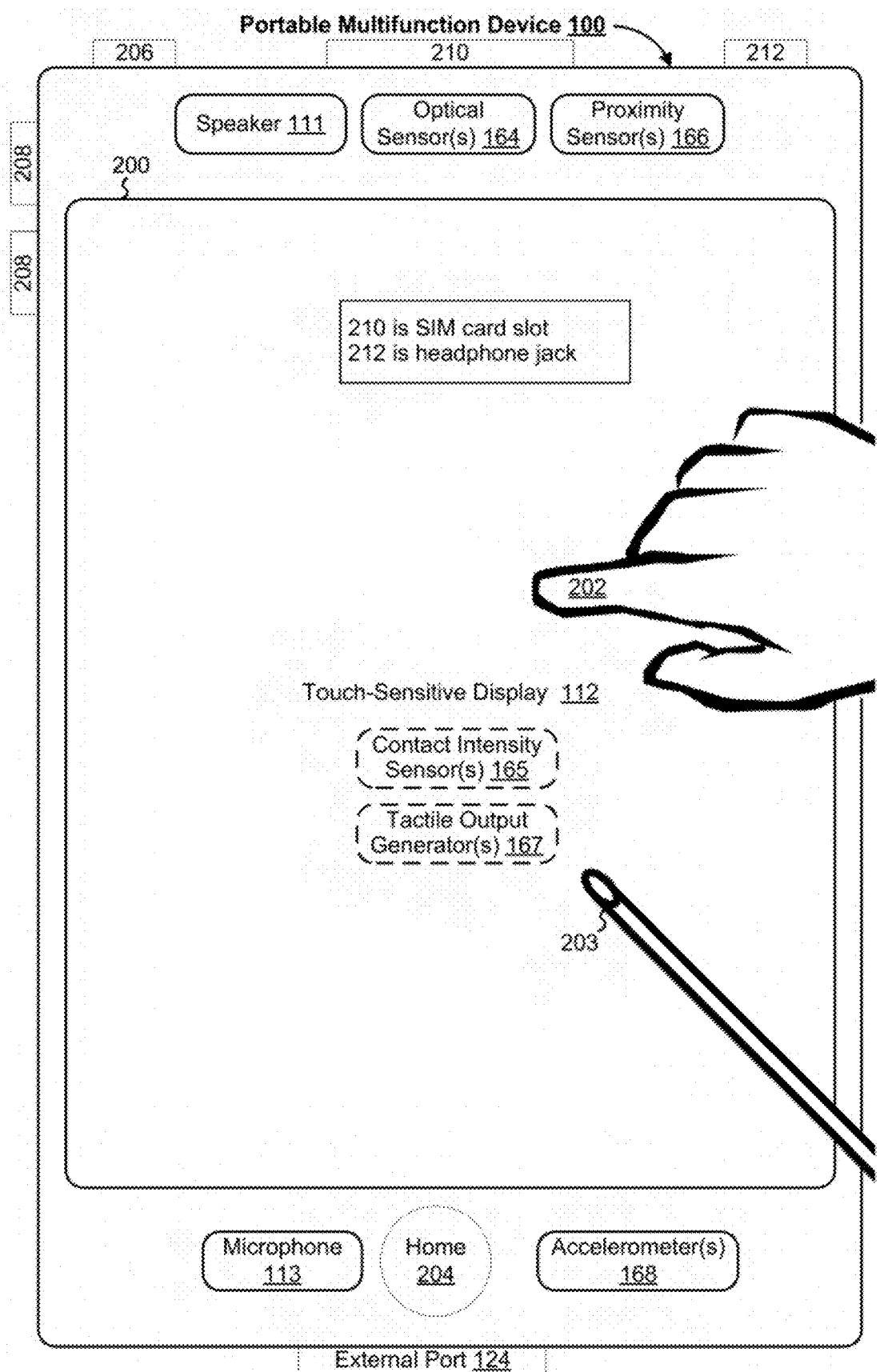
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
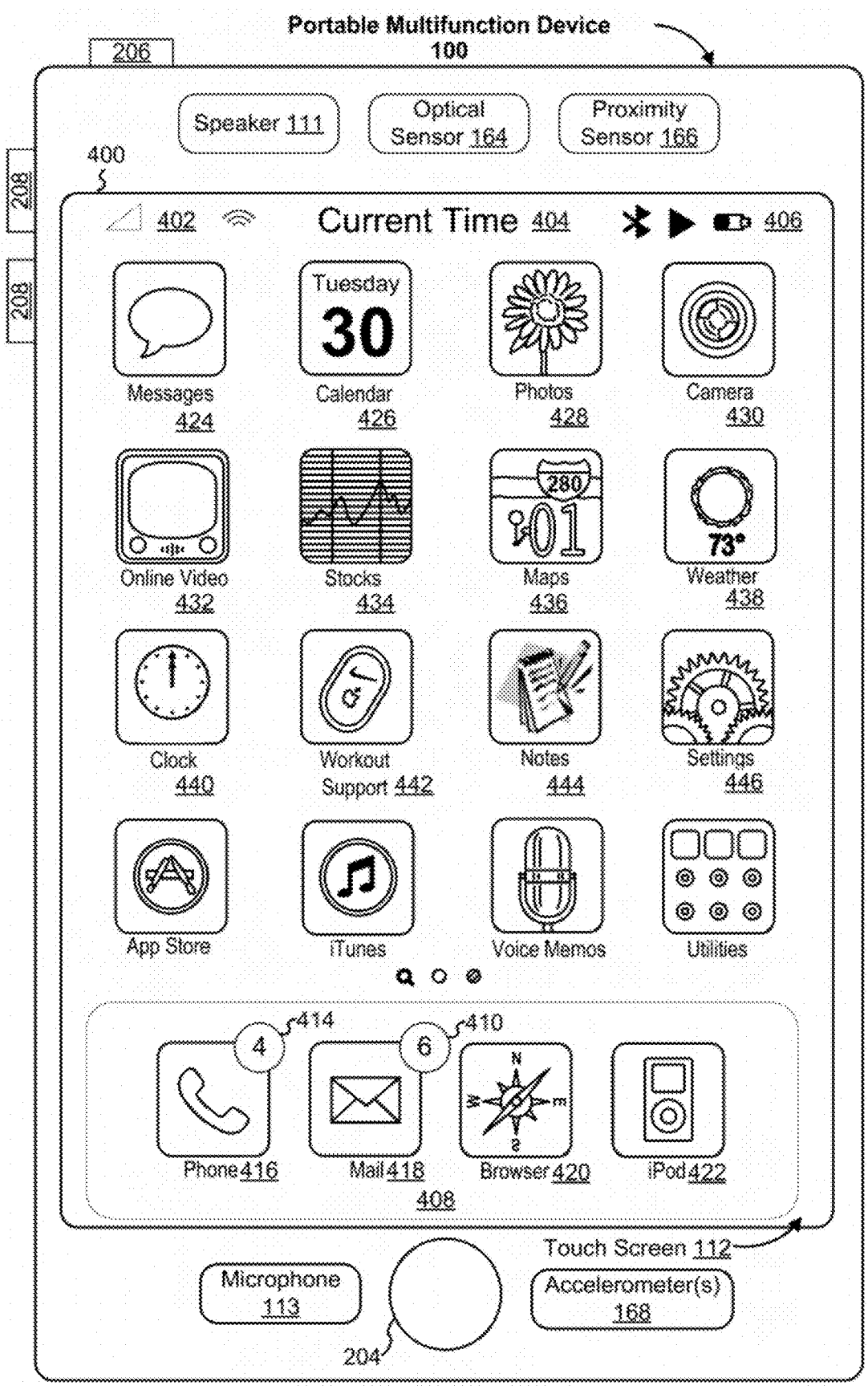
FIG. 4A illustrates an example user interface for a menu of applications on a portable multifunction device in accordance with some embodiments.
Figure 5A:
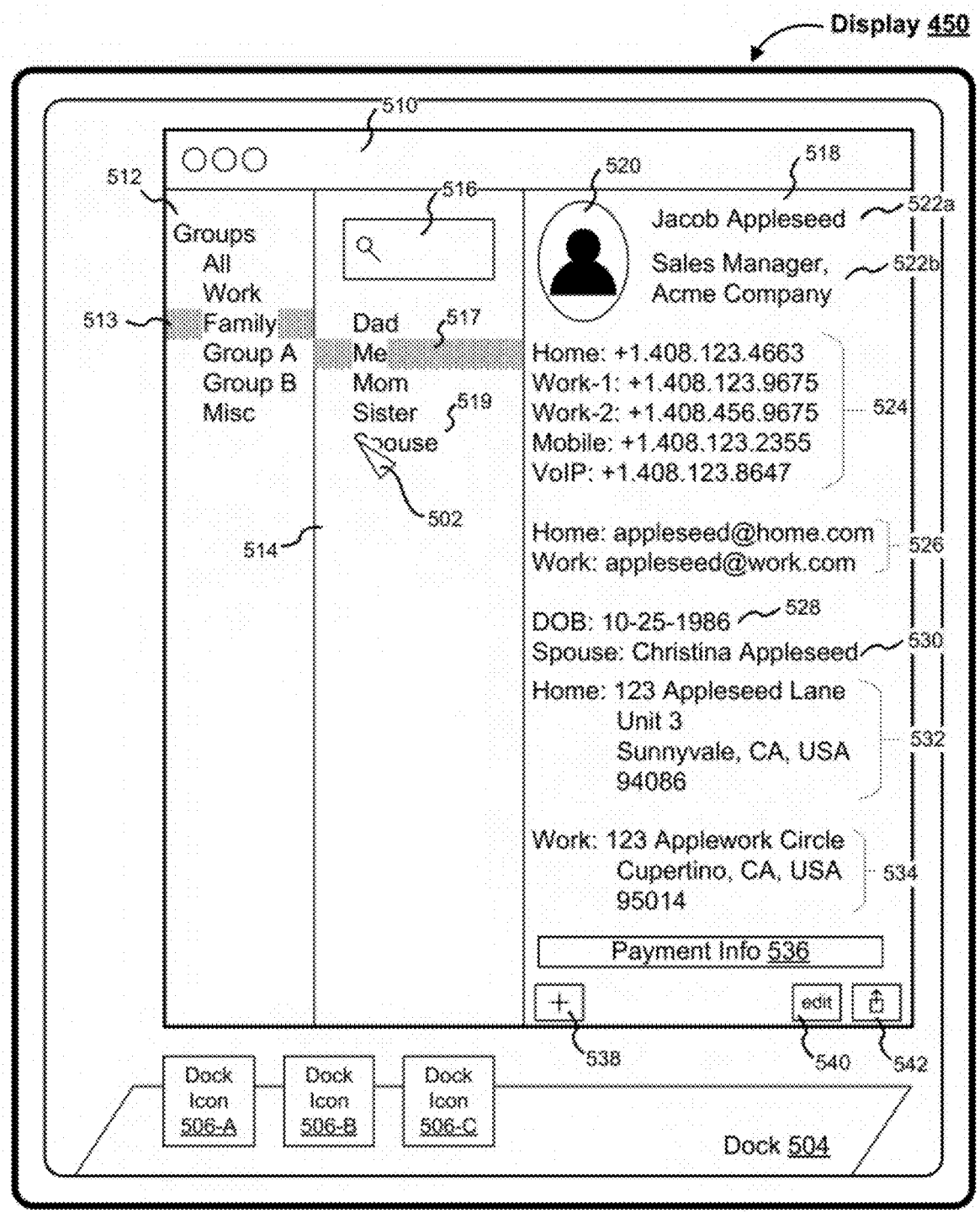
FIGS. 5A-5V illustrate example user interfaces for amendments to fields populated by an autofill process in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser"; and
  Icon 422 for video and music player module 152, also referred to as iPod (trademark of Apple Inc.) module 152, labeled "iPod"; and
Icons for other applications, such as:
  Icon 424 for IM module 141, labeled "Text";
  Icon 426 for calendar module 148, labeled "Calendar";
  Icon 428 for image management module 144, labeled "Photos";
  Icon 430 for camera module 143, labeled "Camera";
  Icon 432 for online video module 155, labeled "Online Video";
  Icon 434 for stocks widget 149-2, labeled "Stocks";
  Icon 436 for map module 154, labeled "Map";
  Icon 438 for weather widget 149-1, labeled "Weather";
  Icon 440 for alarm clock widget 169-6, labeled "Clock";
  Icon 442 for workout support module 142, labeled "Workout Support";
  Icon 444 for notes module 153, labeled "Notes"; and
  Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
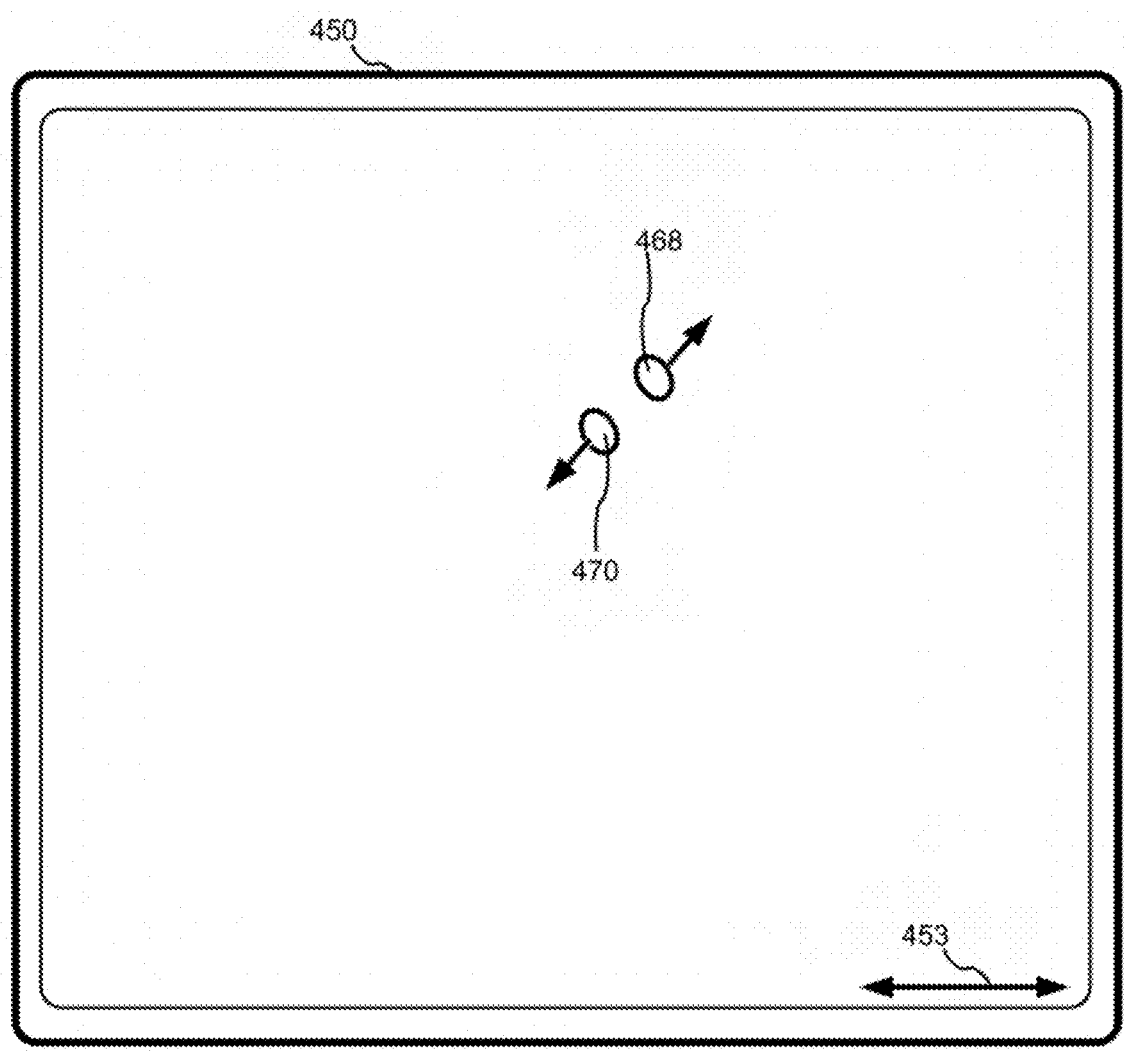
FIG. 4B illustrates an example user interface for a multifunction device with a touch-sensitive surface that is separate from the display in accordance with some embodiments.
Figure 4B:
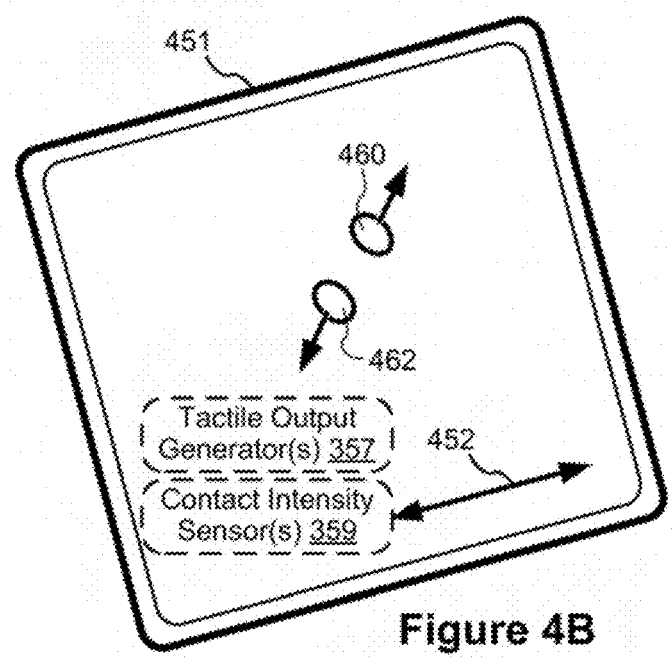

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 359) for detecting intensity of contacts on touch-sensitive surface 451 and/or one or more tactile output generators 359 for generating tactile outputs for a user of device 300.

FIG. 4B illustrates an example user interface on a device (e.g., device 300, FIG. 3) with a touch-sensitive surface 451 (e.g., a tablet or touchpad 355, FIG. 3) that is separate from the display 450. Many of the examples that follow will be given with reference to a device that detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 46B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

User Interfaces and Associated Processes

Attention is now directed toward embodiments of user interfaces ("UI") and associated processes that may be implemented on an electronic device, such as a portable multifunction device 100 with a display, a touch-sensitive surface, and optionally one or more sensors to detect intensity of contacts with the touch-sensitive surface, or a device 300 with a one or more processors, non-transitory memory, a display, and an input device.

FIGS. 5A-5V illustrate example user interfaces for amendments to fields populated by an autofill process in accordance with some embodiments. The user interfaces in these figures are used to illustrate the processes described below, including the processes in FIGS. 6 and 10A-10C. Although some of the examples which follow will be given with reference to inputs on a touch-sensitive surface 451 that is separate from the display 450 that control a focus selector 502, in some embodiments, the device detects inputs on a touch-screen display (where the touch-sensitive surface and the display are combined), as shown in FIG. 4A.

As shown in FIGS. 5A-5V, a device (e.g., device 300, FIG. 3) displays a user interface with a plurality of user-interface elements and a focus selector 502 on display 450. In some embodiments, focus selector 502 (sometimes also referred to as a "cursor") is controlled by a separate input device such as a mouse, stylus, motion sensing input device, speech command processing device, touchpad (e.g., the touch-sensitive surface 451 in FIG. 4B), or the like. In some embodiments, the user interface includes a dock 504 with a plurality of dock icons 506-A, 506-B, and 506-C corresponding to different applications.

Figure 5B:
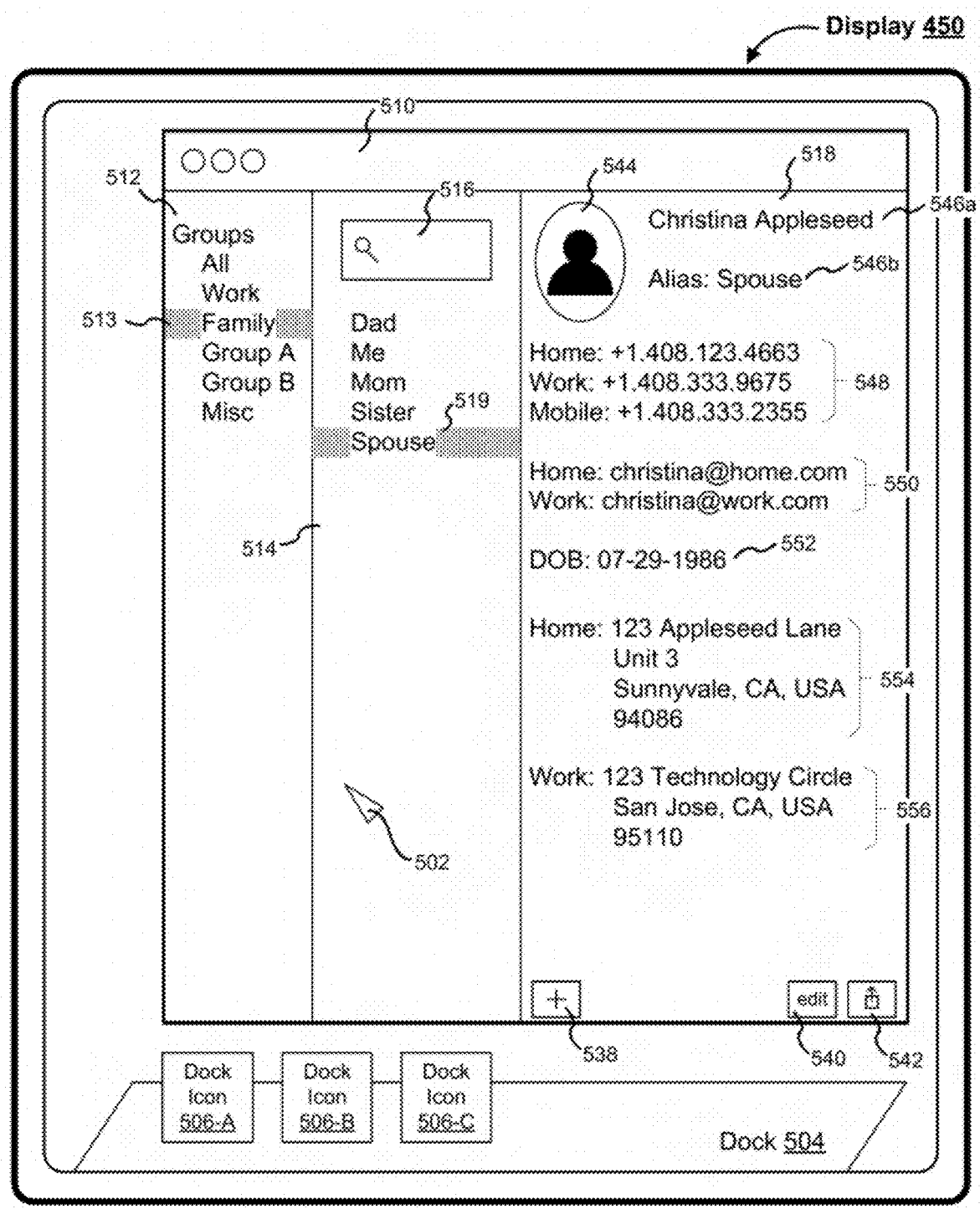

FIGS. 5A-5B illustrate contact information for a "Me" contact 517 and a "Spouse" contact 519 (e.g., contact cards) displayed within a window 510, respectively. FIG. 5A illustrates contact information for the "Me" contact 517 displayed in the third pane 518 of the window 510. FIG. 5A also illustrates focus selector 502 at a location corresponding to the "Spouse" contact 519 within the second pane 514 of the window 510.

As shown in FIG. 5A, the window 510 corresponds to an address book or contacts application. The window 510 includes a first pane 512 with a plurality of groups of contacts, including: "All," "Work," "Family," "Group A," "Group B," and "Miscellaneous" (Misc). In FIG. 5A, the "Family" group 513 is active.

As shown in FIG. 5A, the window 510 also includes a second pane 514 with a plurality of contacts associated with the "Family" group 513, including: "Dad," "Me," "Mom," "Sister," and "Spouse." In FIG. 5A, the "Me" contact 517 is active. The second pane 514 also includes a search box 516 for searching contacts in the active group (e.g., the "Family" group 513 in FIG. 5A).

As shown in FIG. 5A, the window 510 further includes a third pane 518 with contact information for the "Me" contact 517 (e.g., a contact card). As shown in FIG. 5A, the contact information for the "Me" contact 517 includes: an avatar or image 520, a name 522a, a work title and company 522b, a plurality of telephone numbers 524, a plurality of email addresses 526, a date of birth 528, a spouse's name 530, a home address 532, and a work address 534. In FIG. 5A, the third pane 518 also includes an optional payment information affordance 536 for accessing and editing payment information such as credit card numbers, credit card expiration dates, bank account numbers, bank routing numbers, and/or the like. The third pane 518 further includes an addition affordance 538 for adding a contact, an edit affordance 540 for editing the contact information for the "Me" contact 517, and a share affordance 542 for sharing the contact information for the "Me" contact 517 via one or more sharing methods (e.g., SMS, email, social media network X, social media network Y, and/or the like).

FIG. 5B illustrates contact information for the "Spouse" contact 519 displayed in the third pane 518 of the window 510 in response to selection of the "Spouse" contact 519 within the second pane 514 with the focus selector 502 (e.g., with a single or double click) in FIG. 5A. As such, the "Spouse" contact 519 is active in FIG. 5B. As shown in FIG. 5B, the contact information for the "Spouse" contact 519 includes: an avatar or image 544, a name 546a, (optionally) an alias 546b, a plurality of telephone numbers 548 a plurality of email addresses 550, a date of birth 552, a home address 554, and a work address 556.

Figure 5C:
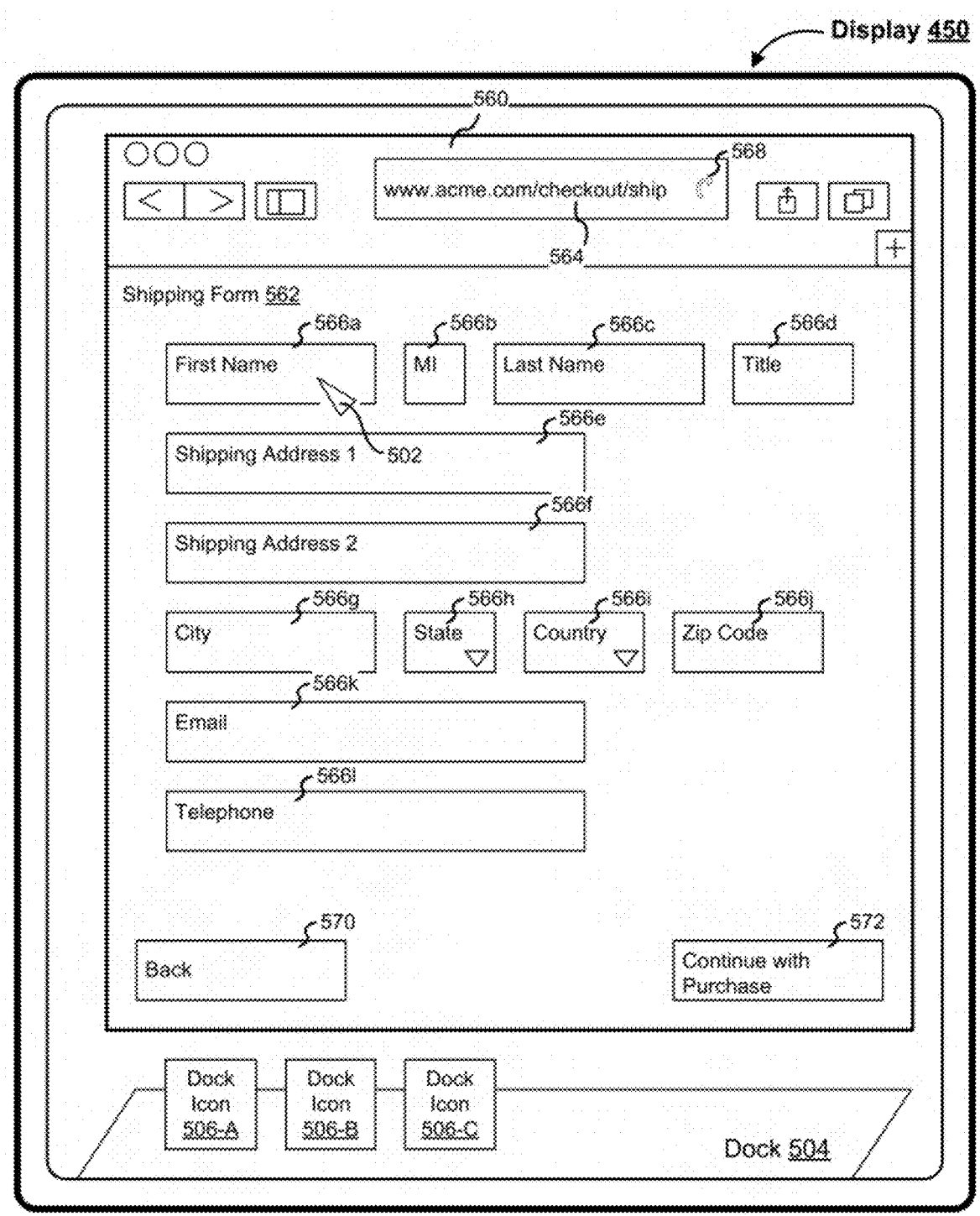
Figure 5D:
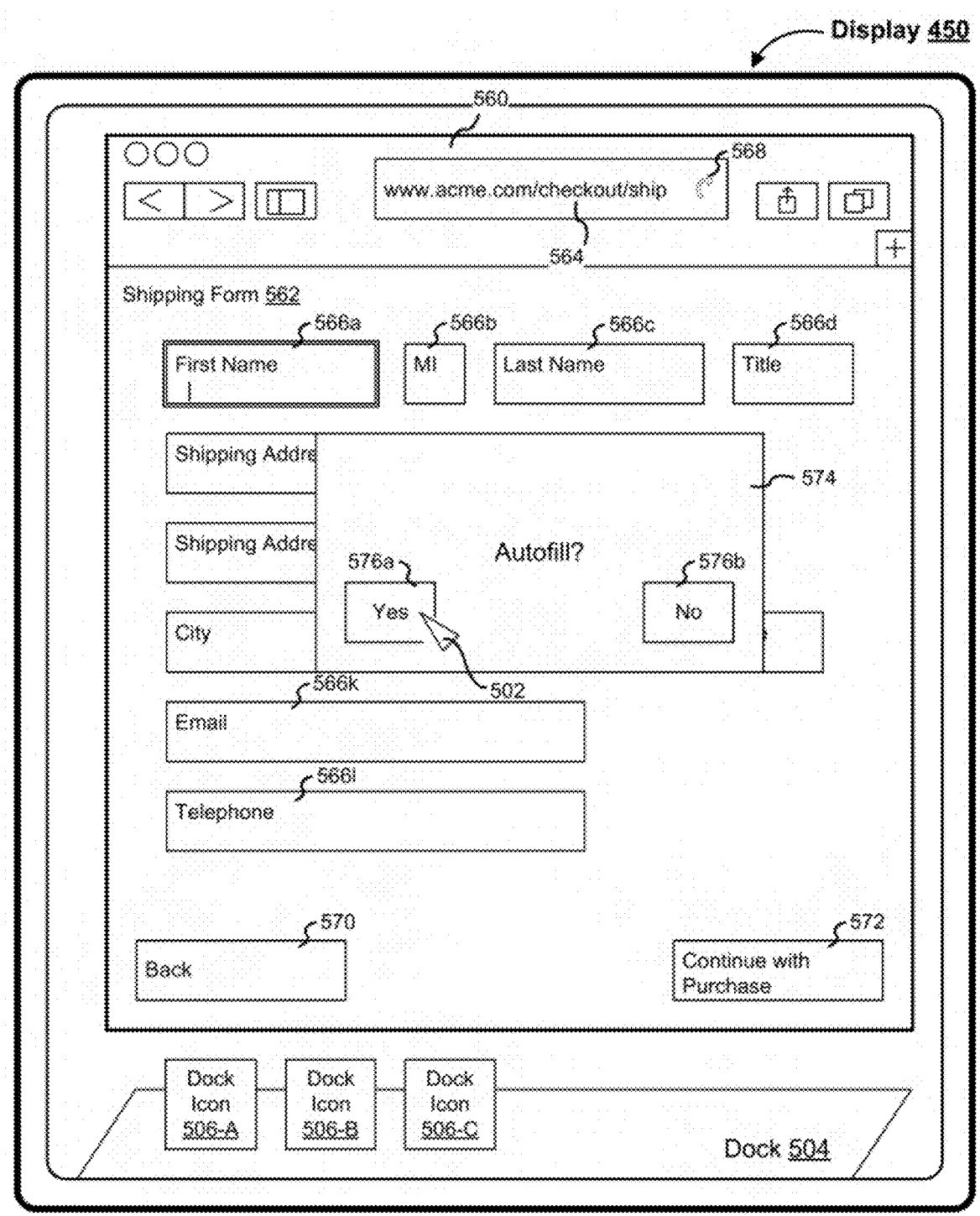
Figure 5E:
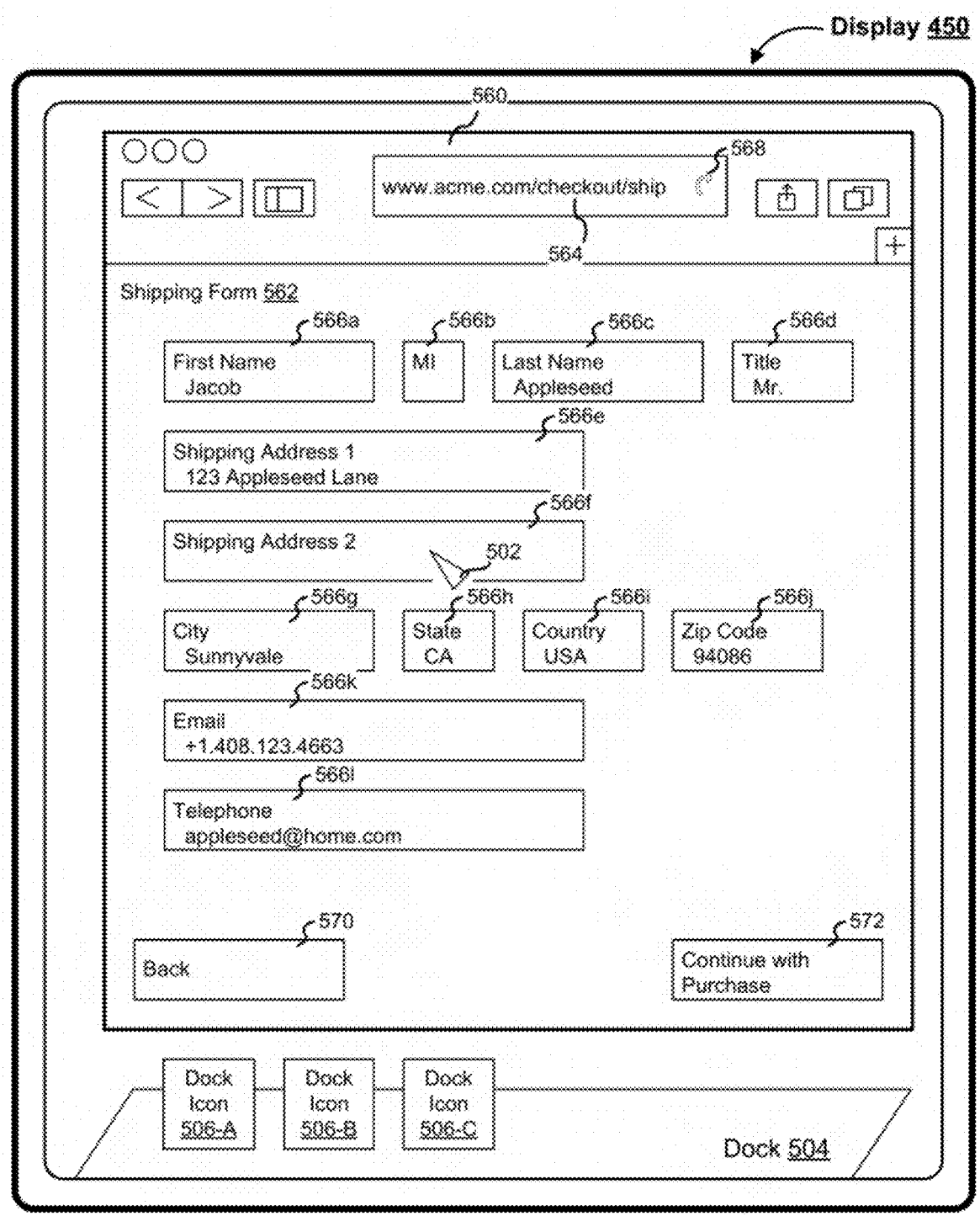

FIGS. 5C-5E illustrate a sequence in which at least some fields 566 of a first electronic form 562 are populated based on classifications of an autofill process and contact information for the "Me" contact 517 in FIG. 5A. FIG. 5C illustrates a window 560 (e.g., for a web browser application) displaying a first electronic form 562 corresponding to the URL in the address bar 564. As shown in FIG. 5C, the address bar 564 includes a refresh affordance 568 for reloading the first electronic form 562. For example, in FIG. 5C, the first electronic form 562 corresponds to a shipping form associated with a check-out process for a retail purchase. FIG. 5C also illustrates the focus selector 502 at a location corresponding to the first name field 566a within the first electronic form 562.

As shown in FIG. 5C, the first electronic form 562 includes a plurality of fields (sometimes collectively referred to as the "fields 566" herein), including: a first name field 566a, a middle initial (MI) field 566b, a last name field 566c, a title field 566d, a first shipping address field 566e, a second shipping address field 566f, a city field 566g, a state field 566h, a country field 566i, a zip code field 566j, an email address field 566k, and a telephone number field 566l. The first electronic form 562 also includes a back affordance 570 for replacing display of the first electronic form 562 with a previous screen or web page, and a "Continue with Purchase" affordance 572 for completing the check-out process or advancing to a next stage of the check-out process for a retail purchase.

FIG. 5D illustrates an autofill confirmation prompt 574 overlaid on the first electronic form 562 in response to selection of the first name field 566a (e.g., with a single or double click) in FIG. 5C. According to some embodiments, the autofill prompt 574 is displayed after the user begins typing a name in a text input field and selects an autofill option (e.g., as shown in FIG. 8U). According to some embodiments, the autofill prompt 574 is displayed after the user selects an icon within the text input field (e.g., as shown in FIG. 8R). As shown in FIG. 5D, the autofill confirmation prompt 574 includes a "Yes" affordance 576a, which, when activated (e.g., with a single or double click via the focus selector 502), causes the device 300 to populate the fields 566 of the first electronic form 562 based on classifications of an autofill process and contact information for the "Me" contact 517 in FIG. 5A. The autofill confirmation prompt 574 also includes a "No" affordance 576b, which, when activated (e.g., with a single or double click via the focus selector 502), causes the device 300 to forego populating the fields 566 of the first electronic form 562 and to remove display of the autofill confirmation prompt 574. FIG. 5D also illustrates the focus selector 502 at a location corresponding to the "Yes" affordance 576*a* within the autofill confirmation prompt 574.

FIG. 5E illustrates at least some of the fields 566 of the first electronic form 562 populated with contact information for the "Me" contact 517 in FIG. 5A in response to selection of the "Yes" affordance 576*a* (e.g., with a single or double click) in FIG. 5D. FIG. 5E also illustrates the focus selector at a location corresponding to the second shipping address field 566*f*. As shown in FIG. 5E, the fields 566 were populated with contact information for the "Me" contact 517 in FIG. 5A related to a home category (e.g., home telephone number, home email address, and home address). However, some of the fields 566 were under filled/populated or improperly filled/populated (e.g., filled with the wrong type of information such as filling an email address into a phone number data field).

As a first example, in FIG. 5E, the first shipping address field 566*e* was populated with a portion of the home address 532 in FIG. 5A, but the second shipping address field 566*f* was not populated. As such, the second shipping address field 566*f* was under filled/populated (e.g., missing "Unit 3" from the home address 532). As another example, in FIG. 5E, the email address field 566*k* was populated with a home telephone number from the plurality of telephone numbers 524 in FIG. 5A, and the telephone number field 566*l* was populated with a home address from the plurality of email addresses 526 in FIG. 5A. As such, in FIG. 5A, the email address field 566*k* and the telephone number field 566*l* were improperly filled/populated with the incorrect contact information from the "Me" contact 517 in FIG. 5A.

Figure 5F:
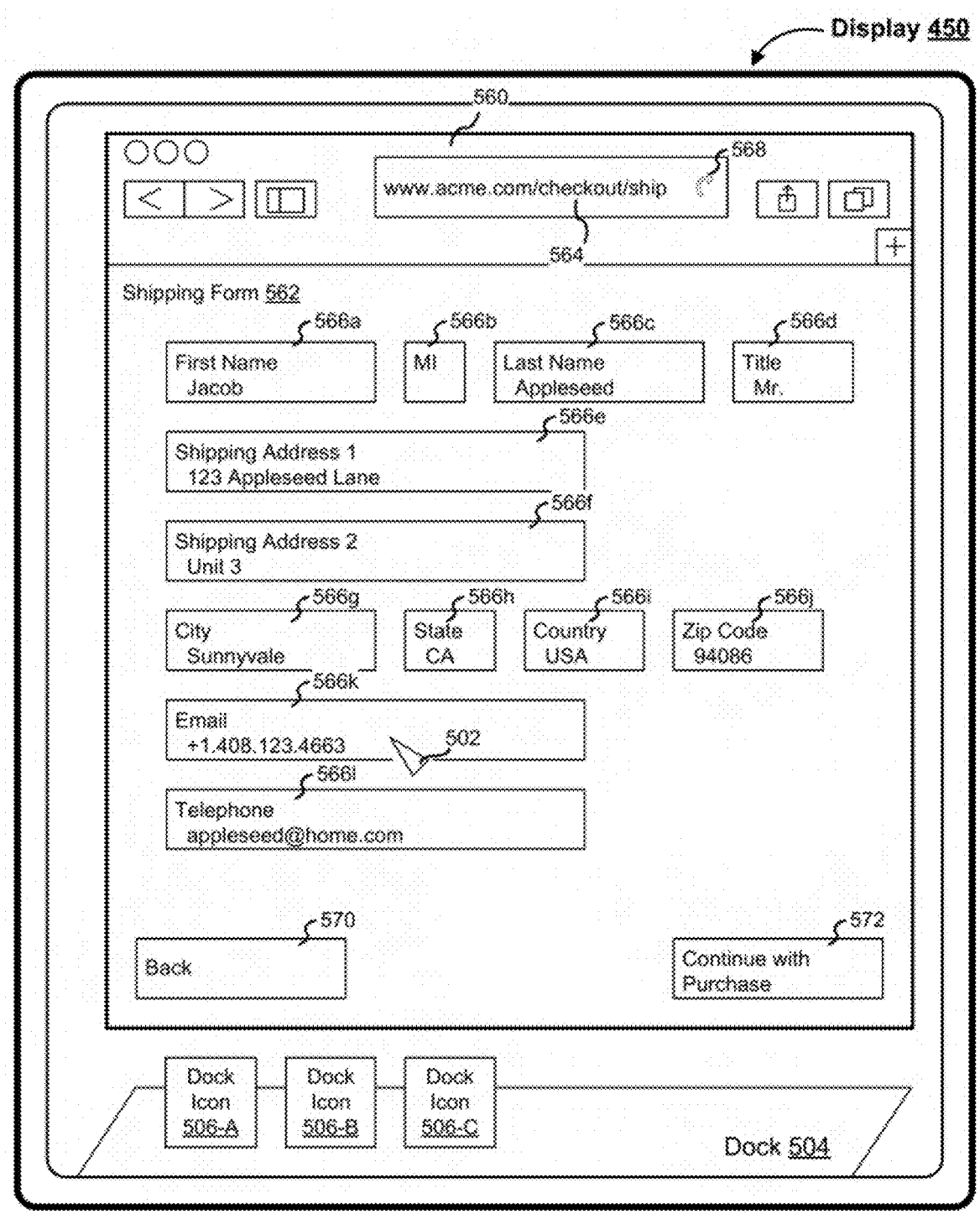
Figure 5G:
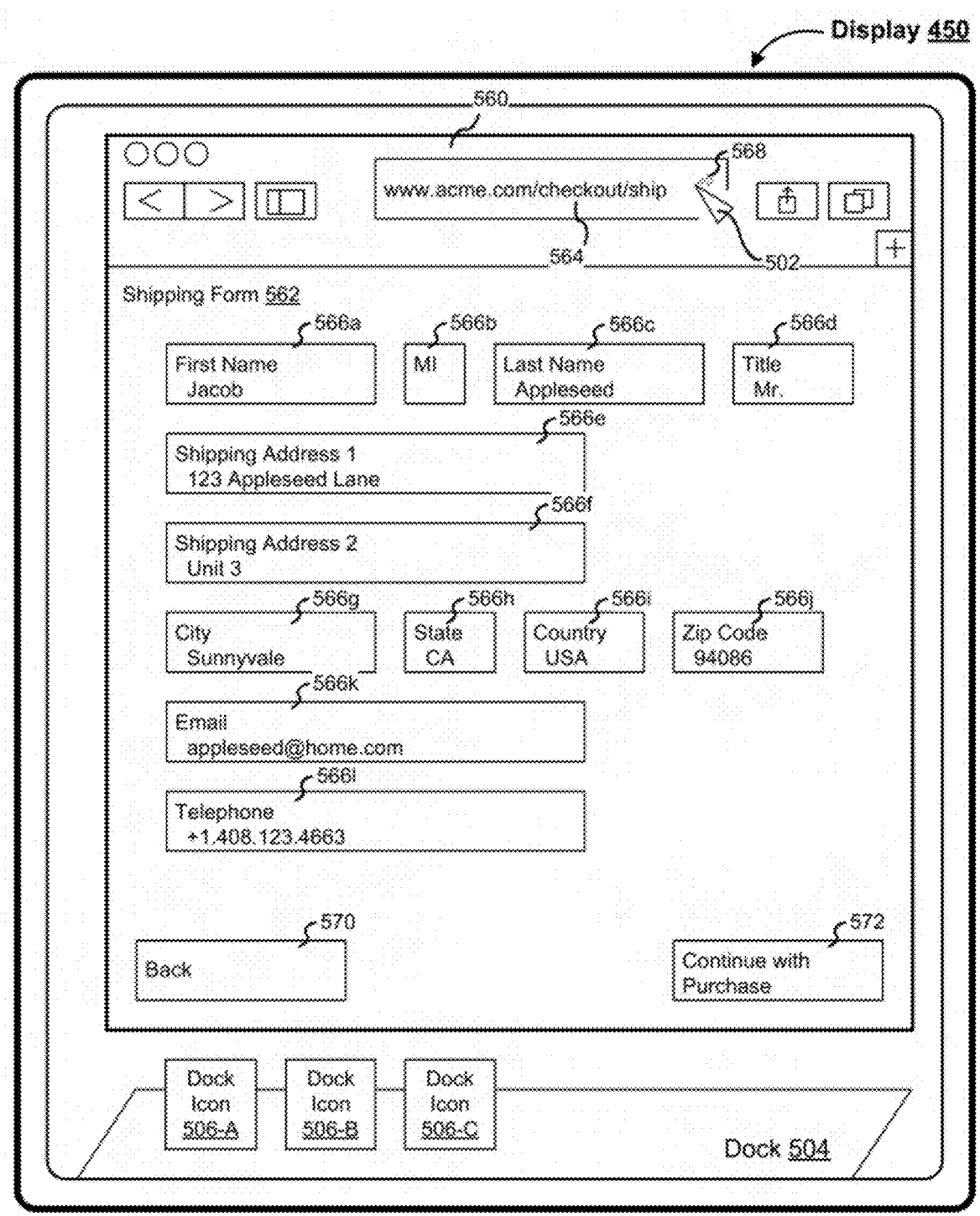

FIGS. 5E-5G illustrate a sequence in which changes are made to text strings filled/populated into some of the fields 566 of the first electronic form 562. FIG. 5F illustrates entry of the text string "Unit 3" into the second shipping address field 566*f* after selection of the second shipping address field 566*f* in FIG. 5E. As such, in this example, the user of the device 300 corrects the under fill/population mistake related to the second shipping address field 566*f* (e.g., a user amendment as described in block 608 of FIG. 6). FIG. 5F also illustrates the focus selector 502 at a location corresponding to the email address field 566*k*. FIG. 5G illustrates entry of the text string "appleseed@home.com" into the email address field 566*k* and entry of the text string "+1.408.123.4663" into the telephone number fields 566*l* after selection of the email address field 566*k* in FIG. 5F. As such, in this example, the user of the device 300 corrects the improper fill/population mistake related to the email address field 566*k* and the telephone number fields 566*l* (e.g., a user amendment as described in block 608 of FIG. 6). FIG. 5G also illustrates the focus selector 502 at a location corresponding to the refresh affordance 568.

Figure 5H:
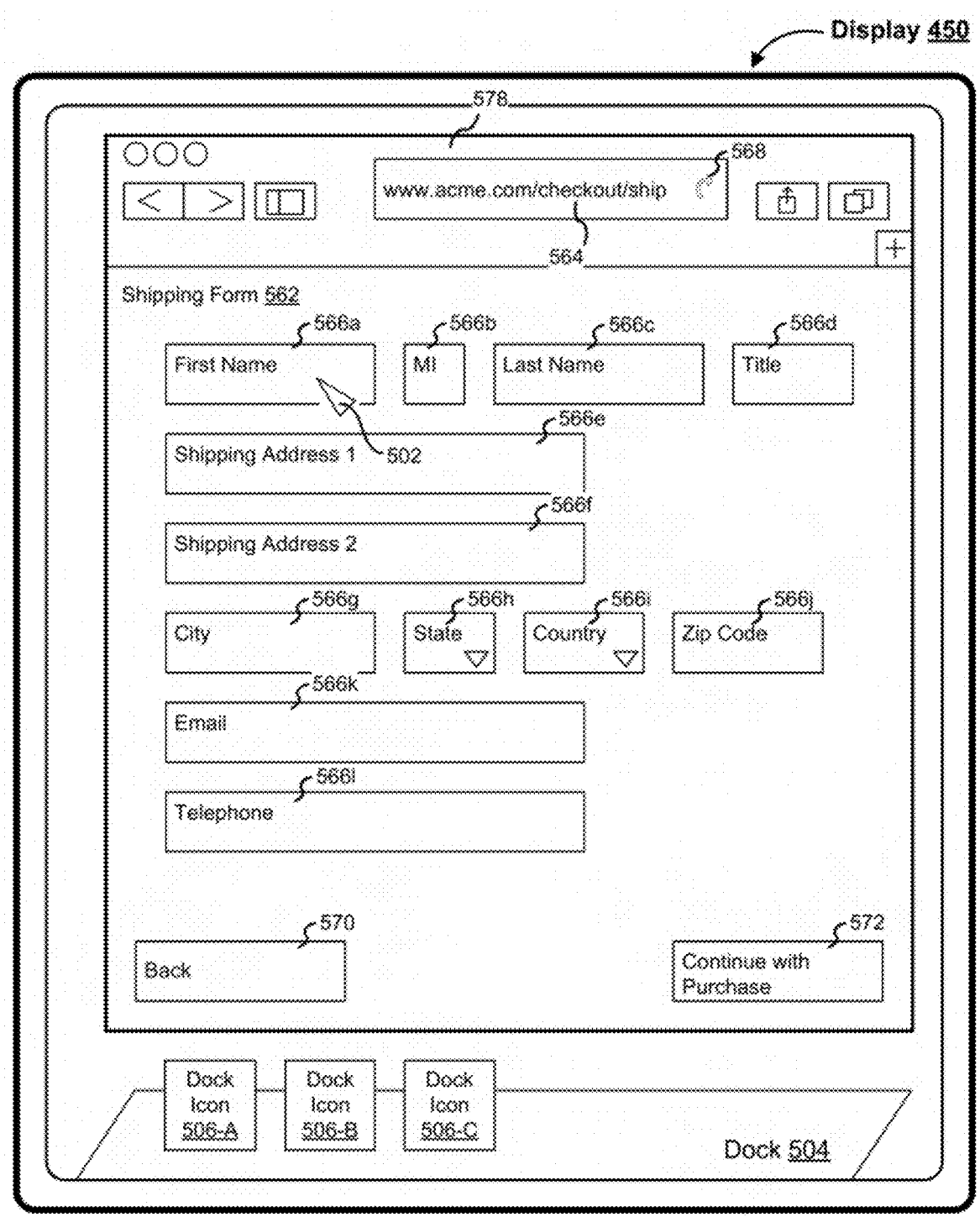
Figure 5I:
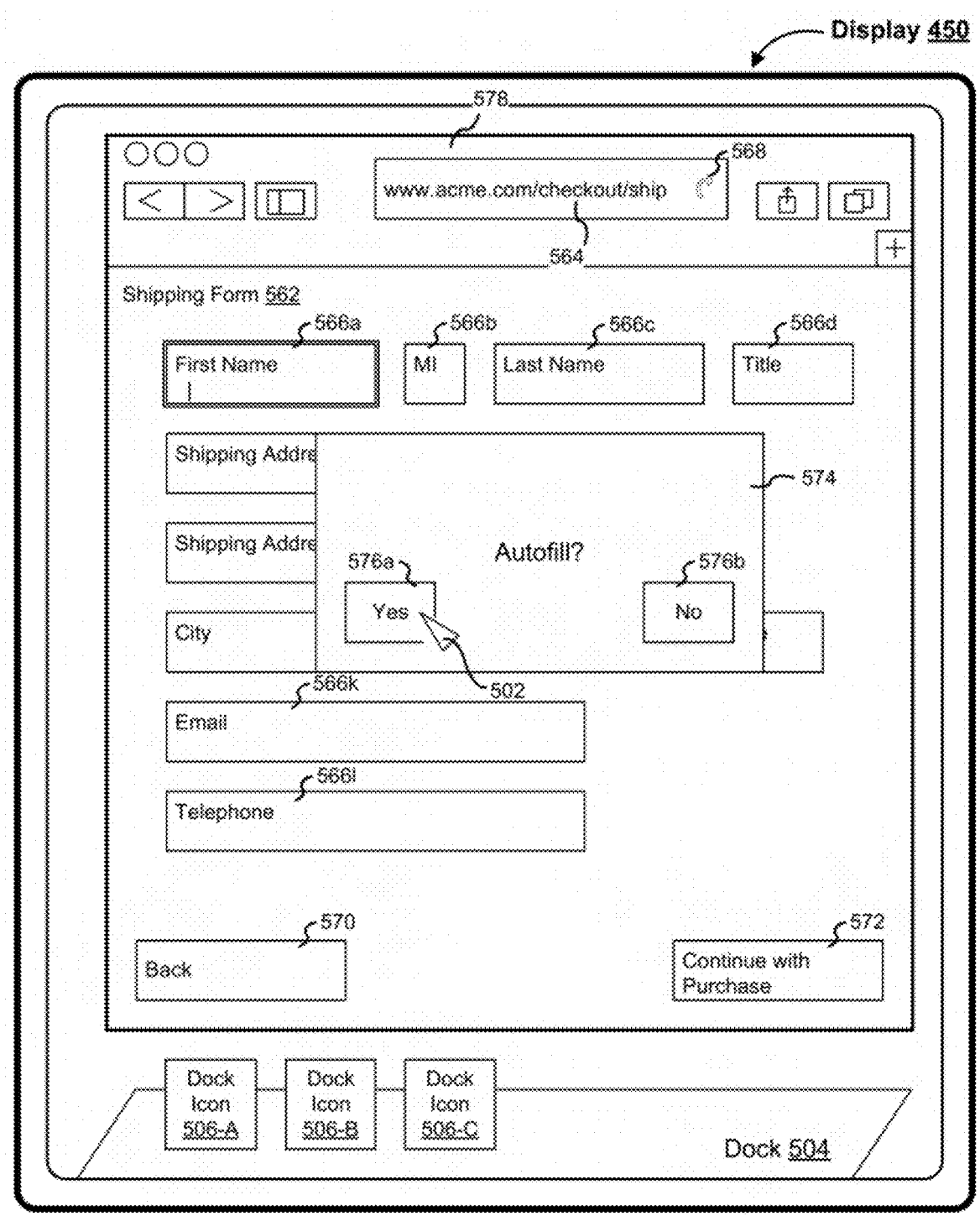

FIG. 5H illustrates a window 578 (e.g., for a web browser application) displaying the first electronic form 562 corresponding to the URL in the address bar 564 after selection of the refresh affordance 558 in FIG. 5G. As such, the web page associated with the first electronic form 562 was reloaded in response to selection of the refresh affordance 558 in FIG. 5G. FIG. 5H also illustrates the focus selector 502 at a location corresponding to the first name field 566*a* within the first electronic form 562. FIG. 5I illustrates an autofill confirmation prompt 574 overlaid on the first electronic form 562 in response to selection of the first name field 566*a* (e.g., with a single or double click) in FIG. 5H.

FIG. 5I also illustrates the focus selector 502 at a location corresponding to the "Yes" affordance 576*a* within the autofill confirmation prompt 574.

Figure 5J:
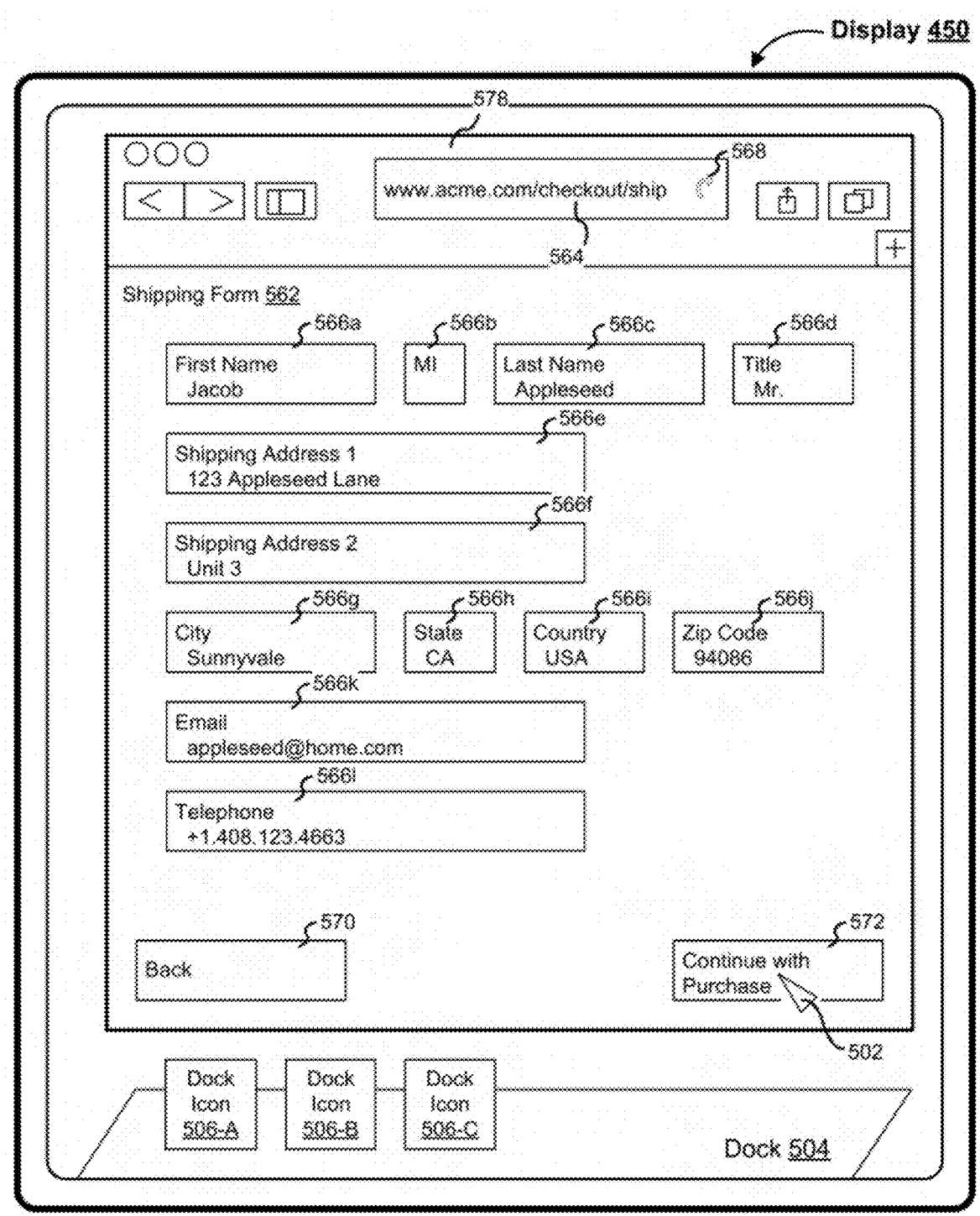

FIGS. 5H-5J illustrate a sequence in which the fields 566 of the first electronic form 562 are populated based on the previous changes made to the first electronic form in FIGS. 5E-5G and contact information for the "Me" contact 517 in FIG. 5A. FIG. 5J illustrates at least some of the fields 566 of the first electronic form 562 populated with contact information for the "Me" contact 517 in FIG. 5A in response to selection of the "Yes" affordance 576*a* (e.g., with a single or double click) in FIG. 5I. As shown in FIG. 5J, the fields 566 of the first electronic form 562 were populated with contact information for the "Me" contact 517 based on the previous amendments made to the fields 566 by the user of the device 300 in FIGS. 5E-5G. As such, in FIG. 5J, the second shipping address field 566*f* is no longer under filled/populated. Furthermore, in FIG. 5J, the email address field 566*k* and the telephone number fields 566*l* are no longer improperly filled/populated. FIG. 5J further illustrates the focus selector 502 at a location corresponding to the "Continue with Purchase" affordance 572.

Figure 5K:
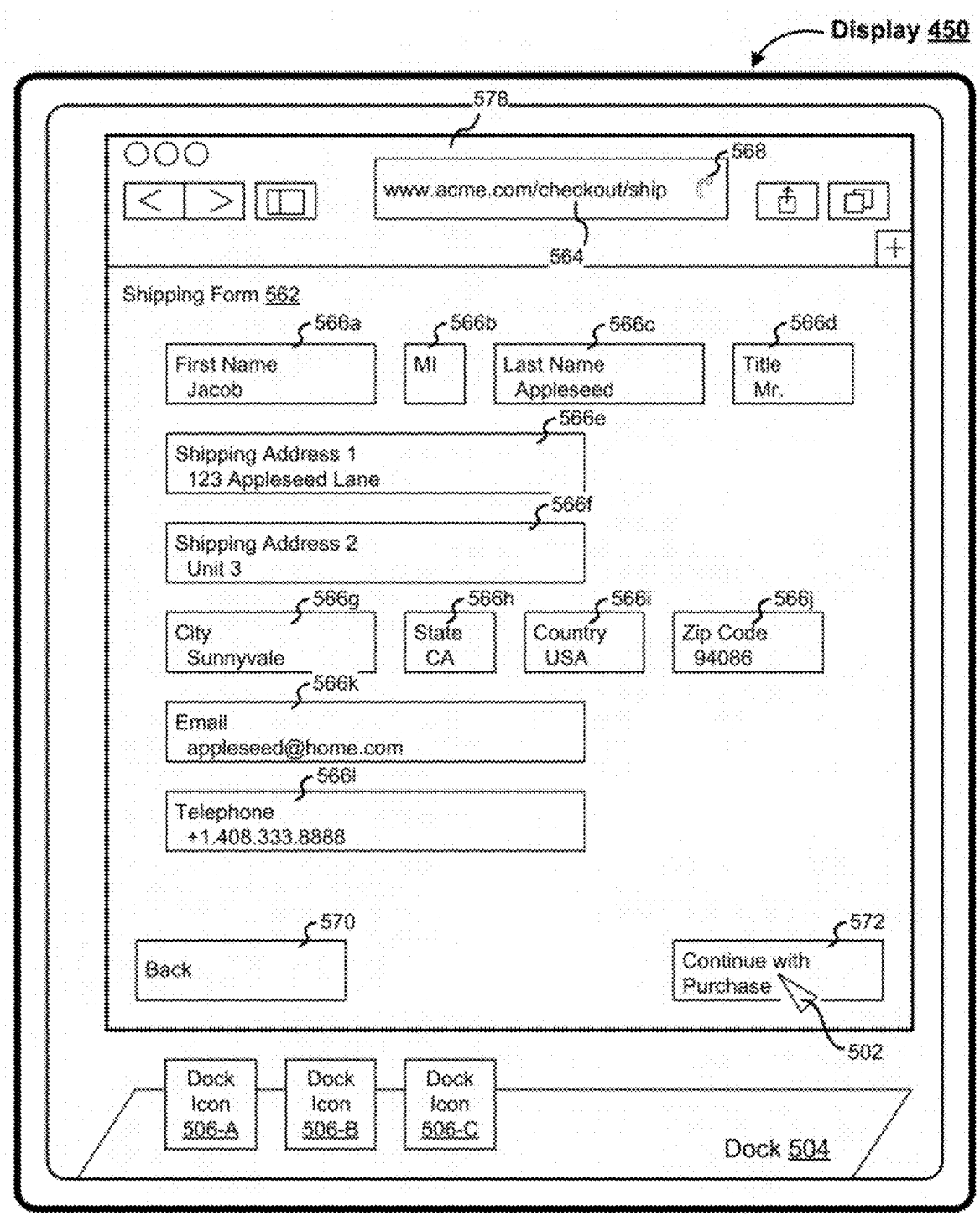

FIGS. 5H-5I and 5K illustrate a sequence in which the fields 566 of the first electronic form 562 are populated based on the previous changes made to the first electronic form in FIGS. 5E-5G and updated contact information for the "Me" contact 517 in FIG. 5A. FIG. 5K illustrates at least some of the fields 566 of the first electronic form 562 populated with contact information for the updated "Me" contact 517 in response to selection of the "Yes" affordance 576*a* (e.g., with a single or double click) in FIG. 5I. As shown in FIG. 5K, the fields 566 of the first electronic form 562 were populated with updated contact information for the "Me" contact 517 (e.g., a different telephone number from the plurality of telephone numbers 524 in FIG. 5A) based on the previous amendments made to the fields 566 by the user of the device 300 in FIGS. 5E-5G. For example, the user of the device 300 updated the "Me" contact 517 so that the home telephone number was changed from "+1.408.123.4663" to "+1.408.333.8888." As such, in FIG. 5K, the second shipping address field 566*f* is no longer under filled/populated. Furthermore, in FIG. 5K, the email address field 566*k*, and the telephone number fields 566*l* are no longer improperly filled/populated. According to some embodiments, as described with reference to FIG. 6 and FIGS. 10A-10C, the subsequent correction is made to the field classification and not to the text string itself. FIG. 5K further illustrates the focus selector 502 at a location corresponding to the "Continue with Purchase" affordance 572.

Figure 5L:
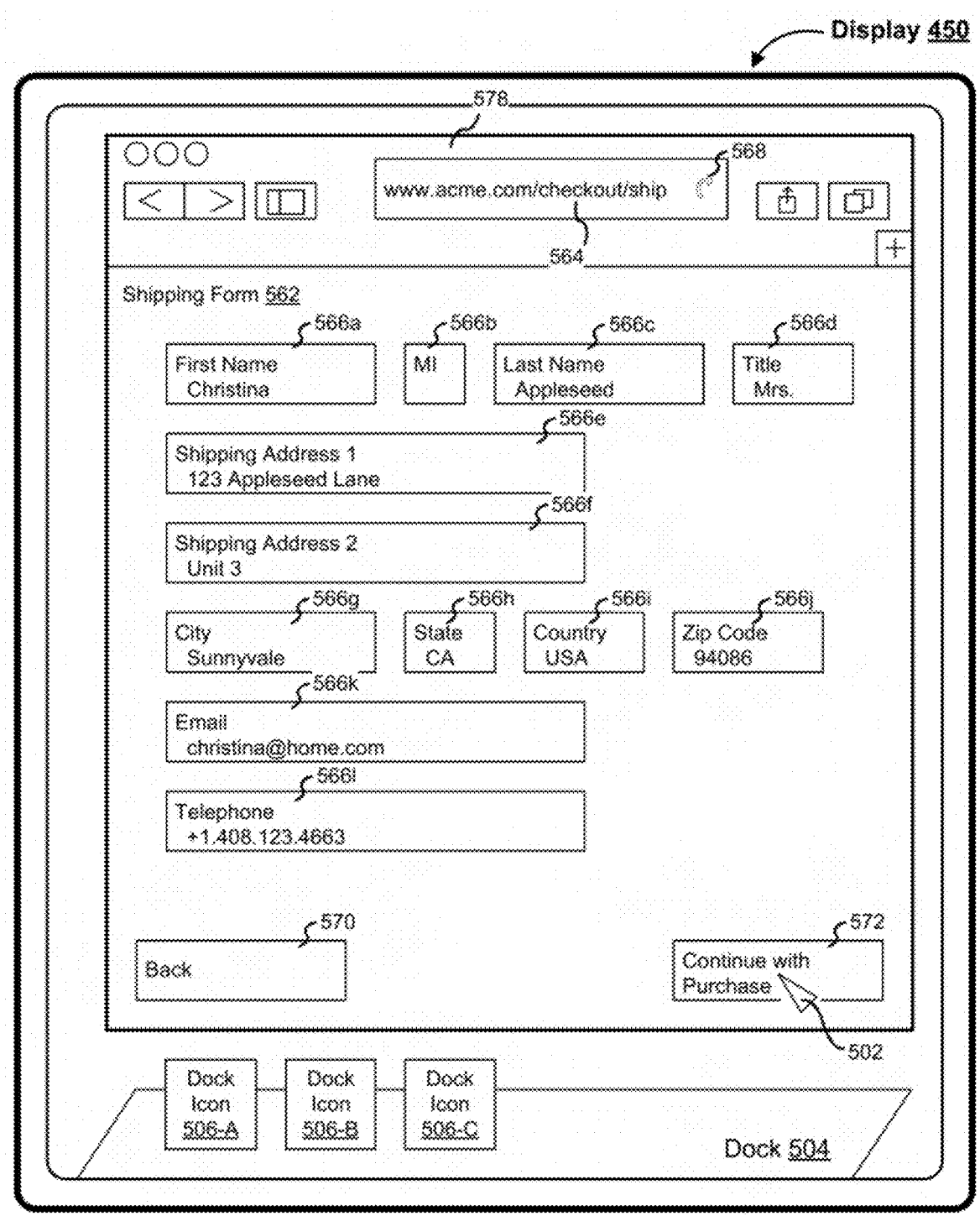

FIGS. 5H-5I and 5L illustrate a sequence in which in which the fields 566 of the first electronic form 562 are populated based on the previous changes made to the first electronic form in FIGS. 5E-5G and contact information for the "Spouse" contact 519 in FIG. 5B. FIG. 5L illustrates at least some of the fields 566 of the first electronic form 562 populated with contact information for the "Spouse" contact 519 in FIG. 5B in response to selection of the "Yes" affordance 576*a* (e.g., with a single or double click) in Figure SI. As shown in FIG. 5L, the fields 566 of the first electronic form 562 were populated with contact information for the "Spouse" contact 519 based on the previous amendments made to the fields 566 by the user of the device 300 in FIGS. 5E-5G. As such, in FIG. 5L, the second shipping address field 566*f* is no longer under filled/populated. Furthermore, in FIG. 5L, the email address field 566*k*, and the telephone number fields 566*l* are no longer improperly filled/populated. FIG. 5L further illustrates the focus selector 502 at a location corresponding to the "Continue with Purchase" affordance 572.

Figure 5M:
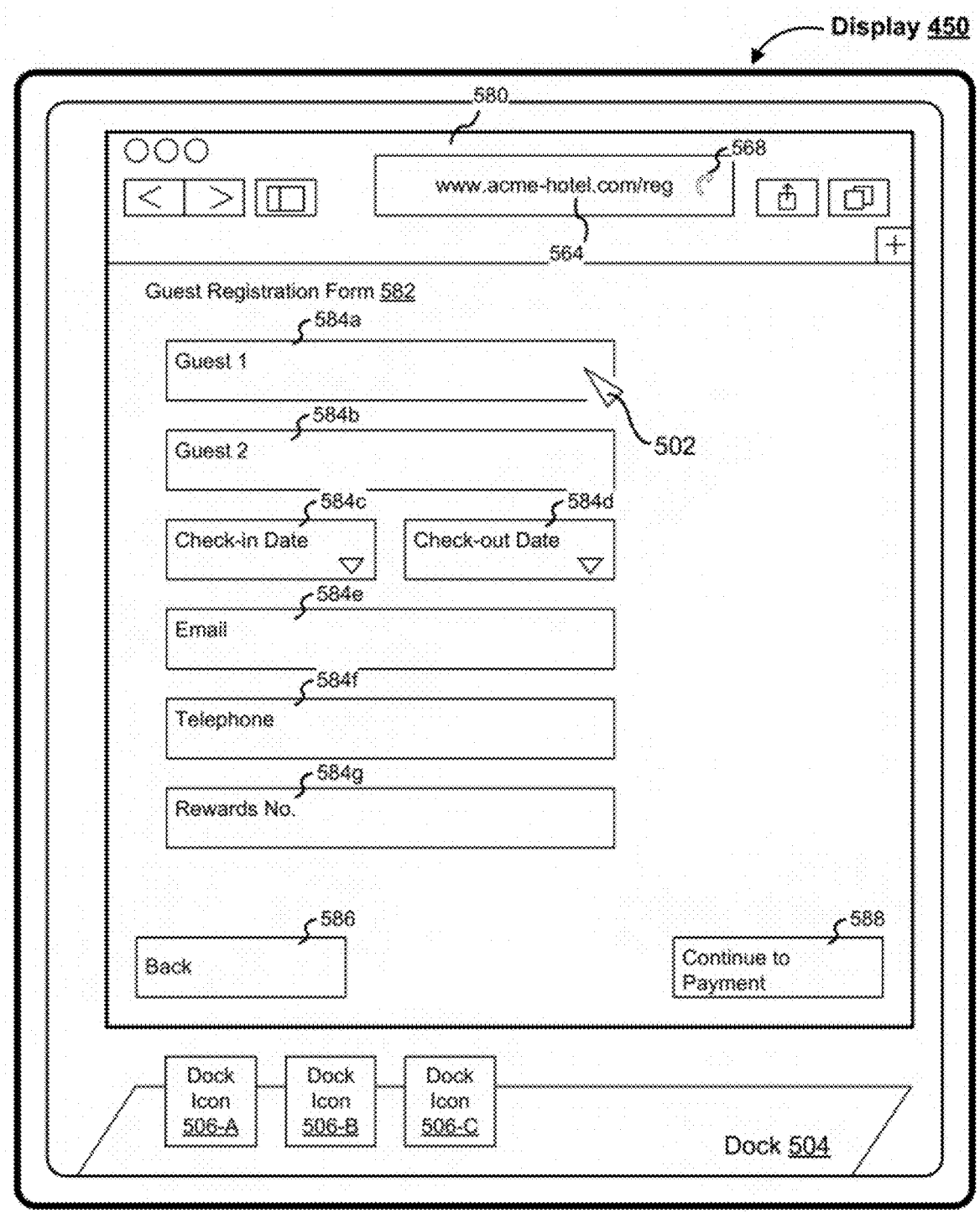
Figure 5N:
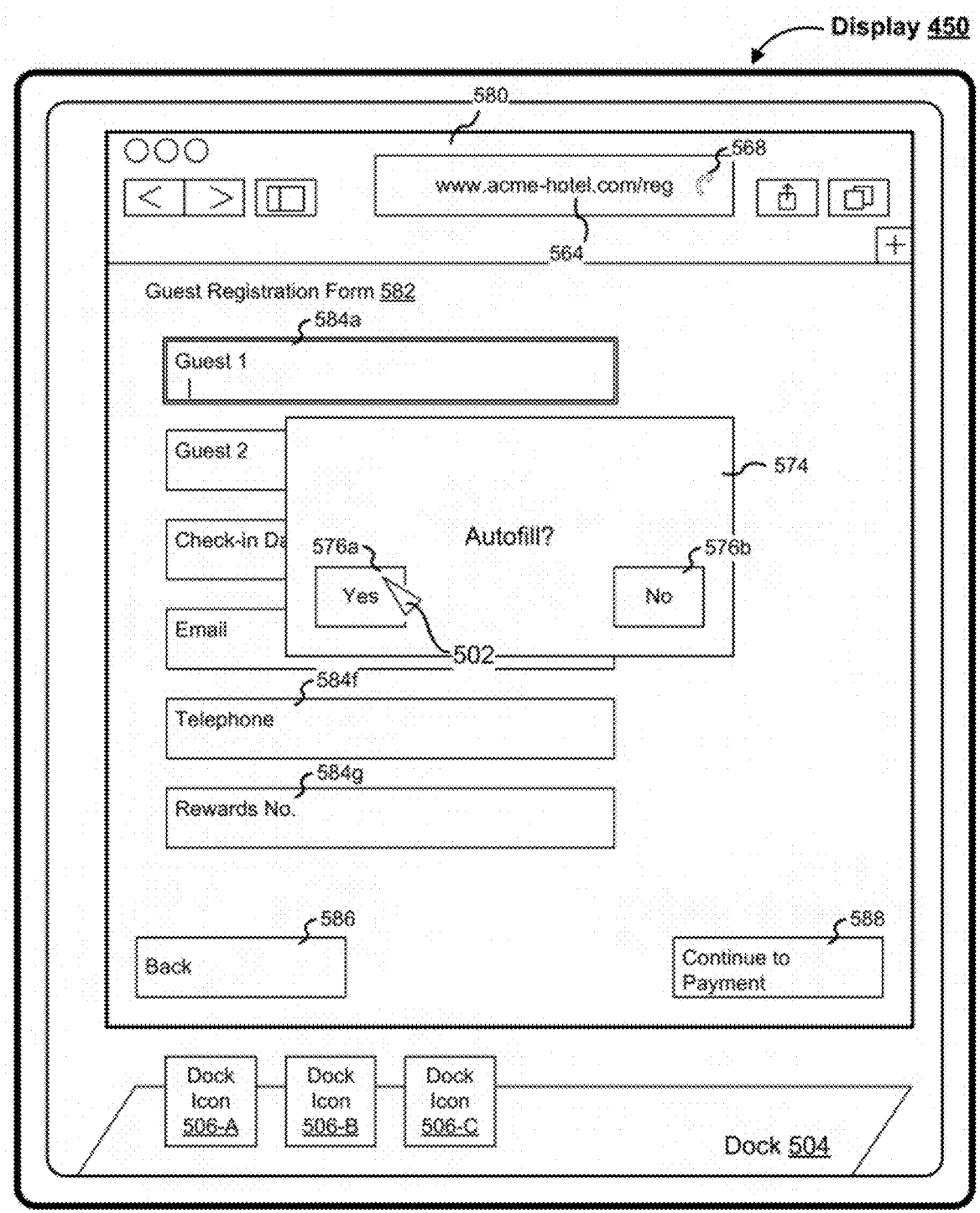
Figure 5O:
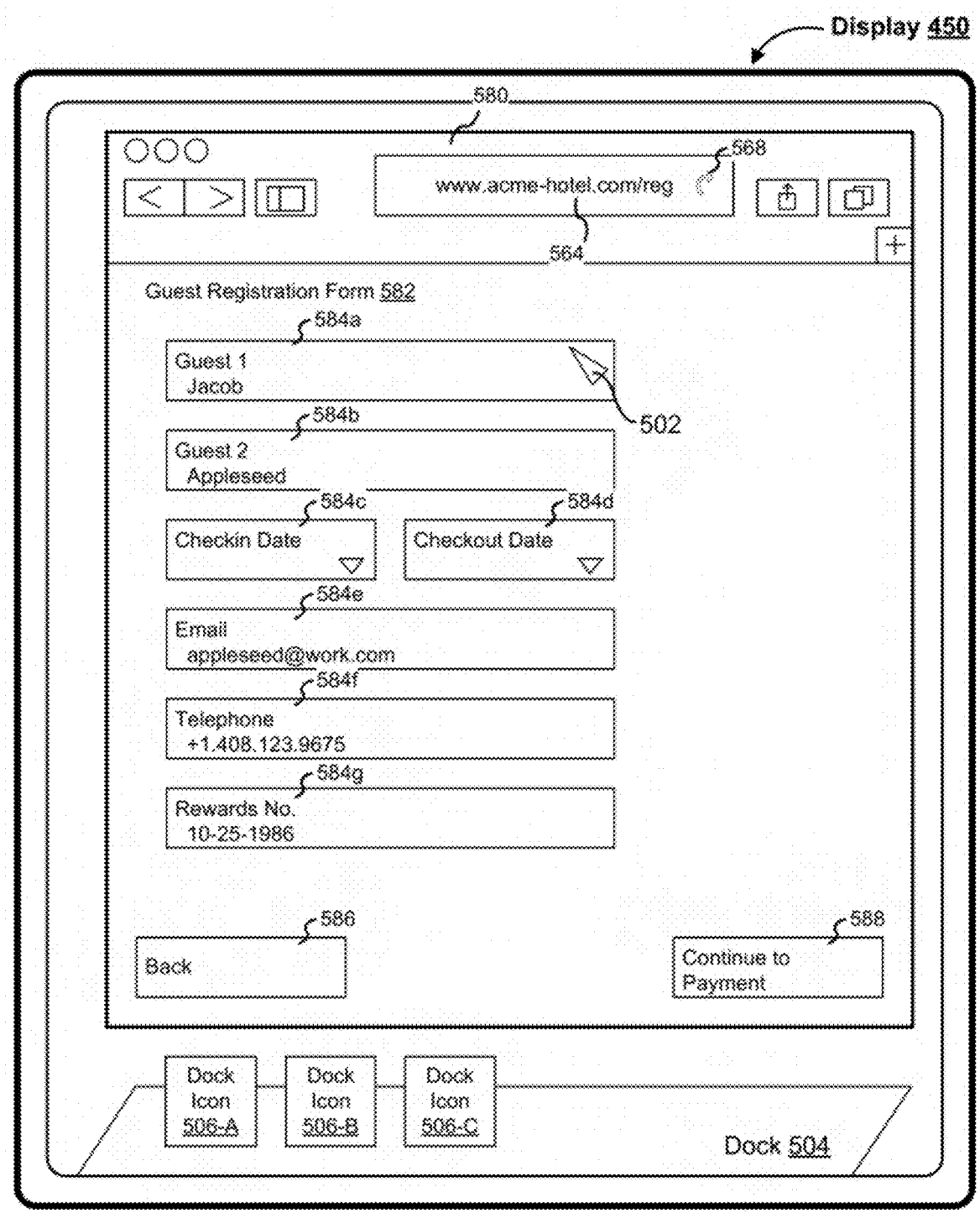

FIGS. 5M-5O illustrate a sequence in which fields 584 of a second electronic form 582 are populated based on classifications of an autofill process and contact information for the "Me" contact 517 in FIG. 5A. FIG. 5M illustrates a window 580 (e.g., for a web browser application) displaying a second electronic form 582 corresponding to the URL in the address bar 564. As shown in FIG. 5M, the address bar 564 includes a refresh affordance 568 for reloading the second electronic form 582. For example, in FIG. 5M, the second electronic form 582 corresponds to a guest registration form associated with a reservation process for a hotel. FIG. 5M also illustrates the focus selector 502 at a location corresponding to the first guest field 584a within the second electronic form 582.

As shown in FIG. 5M, the second electronic form 582 includes a plurality of fields (sometimes collectively referred to as the "fields 584" herein), including: a first guest field 584a, a second guest field 584b, a check-in date field 584c, a check-out date field 584d, an email address field 584e, a telephone number field 584f, and a rewards number field 584g. The second electronic form 582 also includes a back affordance 586 for replacing display of the second electronic form 582 with a previous screen or web page, and a "Continue to Payment" affordance 588 for completing the reservation process or advancing to a next stage of the reservation process for the hotel.

FIG. 5N illustrates an autofill confirmation prompt 574 overlaid on the second electronic form 582 in response to selection of the first guest field 584a (e.g., with a single or double click) in FIG. 5M. FIG. 5N also illustrates the focus selector 502 at a location corresponding to the "Yes" affordance 576a within the autofill confirmation prompt 574.

FIG. 5O illustrates at least some of the fields 584 of the second electronic form 582 populated with contact information for the "Me" contact 517 in FIG. 5A in response to selection of the "Yes" affordance 576a (e.g., with a single or double click) in FIG. 5N. FIG. 5O also illustrates the focus selector at a location corresponding to the first guest field 584a. As shown in FIG. 5O, the fields 584 were populated with contact information for the "Me" contact 517 in FIG. 5A related to a work category (e.g., work telephone number, work email address, and work address). However, some of the fields 584 were incorrectly filled/populated or over filled/populated.

As a first example, in FIG. 5O, the name for the "Me" contact 517 (e.g., Jacob Appleseed) is separated over the first guest field 584a and the second guest field 584b. As such, the first guest field 584a and the second guest field 584b were incorrectly filled. As another example, in FIG. 5O, the date of birth for the "Me" contact 517 was filled into the rewards number field 584g. As such, in this example, the rewards number field 584g was overfilled with contact information for the "Me" contact 517 in FIG. 5A.

Figure 5P:
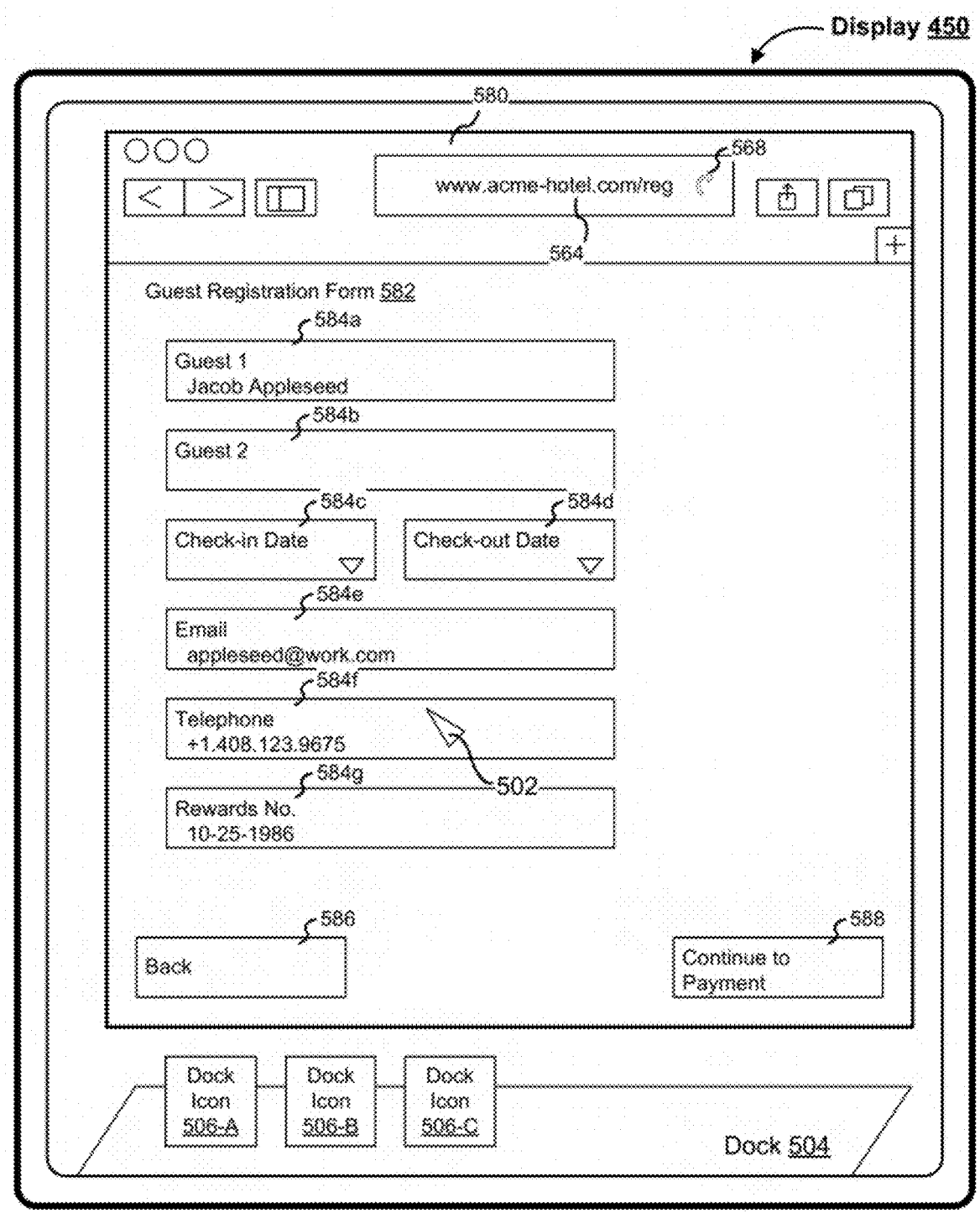
Figure 5Q:
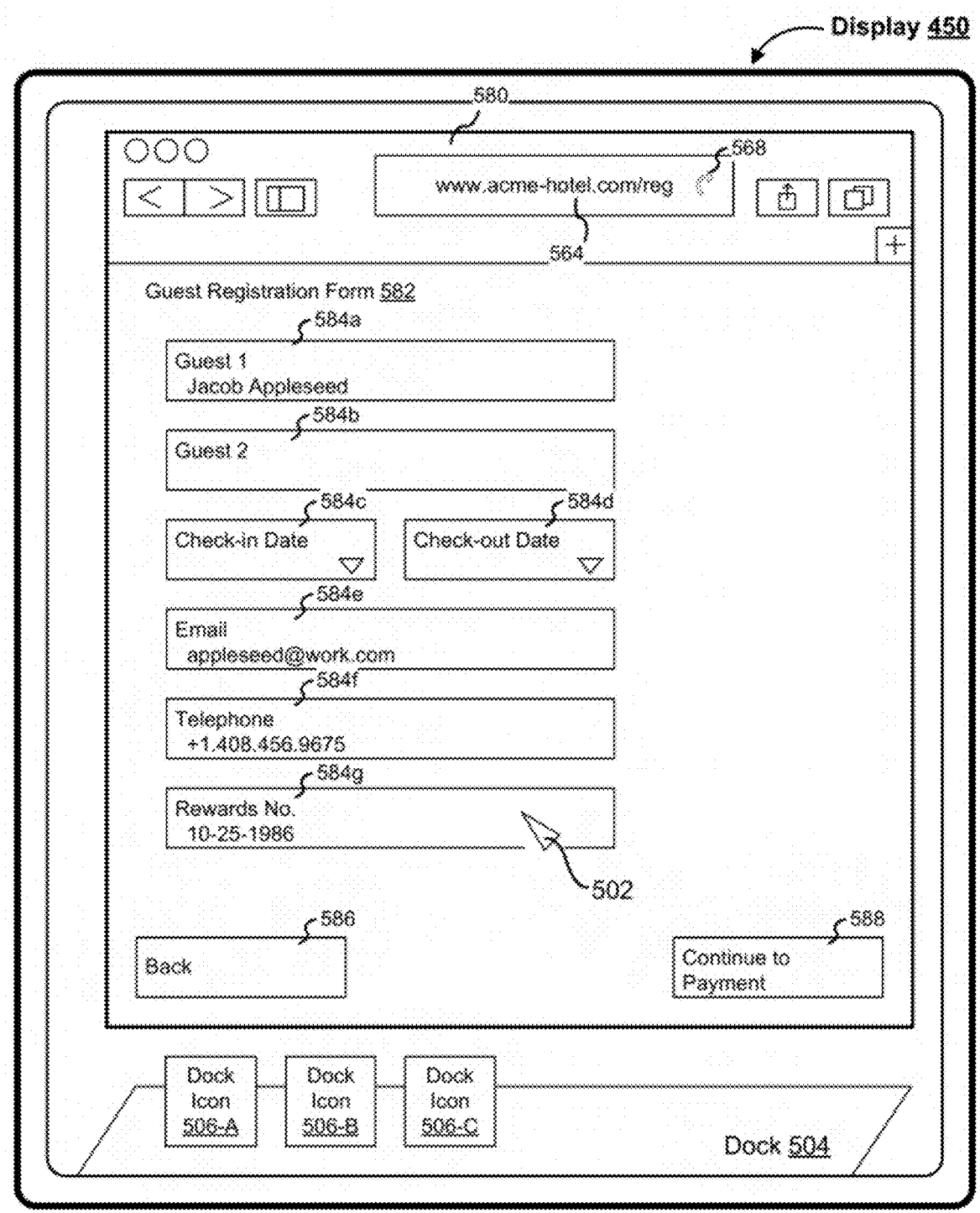
Figure 5R:
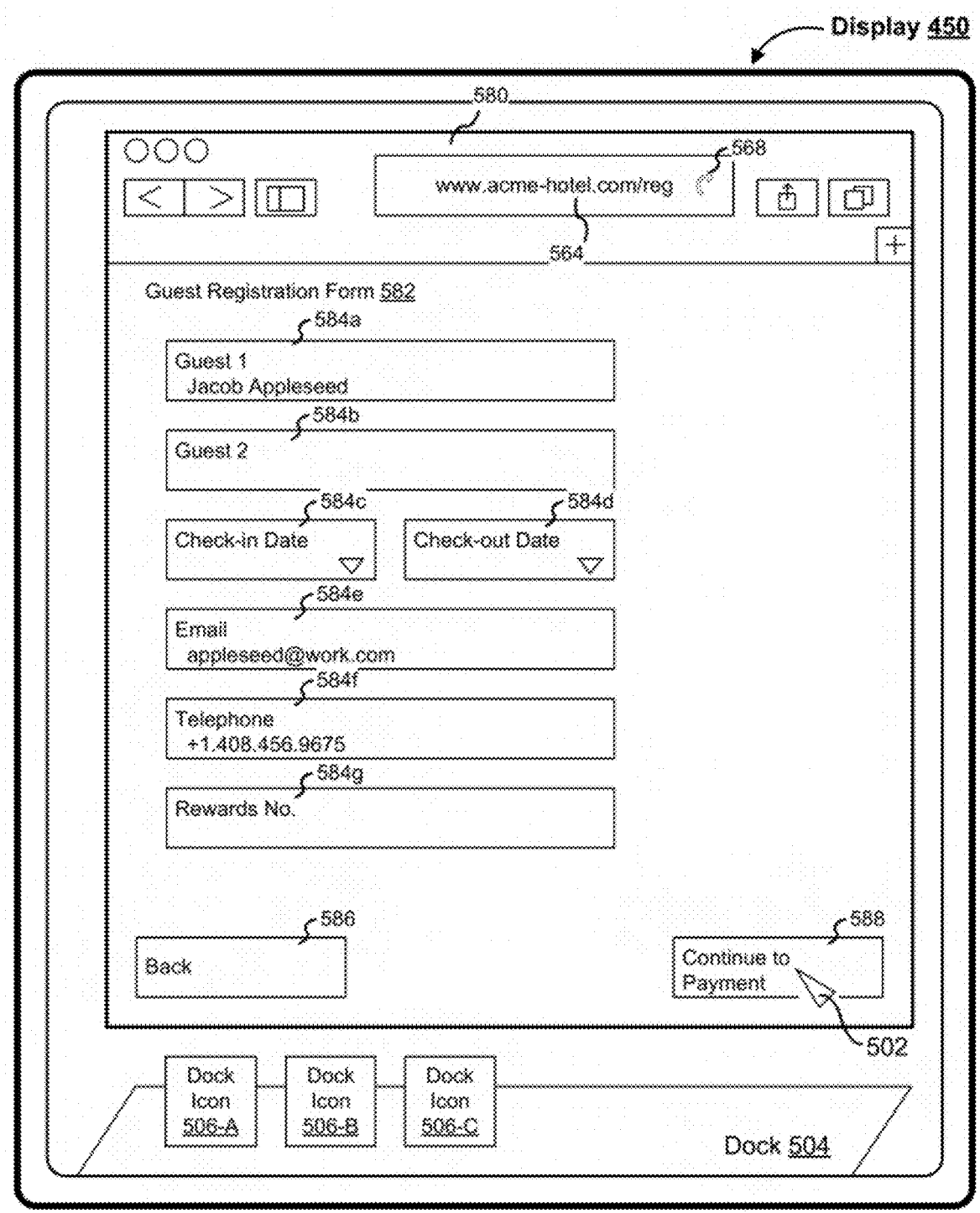

FIGS. 5P-5R illustrate a sequence in which changes are made to the fields 584 of the second electronic form 582. FIG. 5P illustrates entry of the text string "Jacob Appleseed" into the first guest field 584a and removal of the text string from the second guest field 584b after selection of the first guest field 584a in FIG. 5O. As such, in this example, the user of the device 300 corrects the incorrect fill/population mistake related to the first guest field 584a and the second guest field 584b (e.g., a user amendment as described in block 608 of FIG. 6). FIG. 5P also illustrates the focus selector 502 at a location corresponding to the telephone number field 584f. FIG. 5Q illustrates entry of the text string "+1.408.456.9675" into the telephone number field 584f after selection of the telephone number field 584f in FIG. 5P. As such, in this example, the user of the device 300 replaces work telephone number 1 (e.g., "+1.408.123.9675") with work telephone number 2 (e.g., "+1.408.456.9675"). FIG. 5Q also illustrates the focus selector 502 at a location corresponding to the rewards number field 584g. FIG. 5R illustrates removal of the text string from the rewards number field 584g after selection of the rewards number field 584g in FIG. 5Q. As such, in this example, the user of the device 300 removes the overfilled text string (e.g., date of birth) from the rewards number field 584g. FIG. 5R also illustrates the focus selector 502 at a location corresponding to the "Continue to Payment" affordance 588 within the second electronic form 582.

Figure 5S:
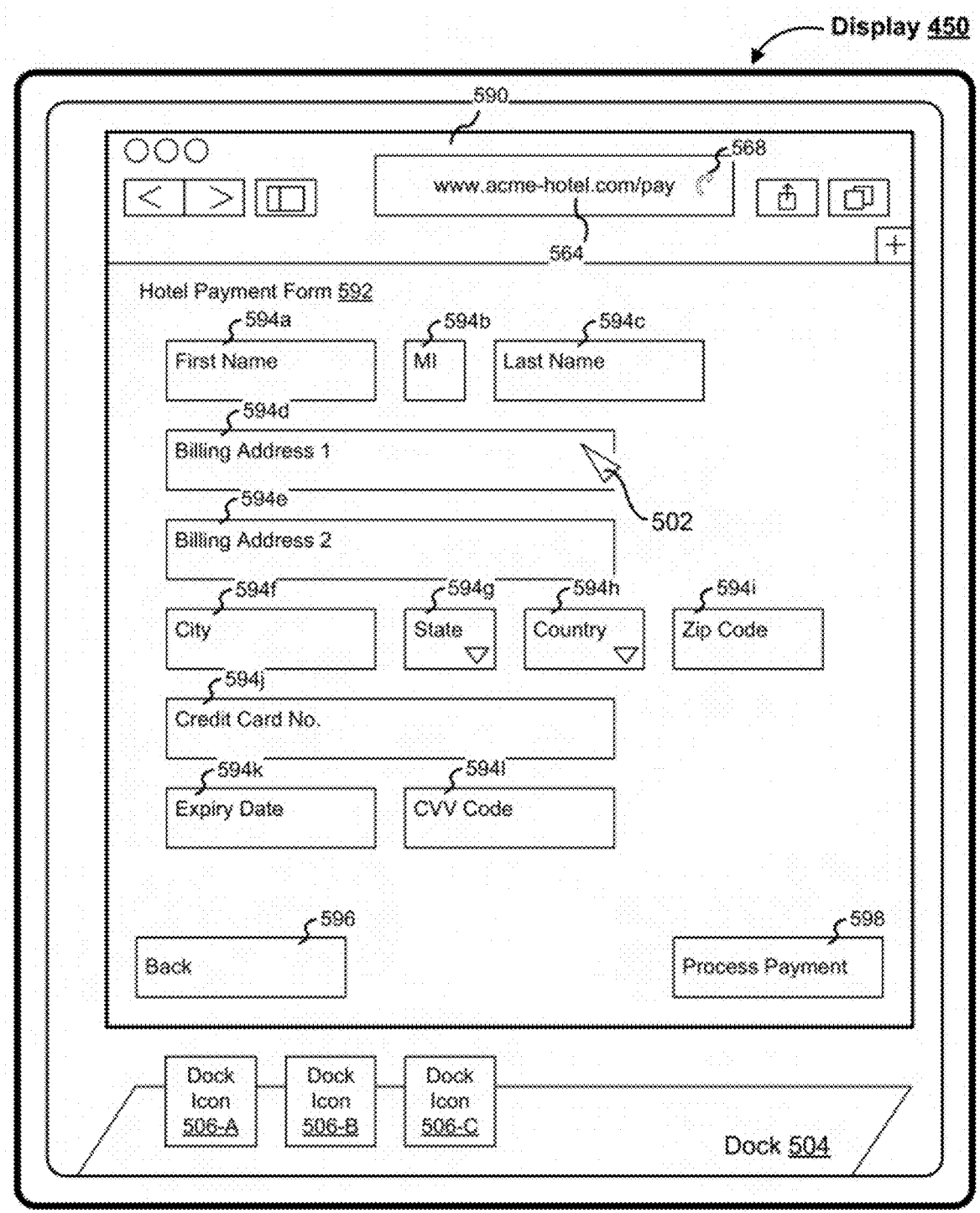
Figure 5T:
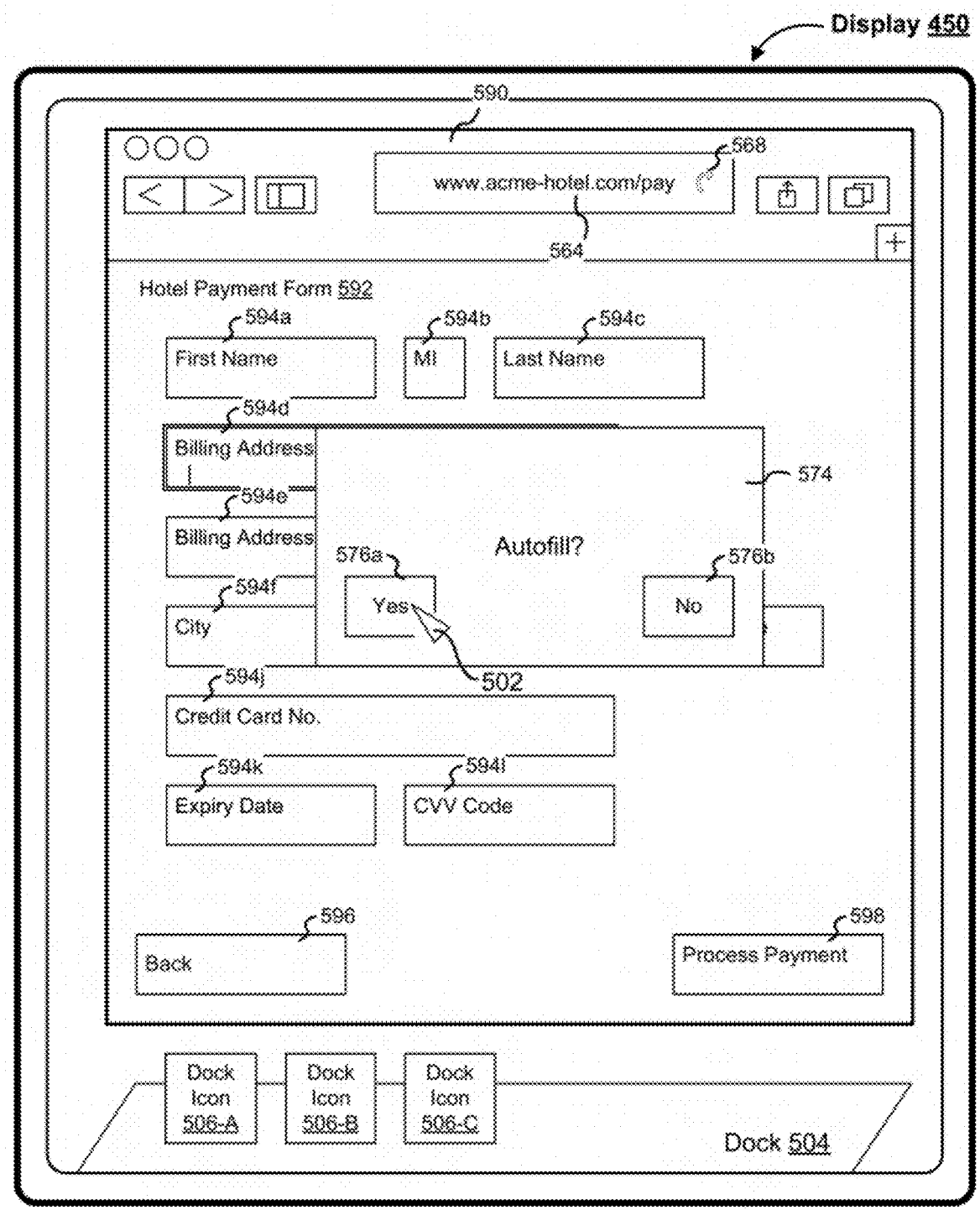
Figure 5U:
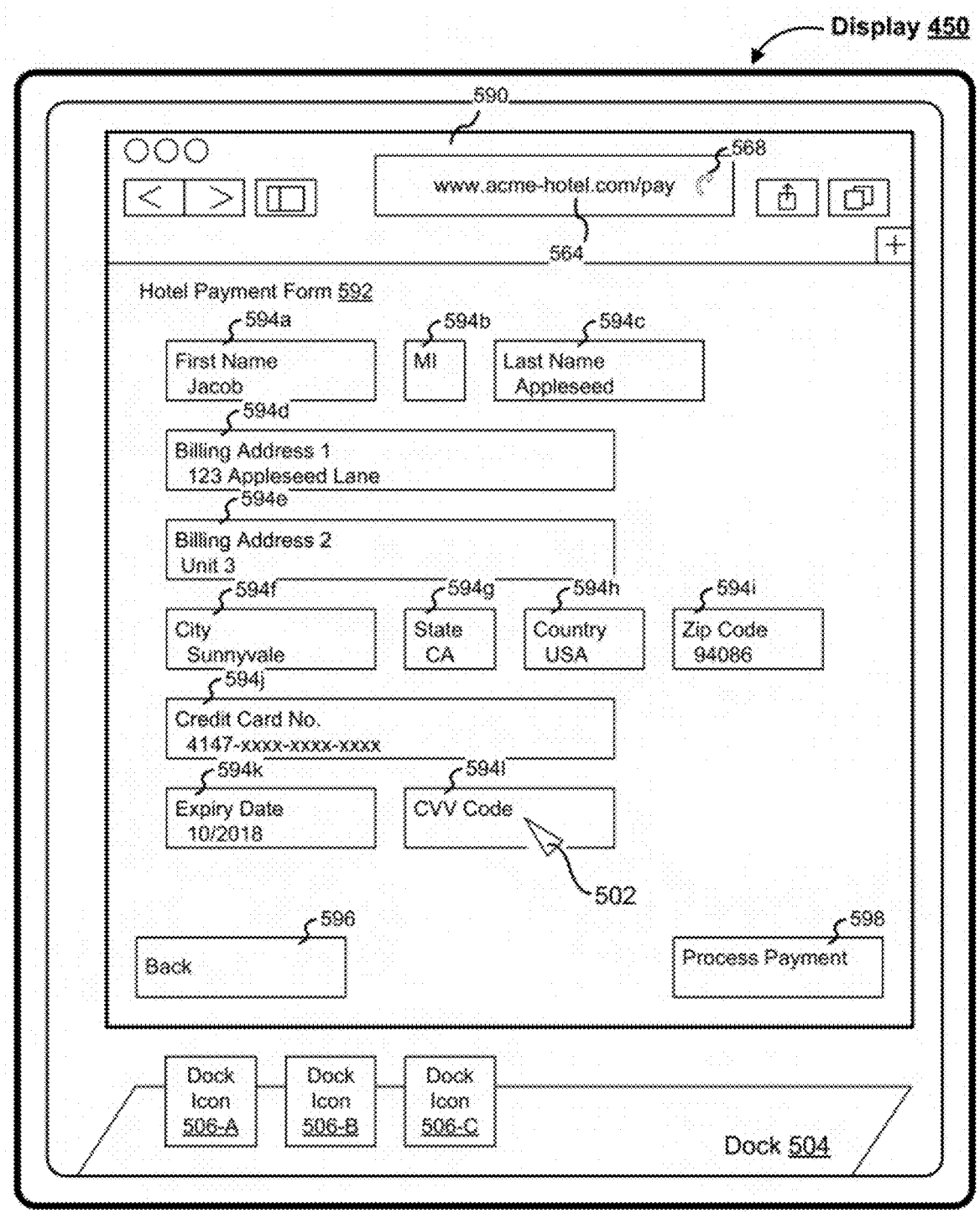
Figure 5V:
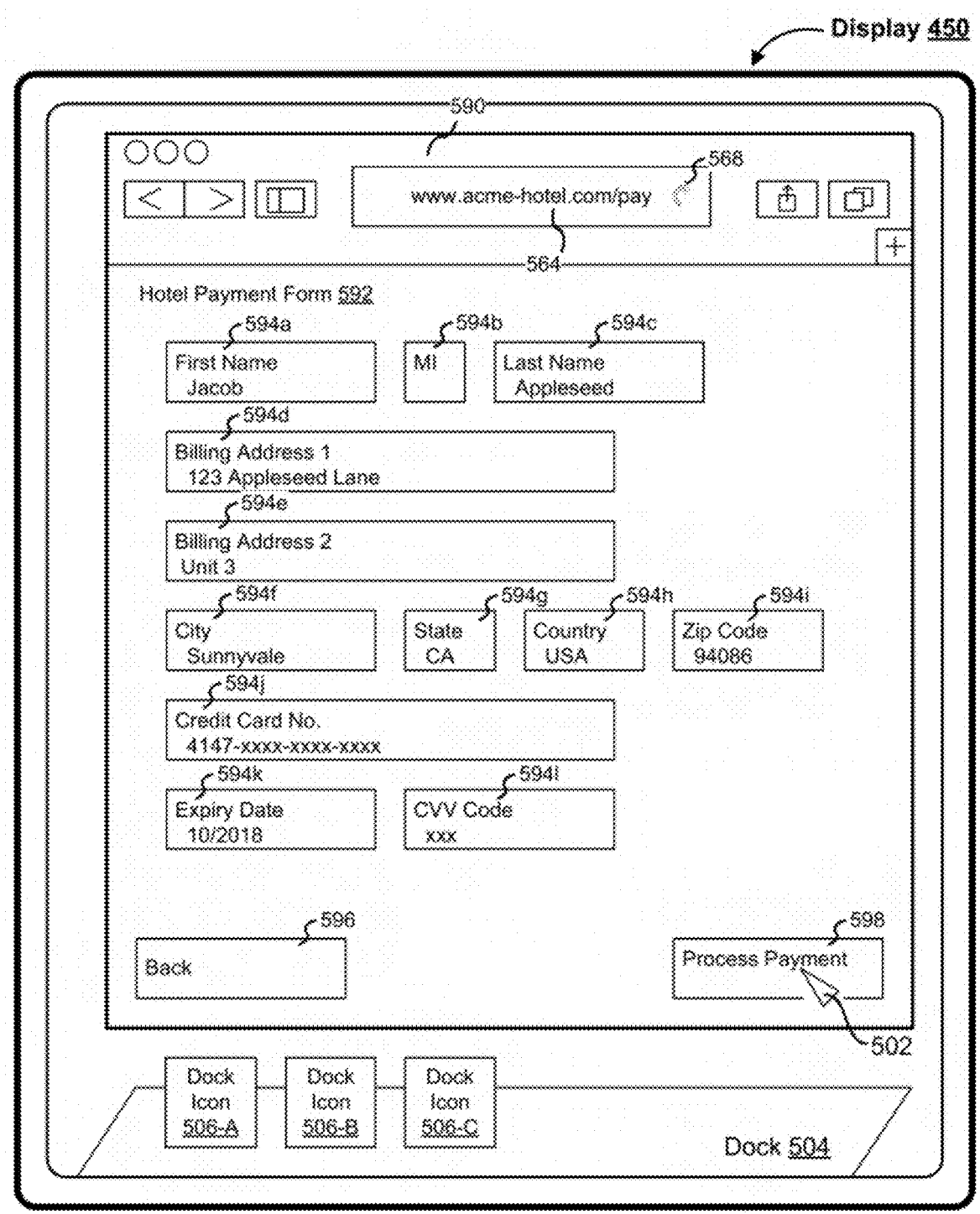

FIGS. 5S-5U illustrate a sequence in which fields 594 of a third electronic form 592 are populated based on classifications of an autofill process and contact information for the "Me" contact 517 in FIG. 5A. FIG. 5S illustrates a window 590 (e.g., for a web browser application) displaying a third electronic form 592 corresponding to the URL in the address bar 564. As shown in FIG. 5S, the address bar 564 includes a refresh affordance 568 for reloading the third electronic form 592. For example, in FIG. 5S, the third electronic form 592 corresponds to a payment form associated with a reservation process for a hotel. FIG. 5S also illustrates the focus selector 502 at a location corresponding to the first billing address field 594d within the third electronic form 592.

As shown in FIG. 5S, the third electronic form 592 includes a plurality of fields (sometimes collectively referred to as the "fields 594" herein), including: a first name field 594a, a middle initial (MI) field 594b, a last name field 594c, a first billing address field 594d, a second billing address field 594e, a city field 594f, a state field 594g, a country field 594h, a zip code field 594i, a credit card number field 594j, a credit card expiration date field 594k, and a credit card CVV code field 594l. The third electronic form 592 also includes a back affordance 596 for replacing display of the third electronic form 592 with a previous screen or web page (e.g., the second electronic form 582 in FIG. 5R), and a "Process Payment" affordance 598 for completing the reservation process for the hotel.

FIG. 5T illustrates an autofill confirmation prompt 574 overlaid on the third electronic form 592 in response to selection of the first billing address field 594d (e.g., with a single or double click) in FIG. 5S. FIG. 5T also illustrates the focus selector 502 at a location corresponding to the "Yes" affordance 576a within the autofill confirmation prompt 574.

FIG. 5U illustrates at least some of the fields 594 of the third electronic form 592 populated with contact information for the "Me" contact 517 in FIG. 5A in response to selection of the "Yes" affordance 576a (e.g., with a single or double click) in FIG. 5T. FIG. 5U also illustrates the focus selector at a location corresponding to the credit card CVV code field 594l. As shown in FIG. 5U, the fields 594 were populated with contact information for the "Me" contact 517 in FIG. 5A related to a home category (e.g., work address). However, one of the fields 594 was under filled/populated (e.g., the credit card CVV code field 594l).

FIGS. 5U-5V illustrate a sequence in which a change is made to the credit card CVV code field 594l of the third electronic form 592. FIG. 5V illustrates entry of a text string "xxx" into the credit card CVV code field 594l after selection of the credit card CVV code field 594l in FIG. 5U. As such, in this example, the user of the device 300 adds the text string "xxx" to the credit card CVV code field 594*l*. FIG. 5V also illustrates the focus selector 502 at a location corresponding to the "Process Payment" affordance 598 within the third electronic form 592.

Figure 6:
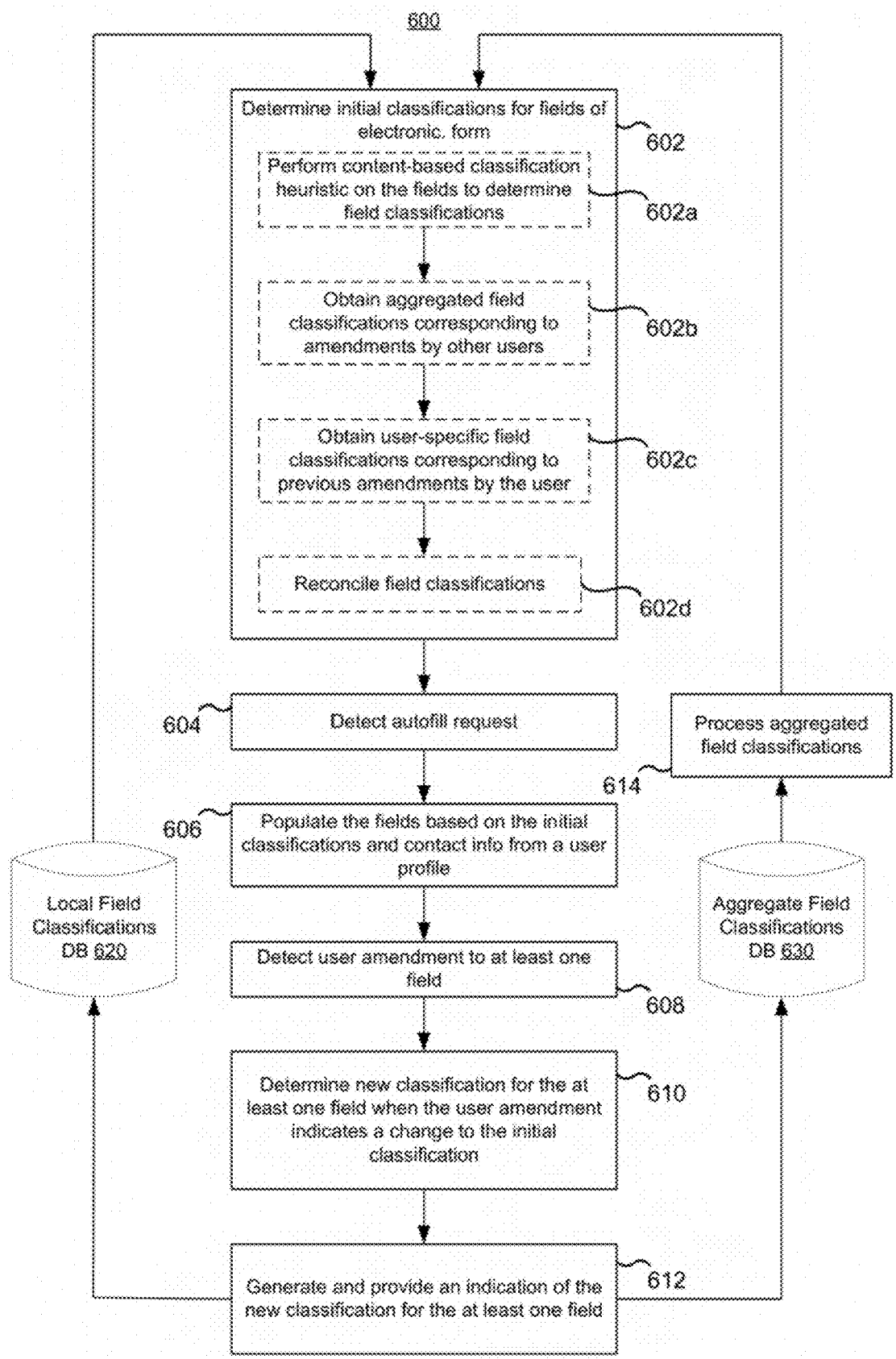
FIG. 6 is a flow diagram of a method of changing a classification for a field in an electronic form in accordance with some embodiments.

FIG. 6 is a flow diagram of a method 600 of changing a classification for a field in an electronic form in accordance with some embodiments. In various implementations, blocks 602 through 612 of the method 600 are performed by a device (e.g., the portable multifunction device 100 in FIG. 1A or the device 300 in FIG. 3). While pertinent features are shown, those of ordinary skill in the art will appreciate from the present disclosure that various other features have not been illustrated for the sake of brevity and so as not to obscure more pertinent aspects of the example implementations disclosed herein. To that end, briefly, in some circumstances, the method 300 includes: determining initial classifications for fields of an electronic form; detecting an autofill request; populating the fields of the electronic form based on the initial classifications and contact information from a user profile; detecting a user amendment to at least one field; determining a new classification for the at least one field when the user amendment indicates a change to the initial classification for the at least one field; and generating and providing an indication of the new classification for the at least one field.

As represented by block 602, the method 600 includes determining initial classifications for fields of an electronic form. In some embodiments, at least some of the fields are text input fields. In some embodiments, at least some of the fields are associated with a drop list of input options. For example, the electronic form corresponds to a web page. In some embodiments, with reference to FIG. 1A, the device (e.g., the portable multifunction device 100 in FIG. 1A or the device 300 in FIG. 3) or a component thereof (e.g., the browser module 147) determines a classification for each of the fields such as first name field, last name field, address field, email field, telephone field, or the like.

In some embodiments, as represented by block 602*a*, the method 600 optionally includes performing a content-based classification heuristic on the fields of the electronic form to determine classifications for each of the fields. In some embodiments, the content-based classification heuristic determines a classification for each field of the electronic form based on its relationship to other fields (e.g., a last name or middle initial field might be adjacent or proximate to a first name), location (e.g., a name field is more likely to be at the top of a form), size (e.g., a smaller field area-wise might be a state field and a larger field area-wise might be an address field), name, accompanying markup (e.g., a state or country field might be associated with a drop down menu), field identifiers (e.g., a first name field may be named "firstname" in the markup), static text nearby the field, and/or the like.

In some embodiments, as represented by block 602*b*, the method 600 optionally includes obtaining aggregated field classifications corresponding to amendments by other users. In some embodiments, the device (e.g., the portable multifunction device 100 in FIG. 1A or the device 300 in FIG. 3) or a component thereof (e.g., the browser module 147) obtains (e.g., receives or retrieves) aggregated field classifications corresponding to amendments by other users from the aggregate field classification database 630.

In some embodiments, as represented by block 602*c*, the method 600 optionally includes obtaining user-specific field classifications corresponding to previous amendments by the user. In some embodiments, the device (e.g., the portable multifunction device 100 in FIG. 1A or the device 300 in FIG. 3) or a component thereof (e.g., the browser module 147) obtains (e.g., receives or retrieves) user-specific field classifications corresponding previous amendments by the user of the device from the local field classification database 620.

In some embodiments, as represented by block 602*d*, the method 600 optionally includes reconciling the field classifications. In some embodiments, the device (e.g., the portable multifunction device 100 in FIG. 1A or the device 300 in FIG. 3) or a component thereof (e.g., the browser module 147) reconciles field classification conflicts between field classifications from blocks 602, 602*b*, and 602*c*. In some embodiments, aggregated and user-specific field classifications supersede field classifications determined by the content-based classification heuristic. In some embodiments, user-specific field classifications supersede aggregated field classifications.

As represented by block 604, the method 600 includes detecting an autofill request. In some embodiments, the initial classifications for the field are determined prior to detecting the autofill request. In some embodiments, the initial classifications for the field are determined in response to detecting the autofill request. For example, in FIG. 5D, selection of the "Yes" affordance 576*a* within the autofill prompt 574 causes population of at least some of the fields of the first electronic form 562 in 5E.

As represented by block 606, the method 600 includes populating the fields of the electronic form based on the initial classifications and contact information from a user profile. For example, in FIG. 5E, at least some of the fields of the first electronic form 562 are populated in response to selection of the "Yes" affordance 576*a* within the autofill prompt 574 in FIG. 5D.

As represented by block 608, the method 600 includes detecting a user amendment to at least one field. In some embodiments, the user amendment/correction changes a text string filled/populated into the at least one field by the autofill process. For example, the user amendment/correction changes the text string by overwriting (replacing), deleting, modifying, or adding text to a portion of the text string. FIGS. 5E-5G, for example, show a sequence in which changes are made to text strings filling/populating some of the fields 566 of the first electronic form 562. For example, "Unit 3" is added to the second shipping address field 566*f*, which was previously empty. As another example, "appleseed@home.com" replaces the previous text string that populated the email address field 566*k*. As yet another example, "+1.408.123.4663" replaces the previous text string that populated the telephone number field 566*l*.

As represented by block 610, the method 600 includes determining a new classification for the at least one field when the user amendment indicates a change to the initial classification for the at least one field. In some embodiments, the new classification is determined by matching the user amendment to a different piece of information in the user profile (e.g., the "Me" contact 517 in FIG. 5A). In some embodiments, the new classification is determined based on a rule set. For example, an email address is identified based on the inclusion of the "@" character, a first name is identified based on the inclusion of only alphabetic characters, and an address is identified based on the inclusion of both alphabetic and numeric characters. According to some embodiments, the new classification is used for subsequent visits to the electronic form to avoid similar user amendments.

As represented by block 612, the method 600 includes generating and providing an indication of the new classification for the at least one field. In some embodiments, an indication of the new classification is generated by the device. For example, with reference to FIG. 7, the representative indication 702 of a user amendment/correction to a respective field of an electronic form includes a fingerprint portion 704 that characterizes the respective field and a classification portion 708 associated with the classification of the respective field (e.g., the new classification). In some embodiments, the indication of the new classification is provided to the local field classification database 620 and/or the aggregate field classification database 630. In some embodiments, the indication of the new classification for the at least one field is provided to the aggregate field classification database 630 when the domain associated with the electronic form that includes the at least one field satisfies a popularity criterion.

In some embodiments, as represented by block 614, the method 600 optionally includes processing the aggregated field classifications stored in the aggregate field classification database 630. In some embodiments, a remote server with one or more processors and memory maintains the aggregate field classification database 630. In some embodiments, the remote server processes the indications stored in the aggregate field classification database 630. As one example, the remote server only pushes aggregate/crowd-sourced indications to the device when the frequency threshold is satisfied. For example, the frequency threshold is satisfied when a same amendment to a field is reported by X users, where X is scaled based on the popularity of the associated domain.

In some embodiments, the remote server is a server that is operated at the direction of an entity that is responsible for creation of the web browser (e.g., a company that created the web browser). In some embodiments, the remote server is a server that is under the control of a third party such as a writer of an autofill extension or plugin. In some embodiments, the remote server is under the control of a party who controls the network in which the electronic device operates (e.g., a corporate or educational intranet).

Figure 7:
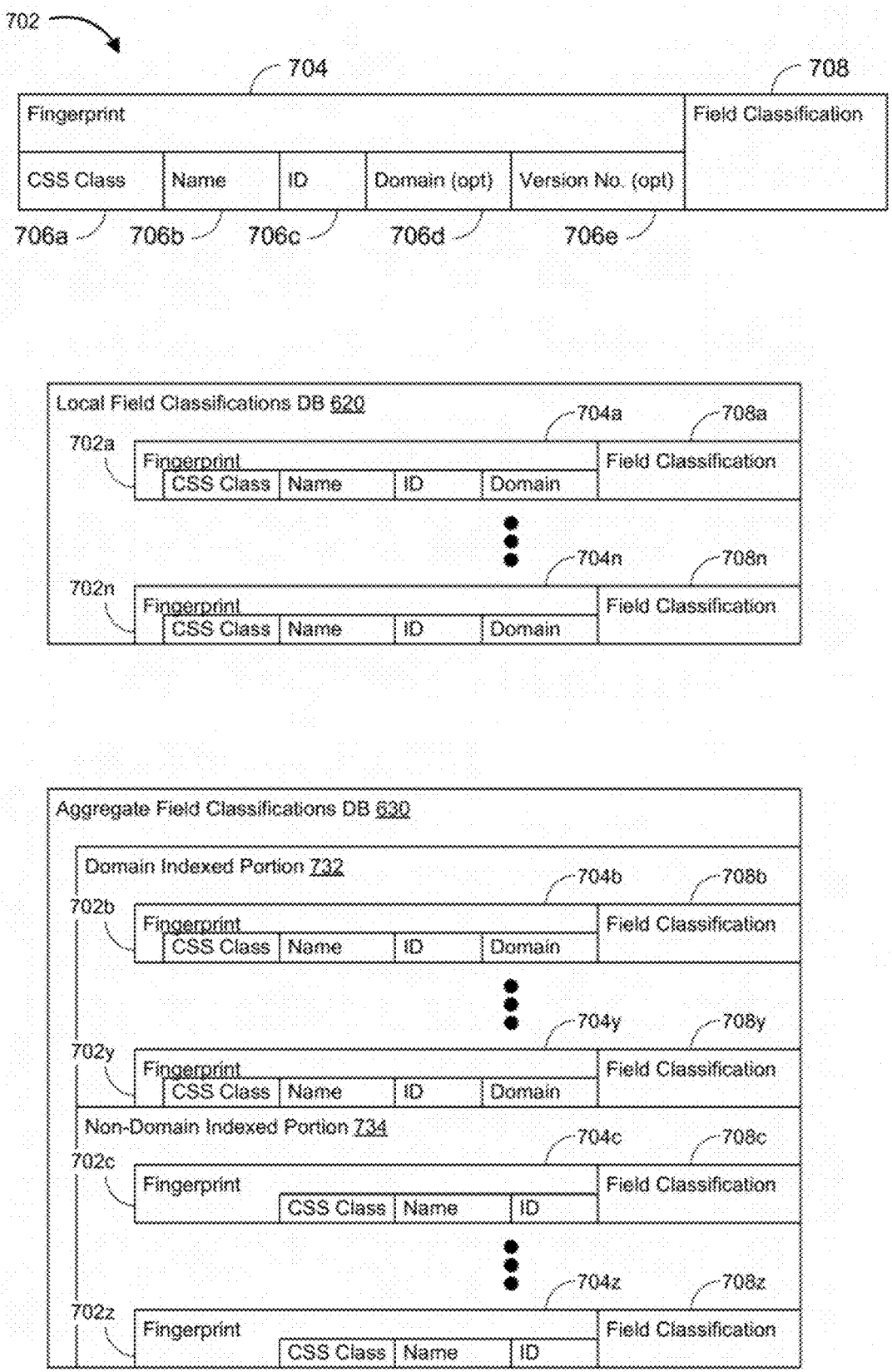
FIG. 7 illustrates block diagrams of data structures in accordance with some embodiments.

FIG. 7 illustrates block diagrams of data structures associated with the flow diagram in FIG. 6 in accordance with some embodiments. As shown in FIG. 7, according to some embodiments, a representative indication 702 of a user amendment/correction to a respective field of an electronic form includes a fingerprint portion 704 that characterizes the respective field and a classification portion 708 associated with the classification of the respective field such as first name field, last name field, address field, email address field, telephone number field, or the like.

In some embodiments, the fingerprint portion 704 is a function of one or more attributes associated with the respective field. For example, the fingerprint portion 704 is a value, which is a hash of the one or more attributes. Thus, according to some embodiments, the fingerprint portion 704 is anonymized in order to safeguard the identity of the user. In some embodiments, the one or more attributes (sometimes collectively referred to as the "attributes 706" herein) include at least one of: a CSS (cascading style sheet) class 706a for the respective field; a name 706b for the respective field; an identifier (ID) or identification value 706c for the respective field; a domain 706d (e.g., a host name, a uniform resource locator (URL), an IP address, or the like) associated with the electronic form that includes the respective field; and a version number 706e associated with the web browser or the content-based classification heuristic.

As shown in FIG. 7, according to some embodiments, the local field classification database 620 includes a plurality of indications 702a, . . . , 702n of user amendments/corrections made by the user of the device (e.g., the portable multifunction device 100 in FIG. 1A or the device 300 in FIG. 3). For example, the plurality of indications 702a, . . . , 702n include fingerprint portions 704a, . . . , 704n and field classification portions 708a, . . . , 708n. As one example, each of the fingerprint portions 704a, . . . , 704n is a functions of CSS class, name, ID, and domain attributes.

As shown in FIG. 7, according to some embodiments, the aggregate field classification database 630 includes a domain indexed portion 732 and a non-domain indexed portion 734. In FIG. 7, the domain indexed portion 732 includes a plurality of indications 702b, . . . , 702y of user amendments/corrections made by the user of the device (e.g., the portable multifunction device 100 in FIG. 1A or the device 300 in FIG. 3). For example, the plurality of indications 702b, . . . , 702y include fingerprint portions 704b, . . . , 704y and field classification portions 708b, . . . , 708y. As one example, each of the fingerprint portions 704b, . . . , 704y is a functions of CSS class, name, ID, and domain attributes.

In FIG. 7, the non-domain indexed portion 734 includes a plurality of indications 702c, . . . , 702z of user amendments/corrections made by the user of the device (e.g., the portable multifunction device 100 in FIG. 1A or the device 300 in FIG. 3). For example, the plurality of indications 702c, . . . , 702z include fingerprint portions 704c, . . . , 704z and field classification portions 708c, . . . , 708z. As one example, each of the fingerprint portions 704c, . . . , 704z is a functions of CSS class, name, and ID attributes.

As such, in FIG. 7, the fingerprint portions 704b, . . . , 704y associated with the plurality of indications 702b, . . . , 702y in the domain indexed portion 732 includes the domain attribute, and the fingerprint portions 704c, . . . , 704z associated with the plurality of indications 702c, . . . , 702z in the non-domain indexed portion 734 do not include the domain attribute.

Figure 8A:
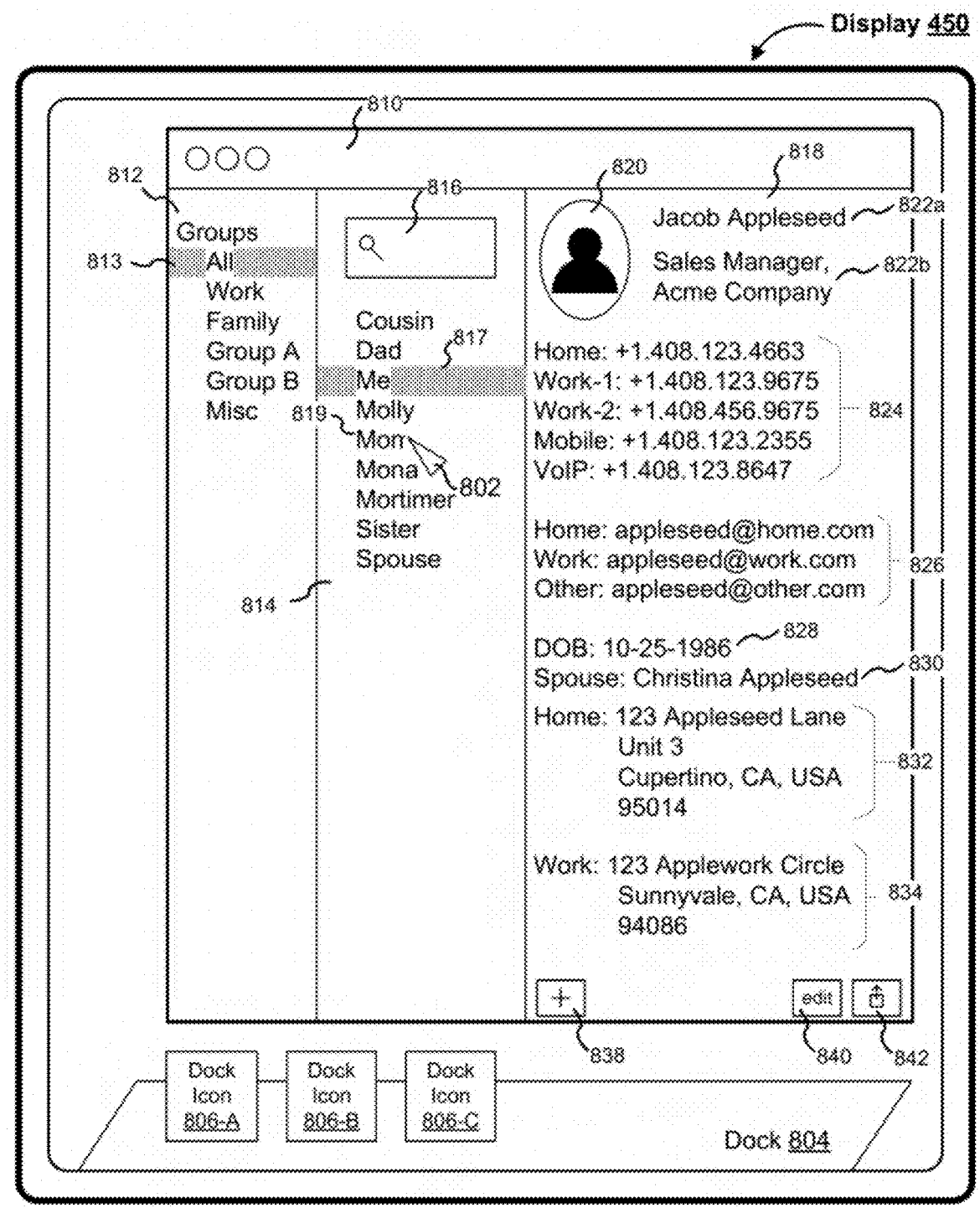
FIGS. 8A-8W illustrate example user interfaces for populating fields of an electronic form in accordance with some embodiments.
Figure 8B:
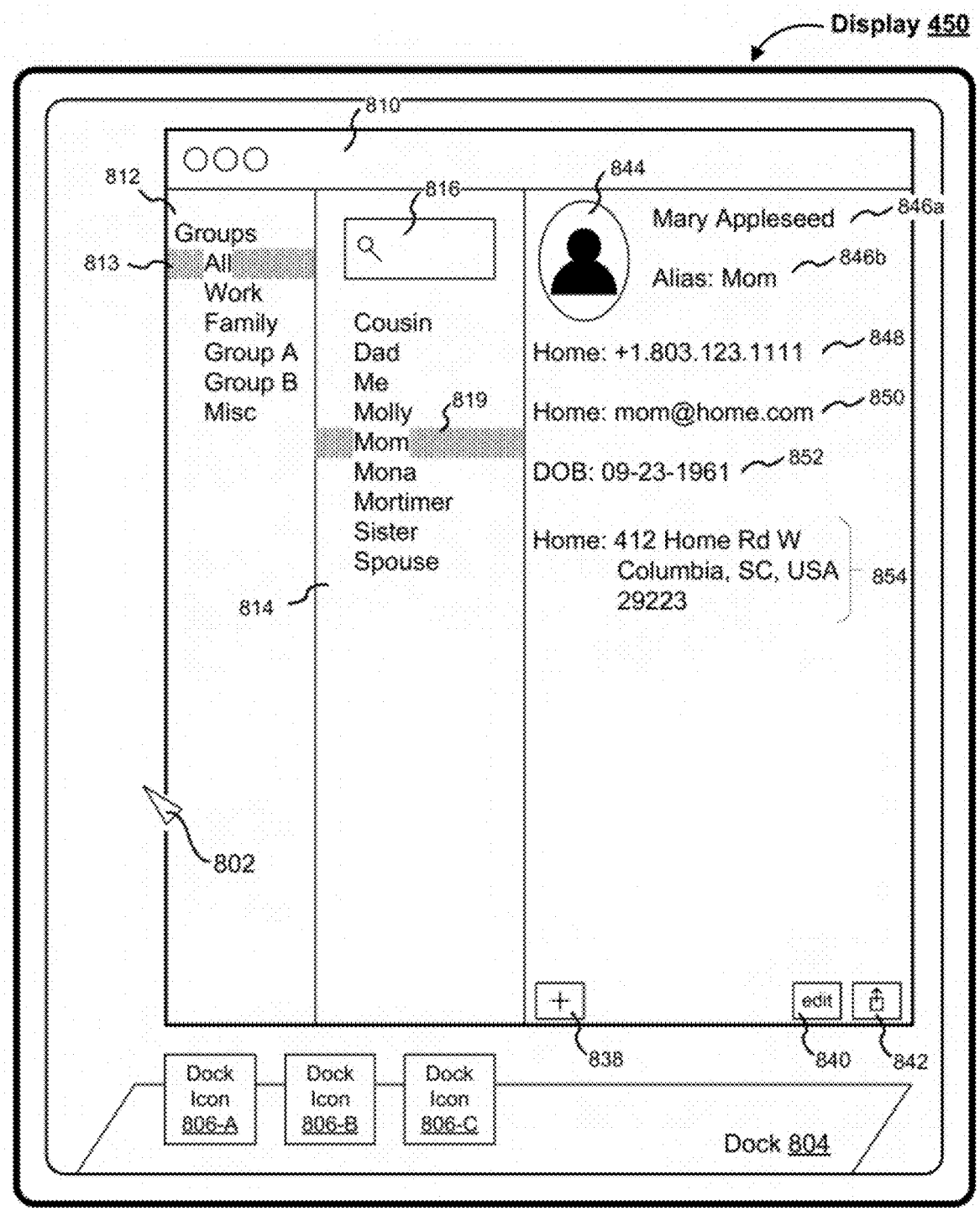
Figure 8C:
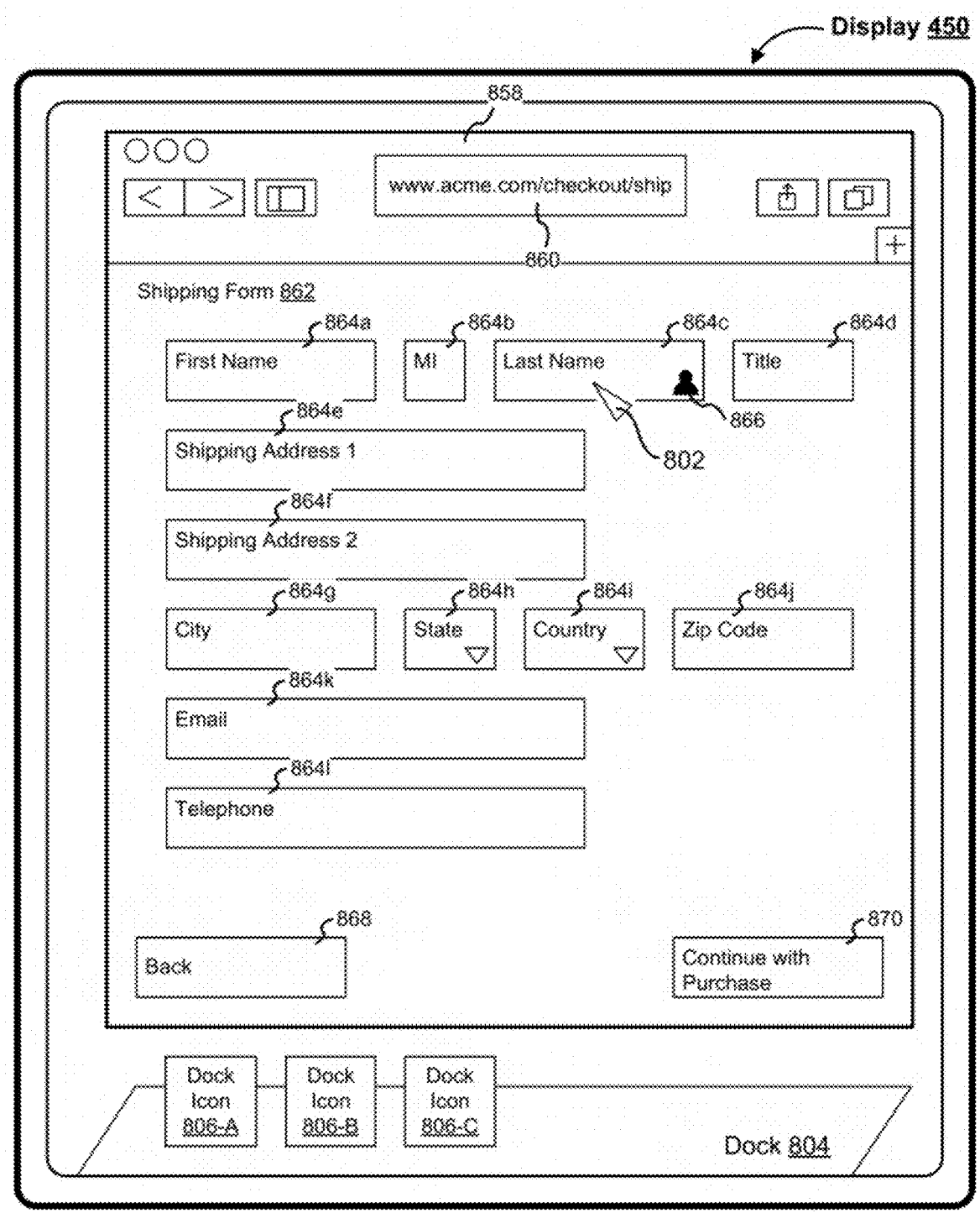
Figure 8D:
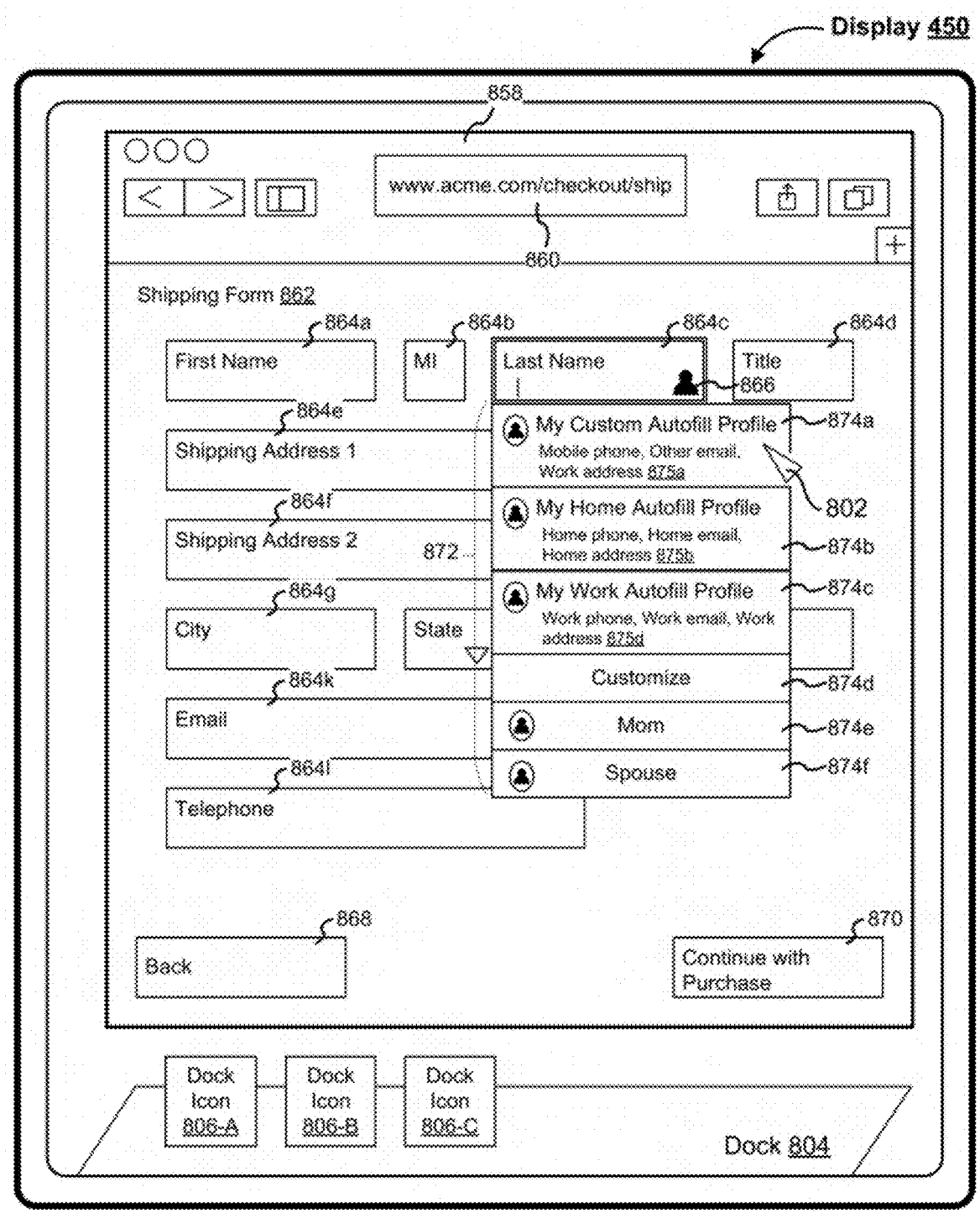
Figure 8E:
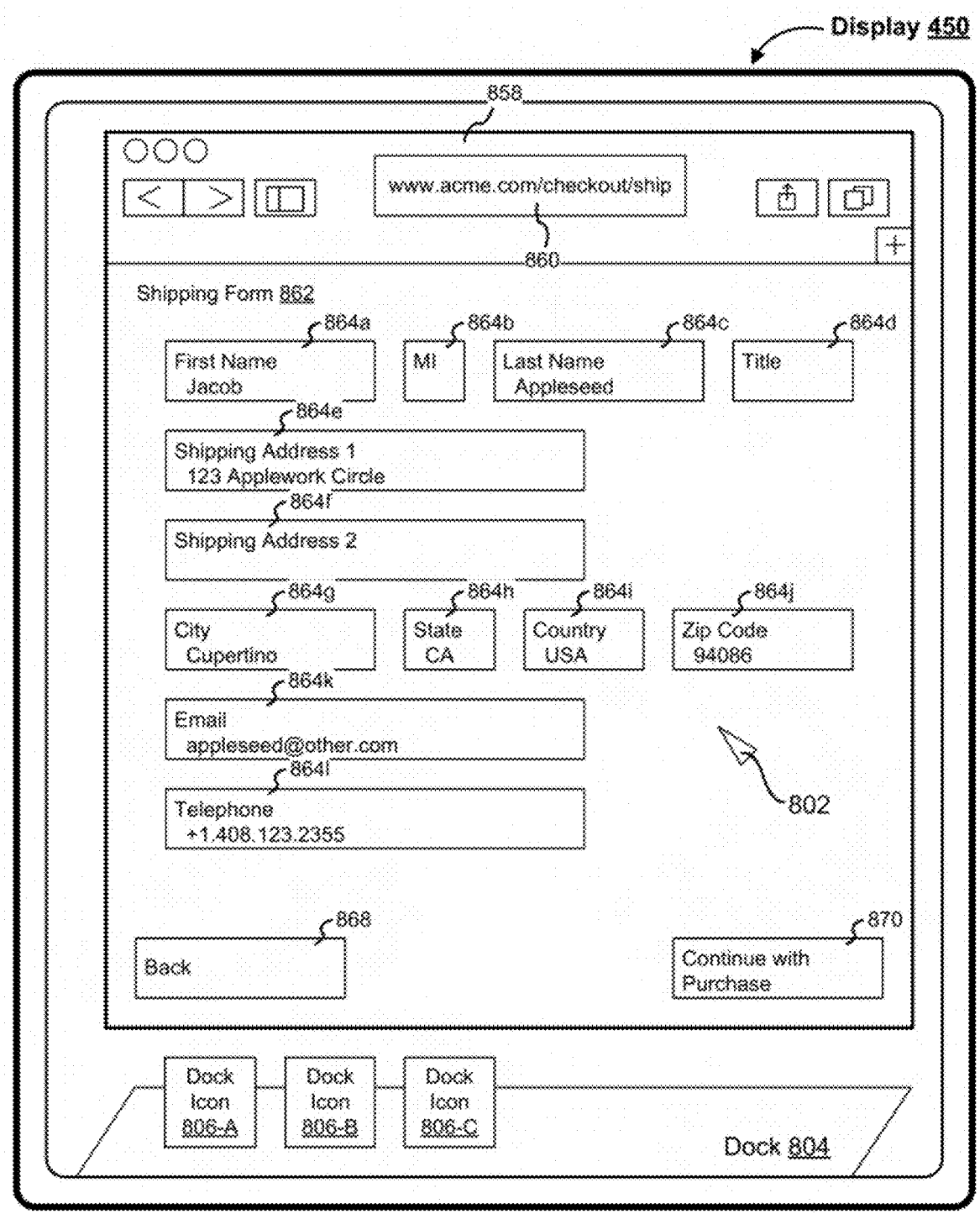
Figure 8F:
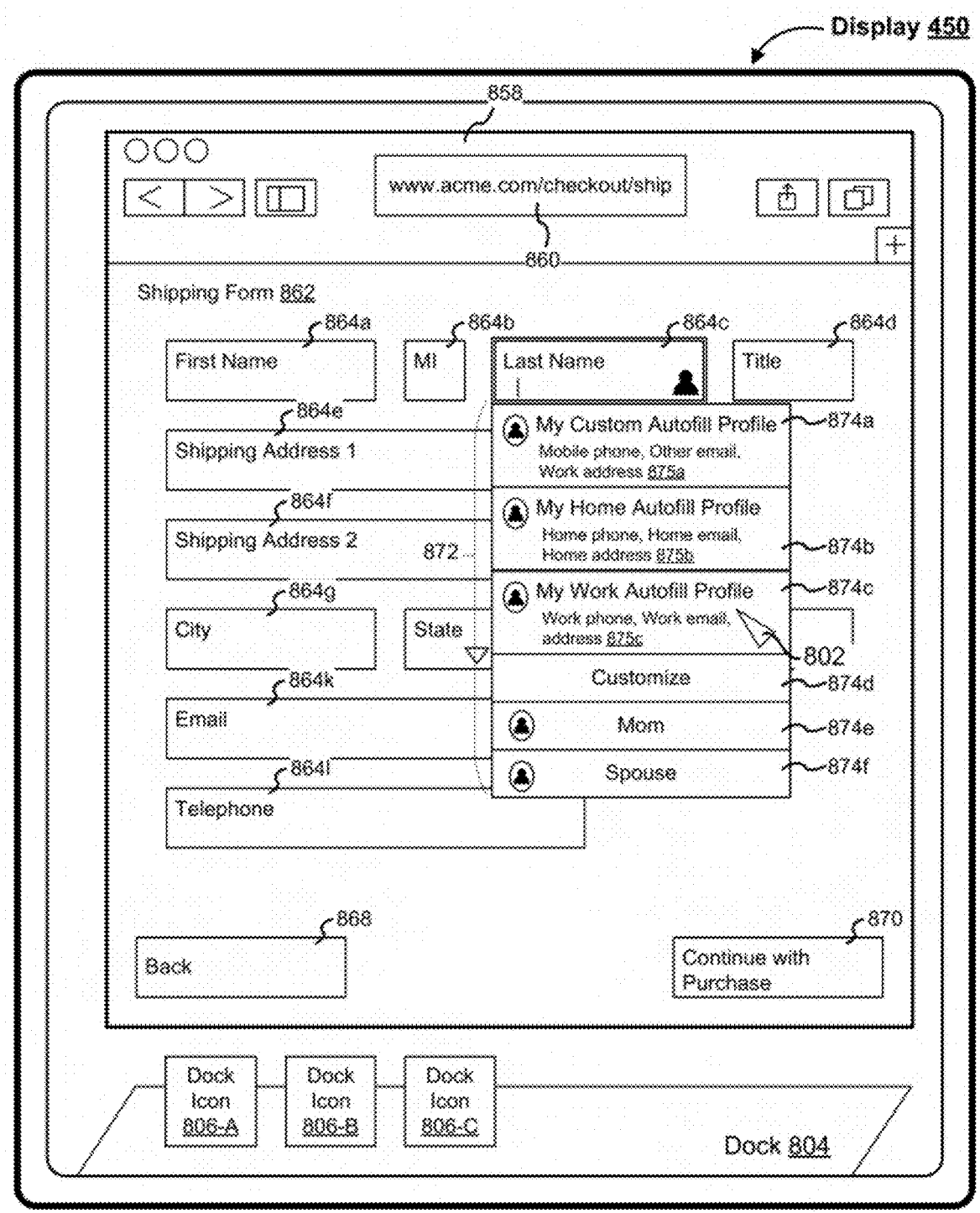
Figure 8G:
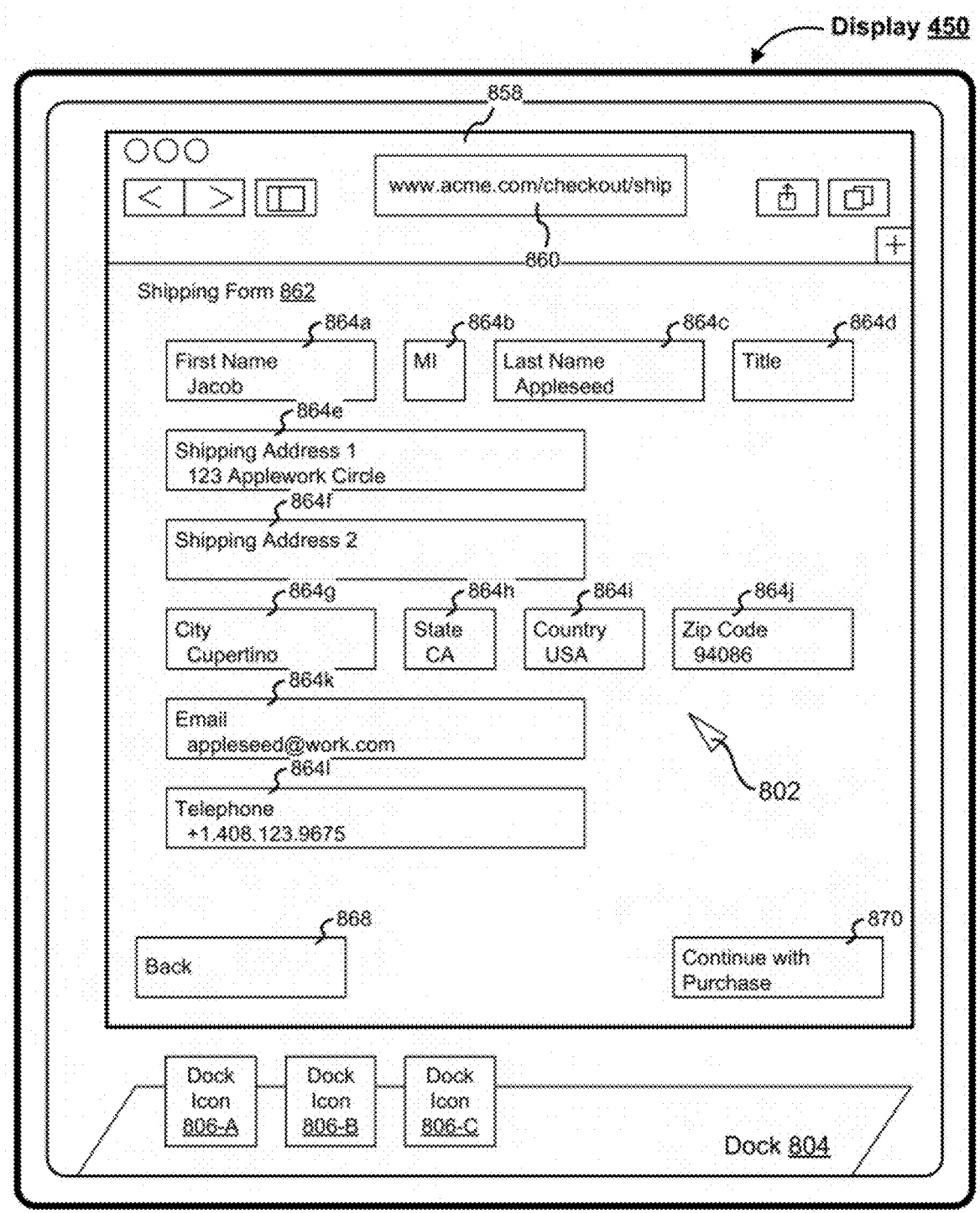
Figure 8H:
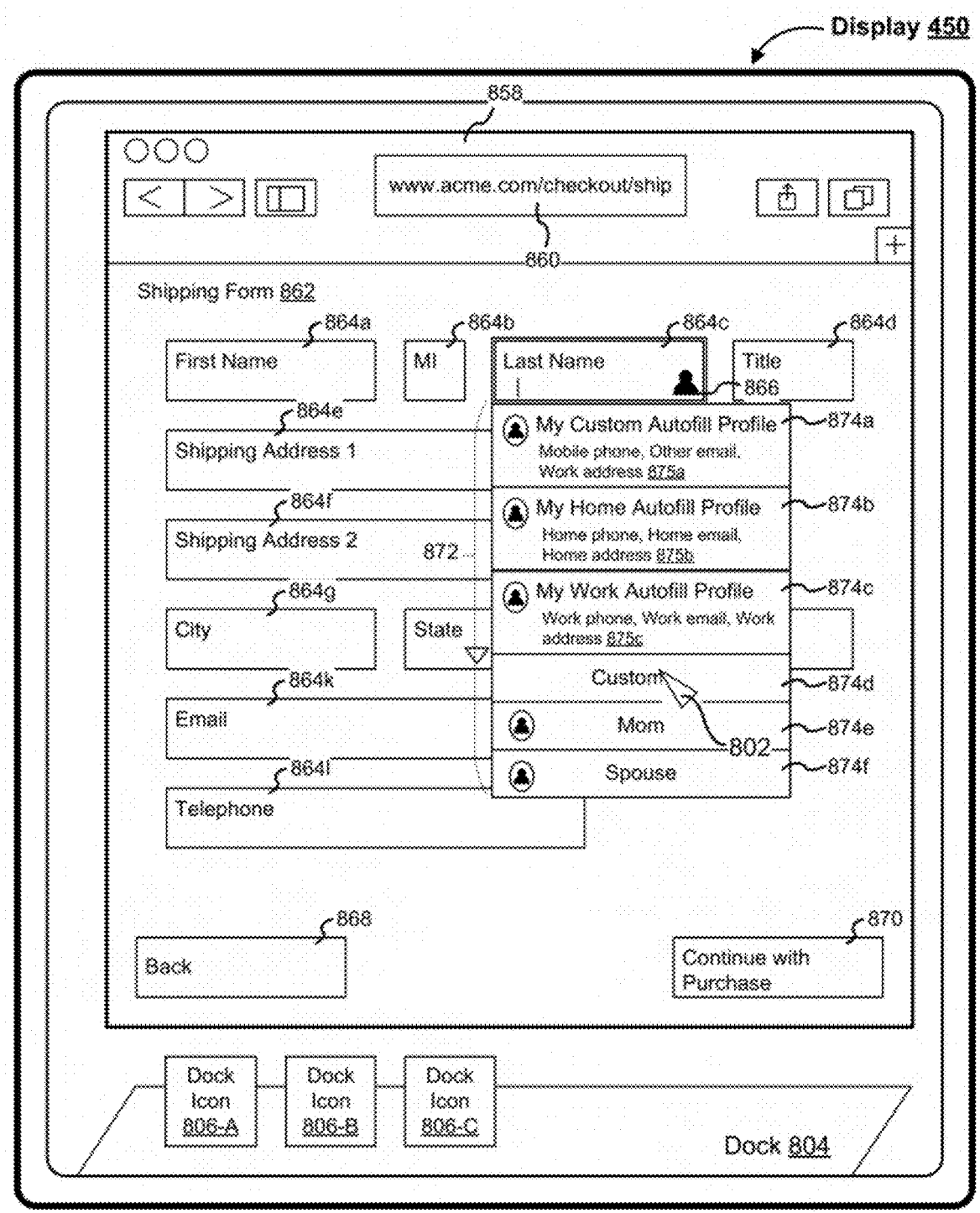
Figure 8I:
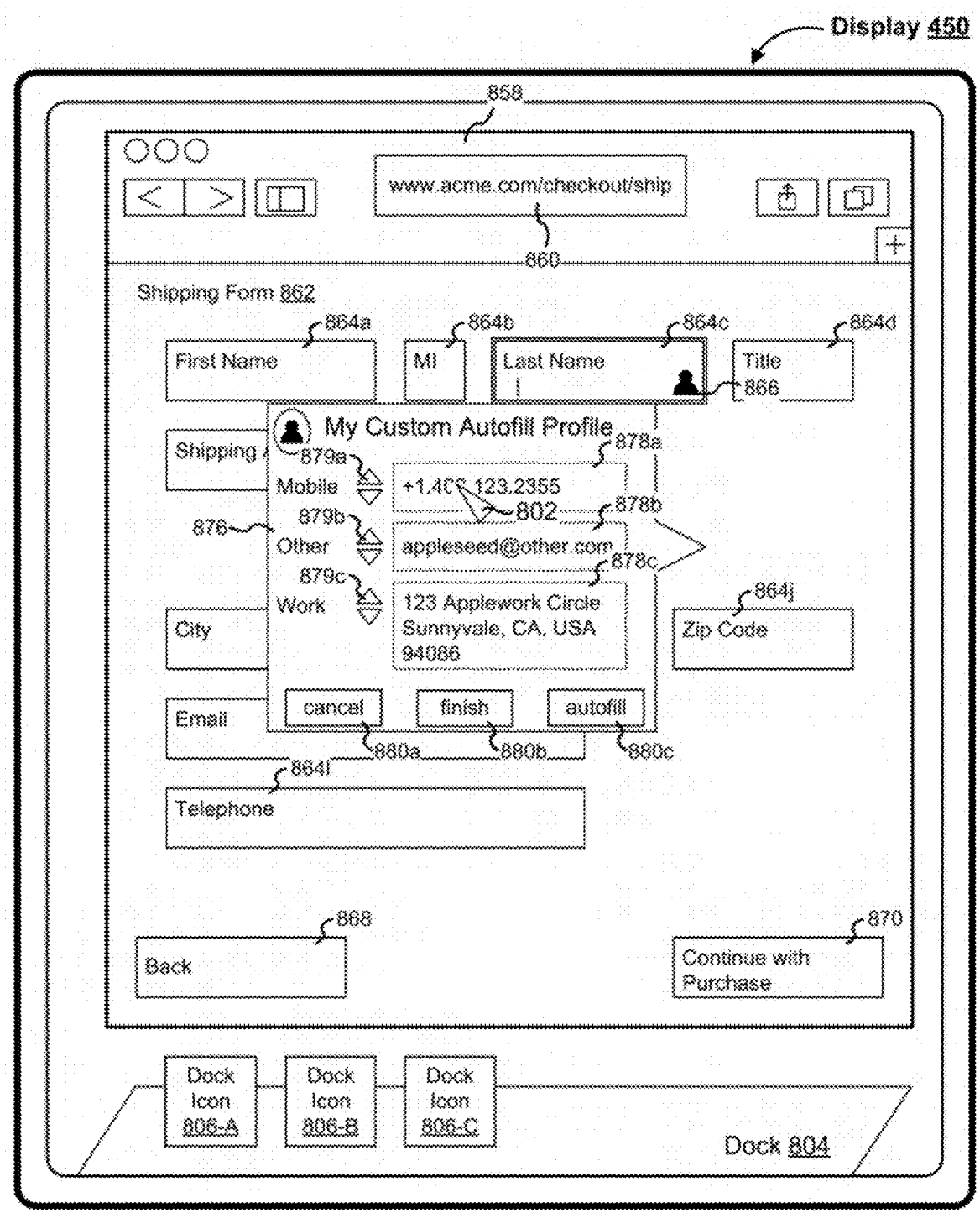
Figure 8J:
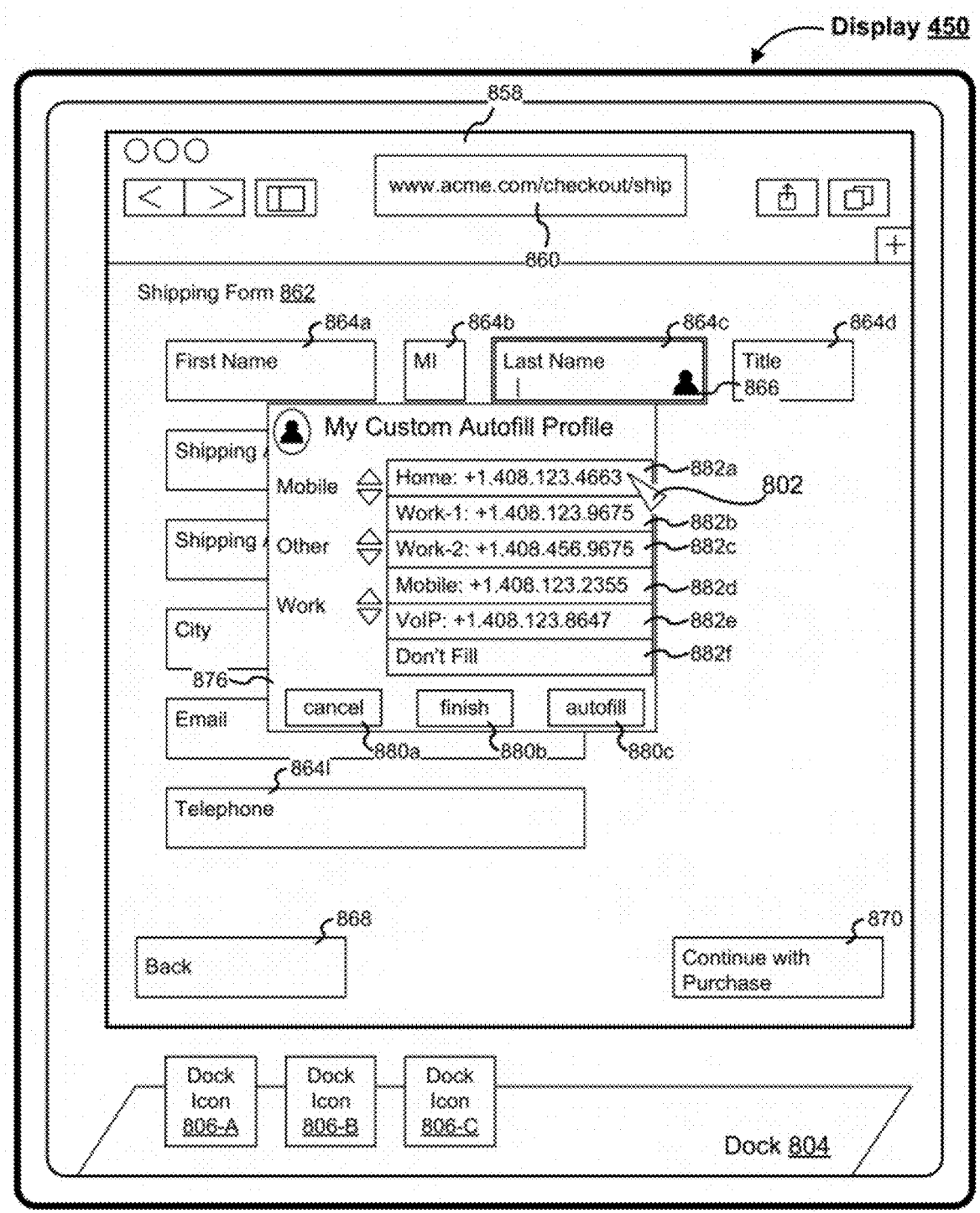
Figure 8K:
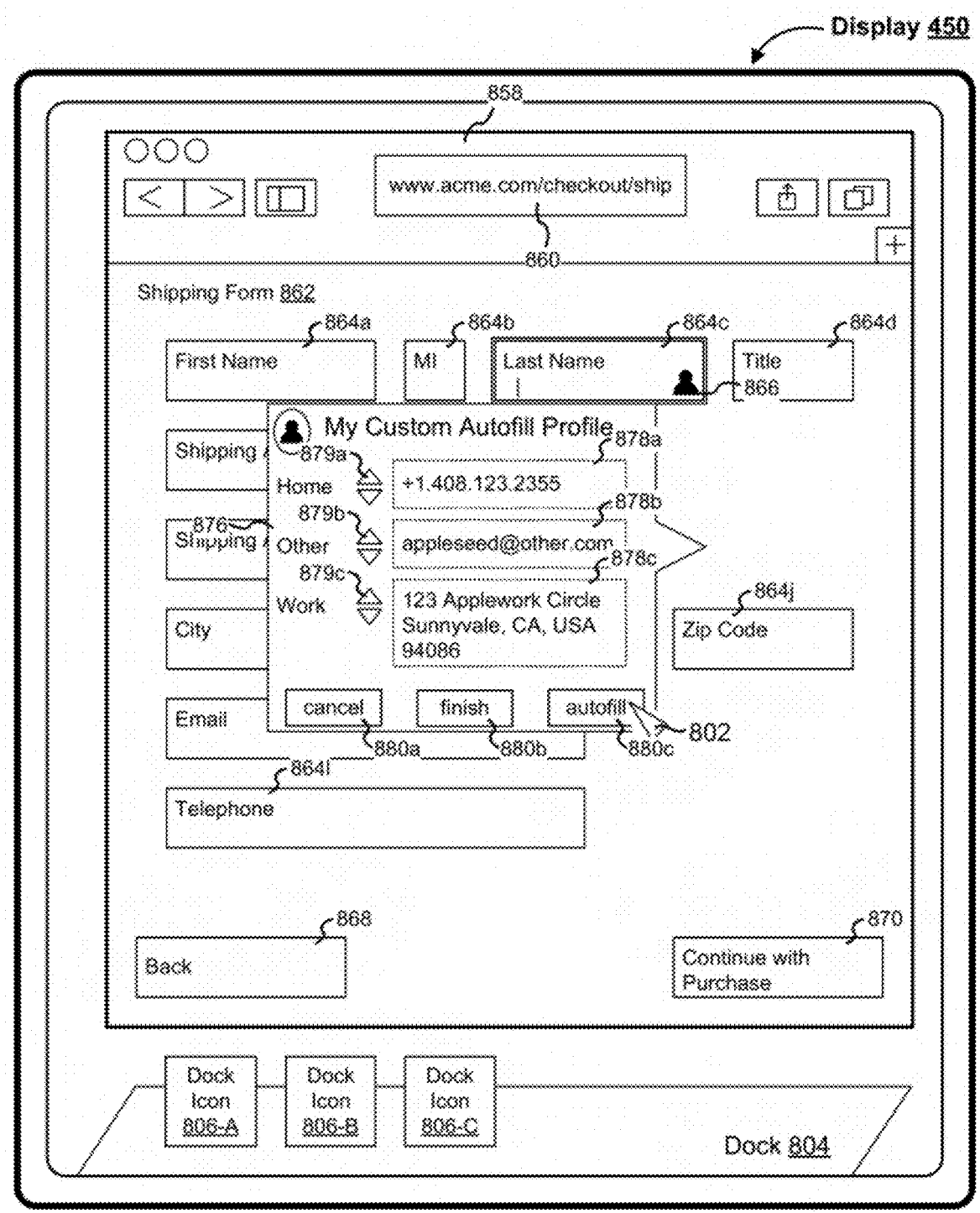
Figure 8L:
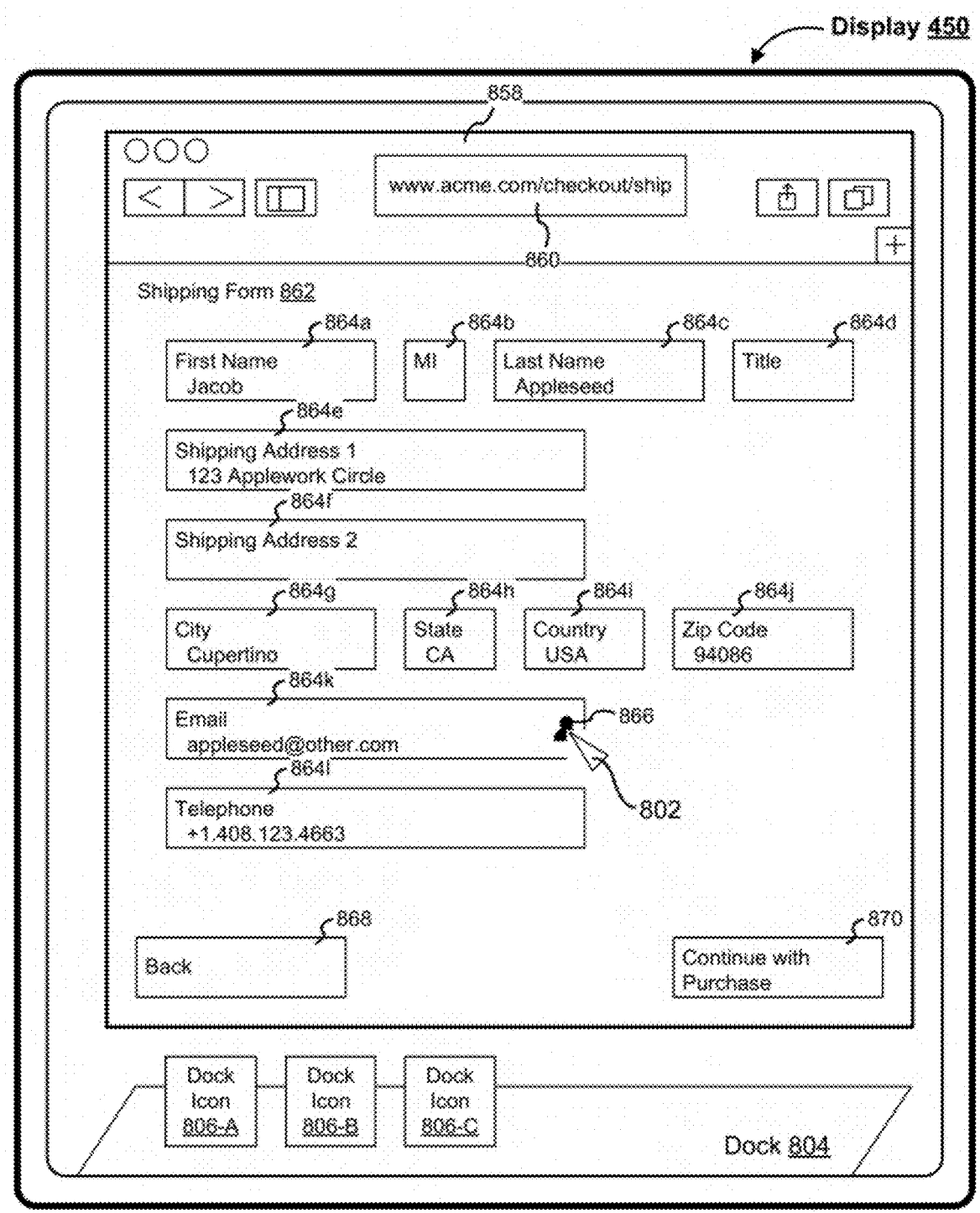
Figure 8M:
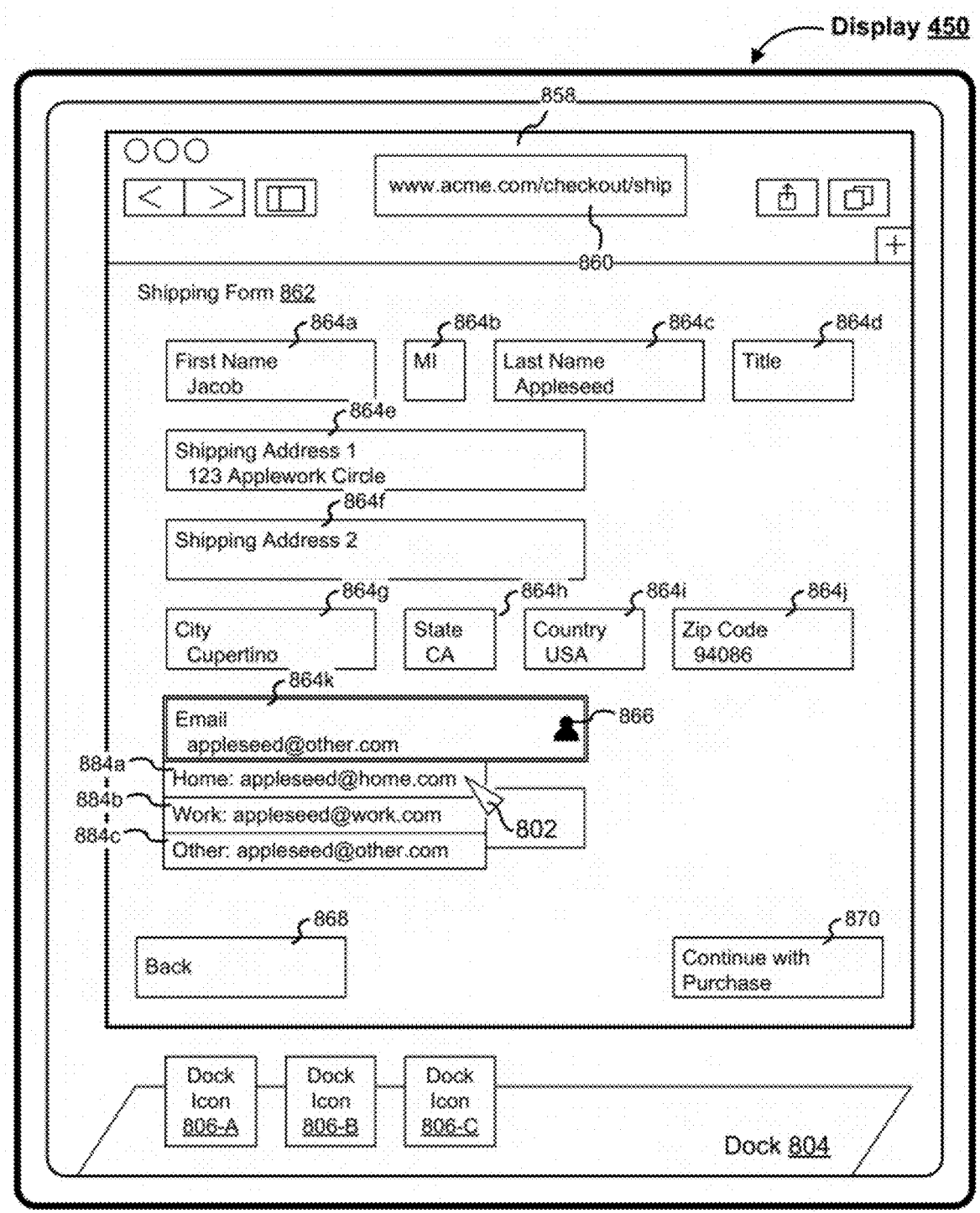
Figure 8N:
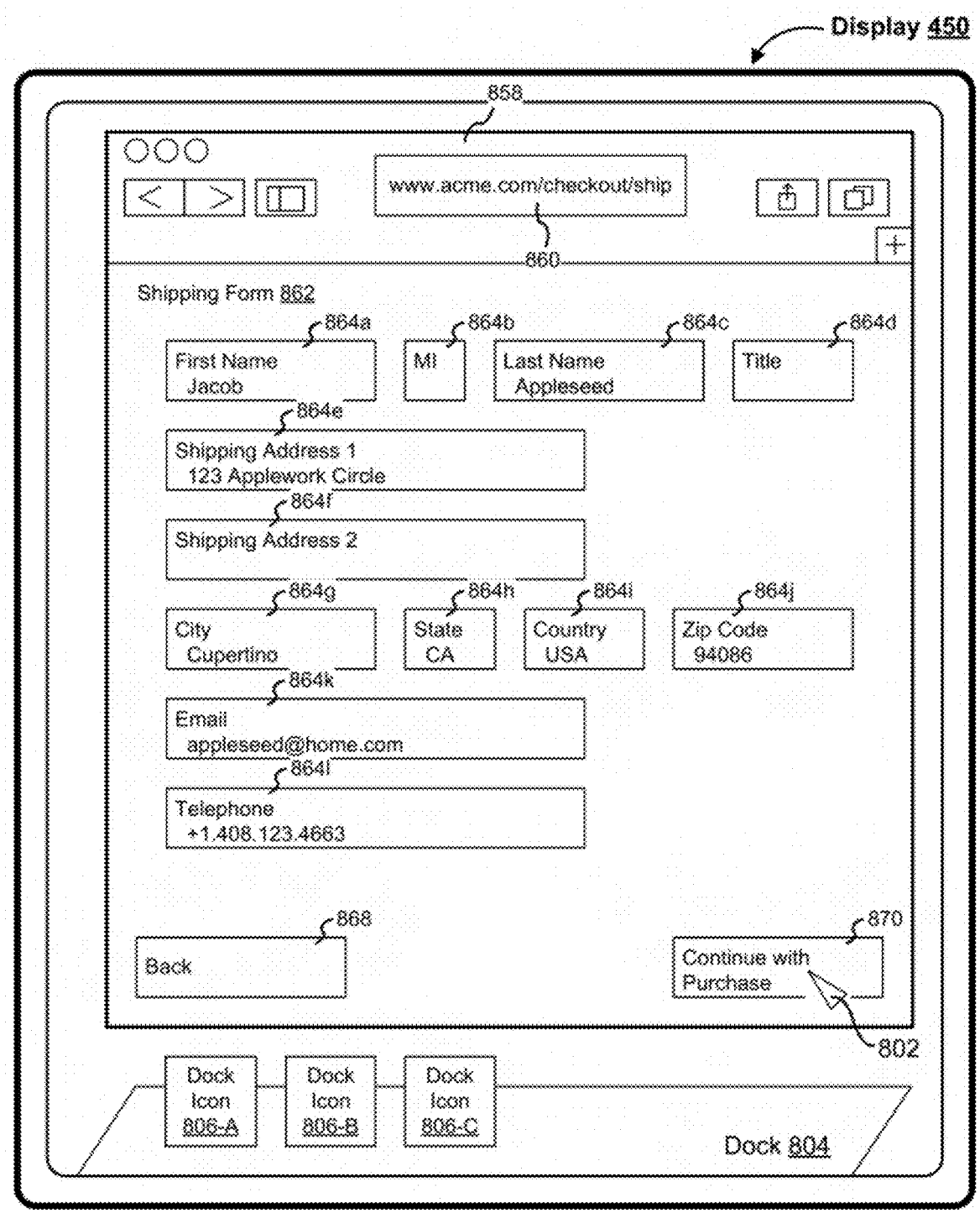
Figure 8O:
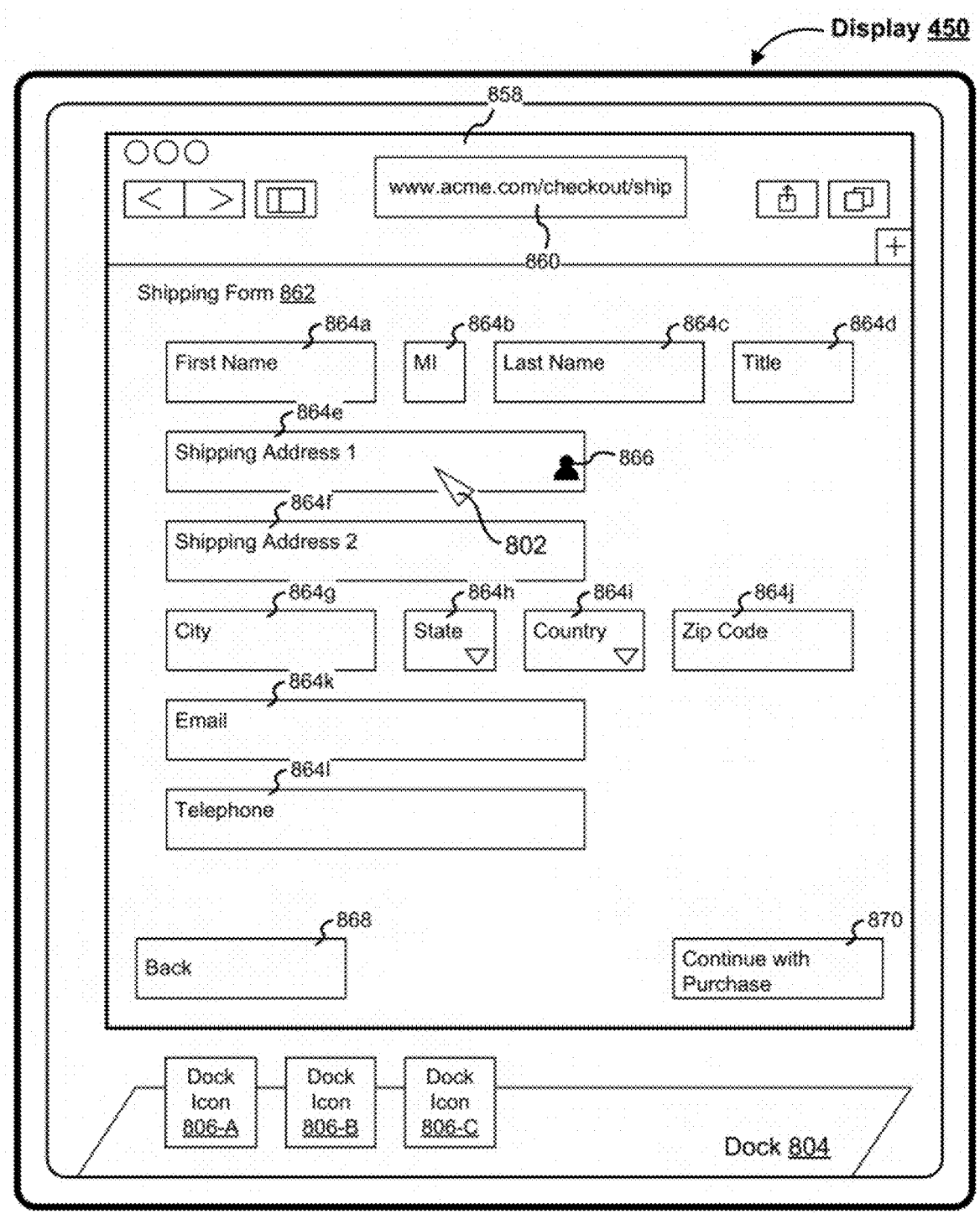
Figure 8P:
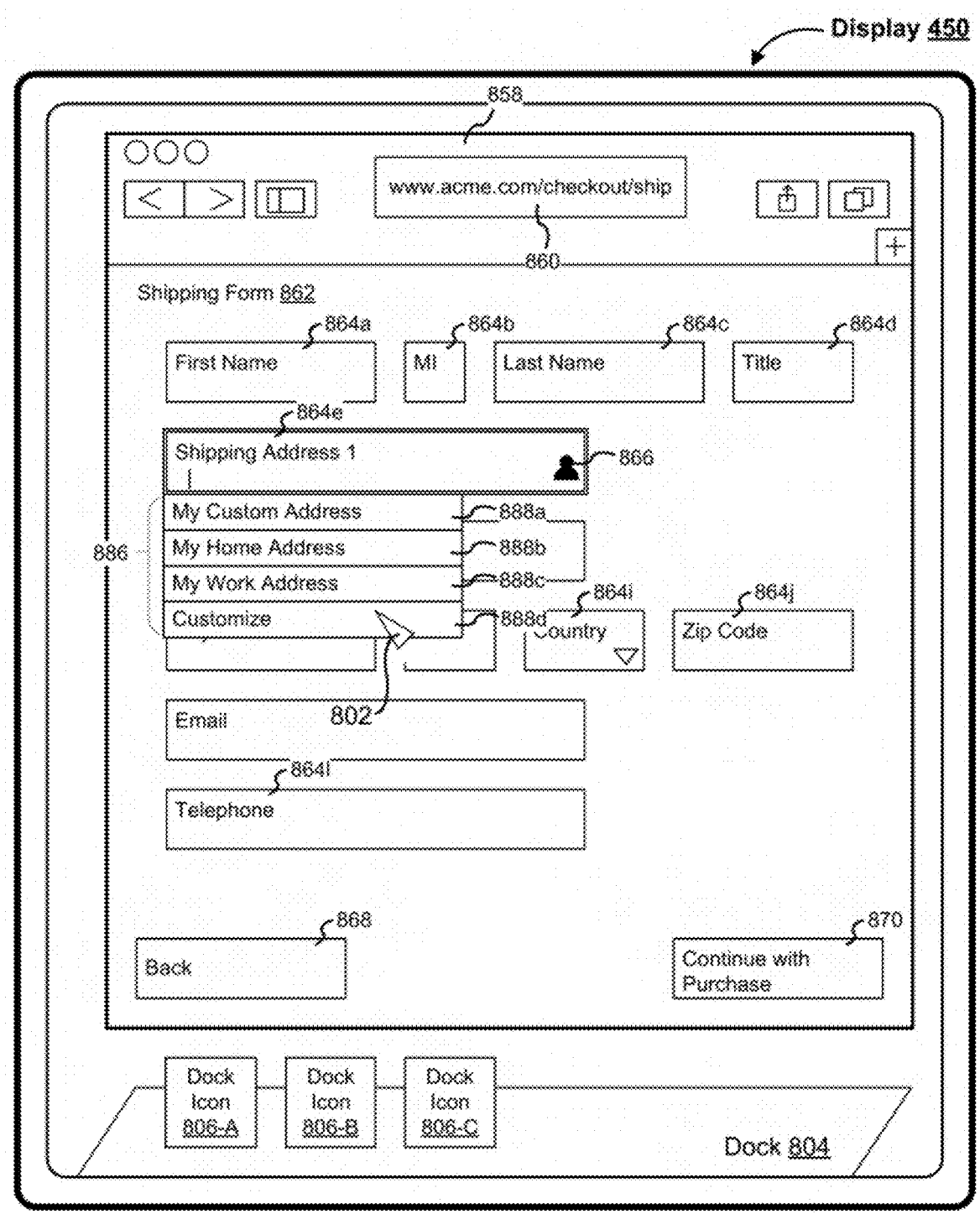
Figure 8Q:
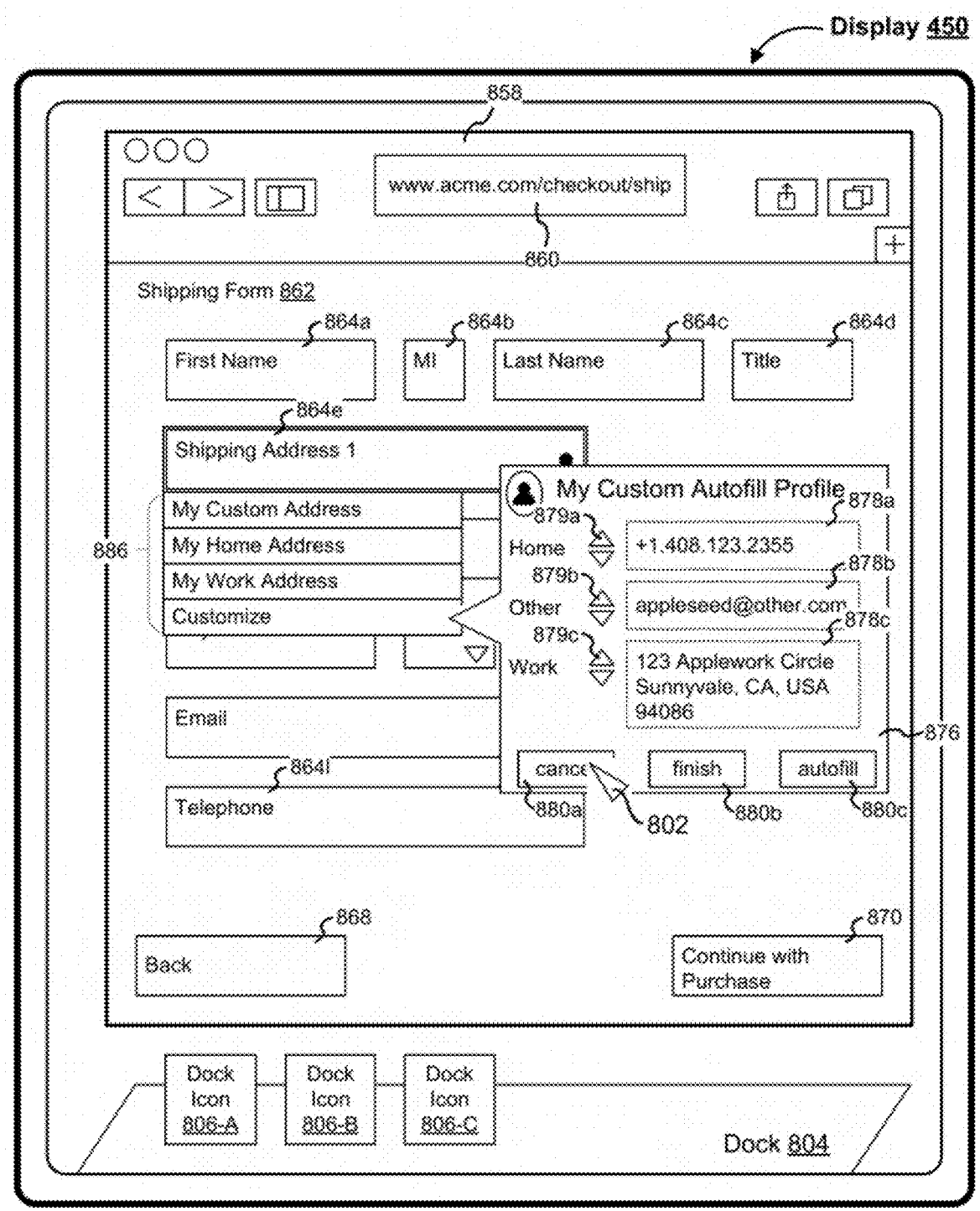
Figure 8R:
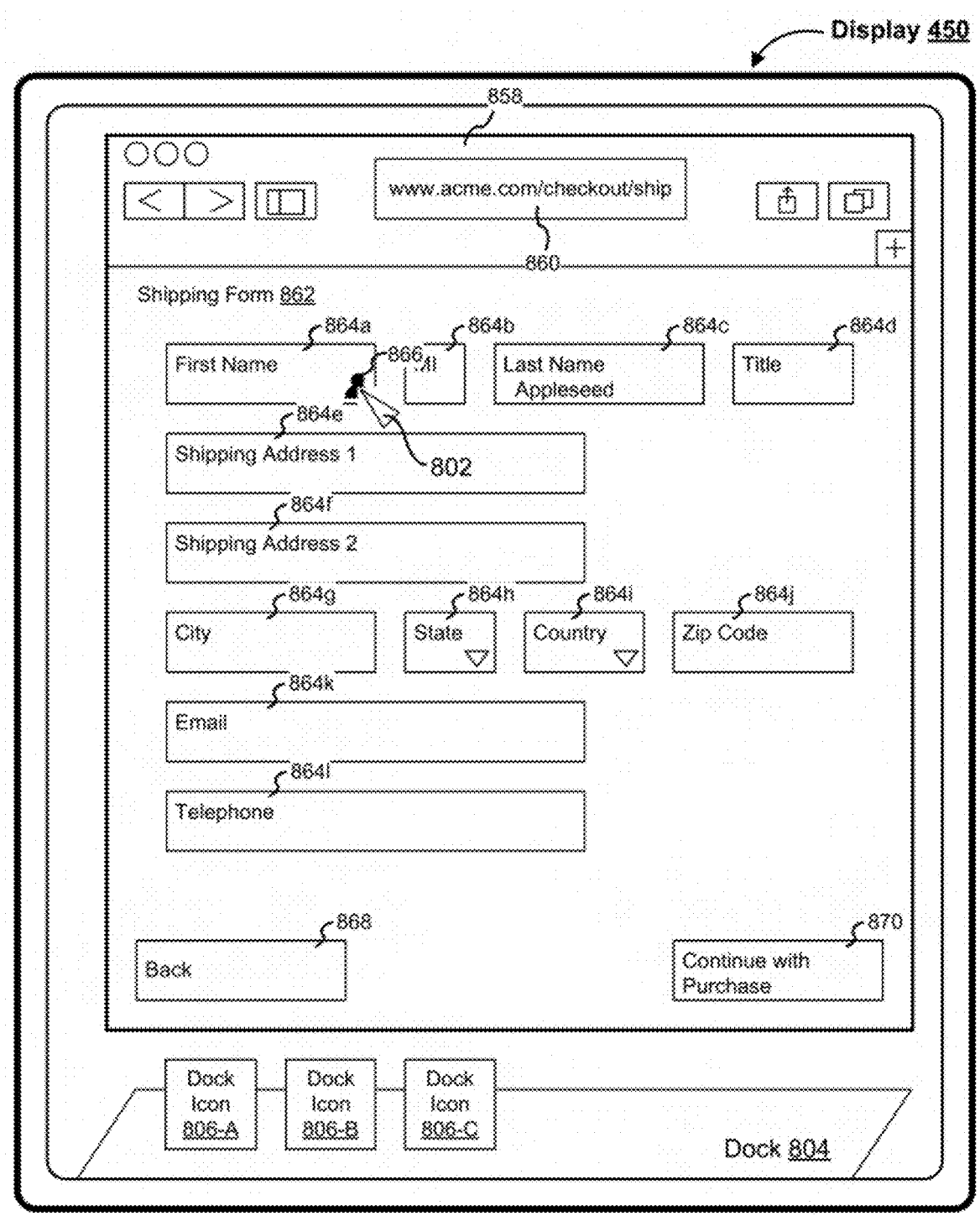
Figure 8S:
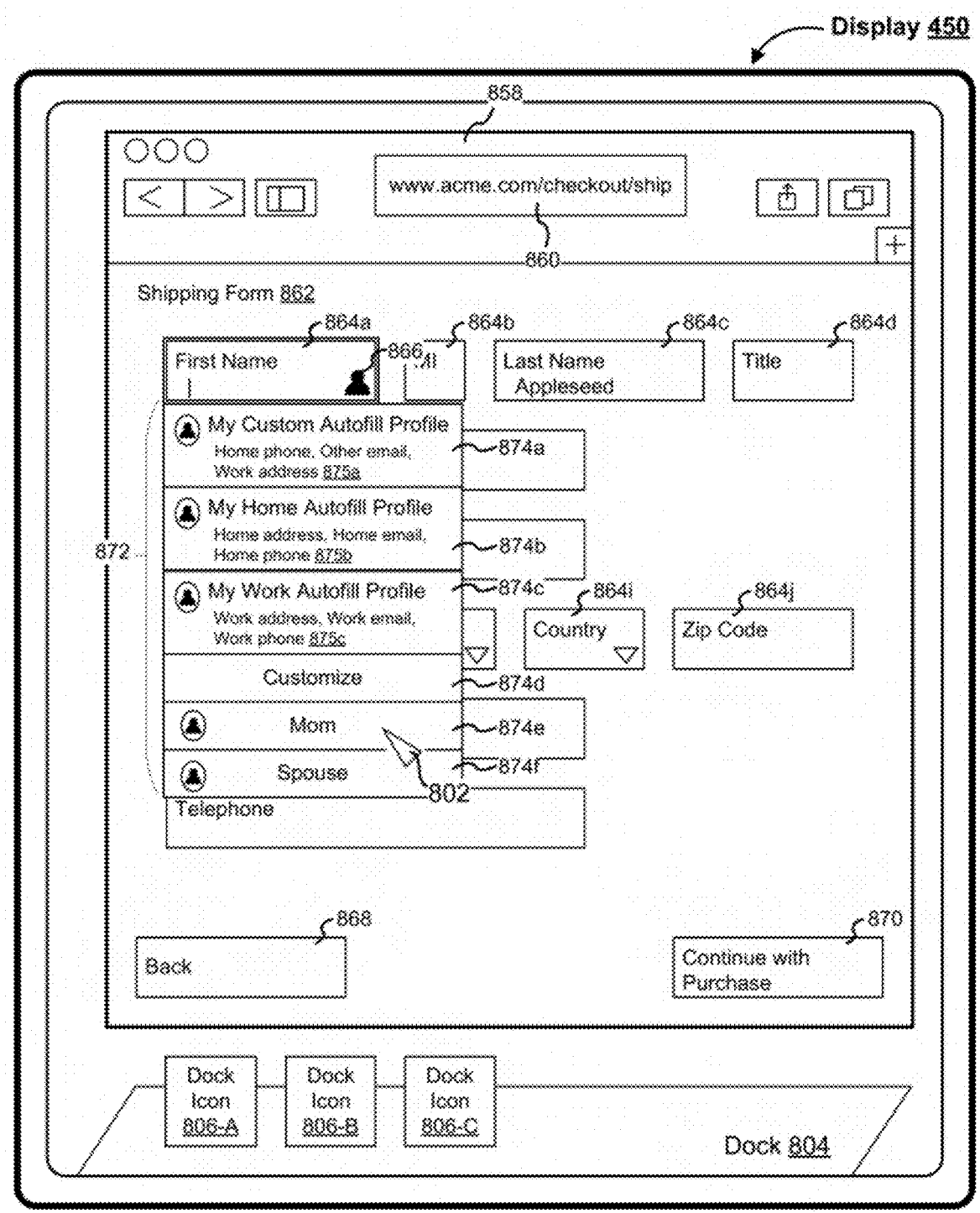
Figure 8T:
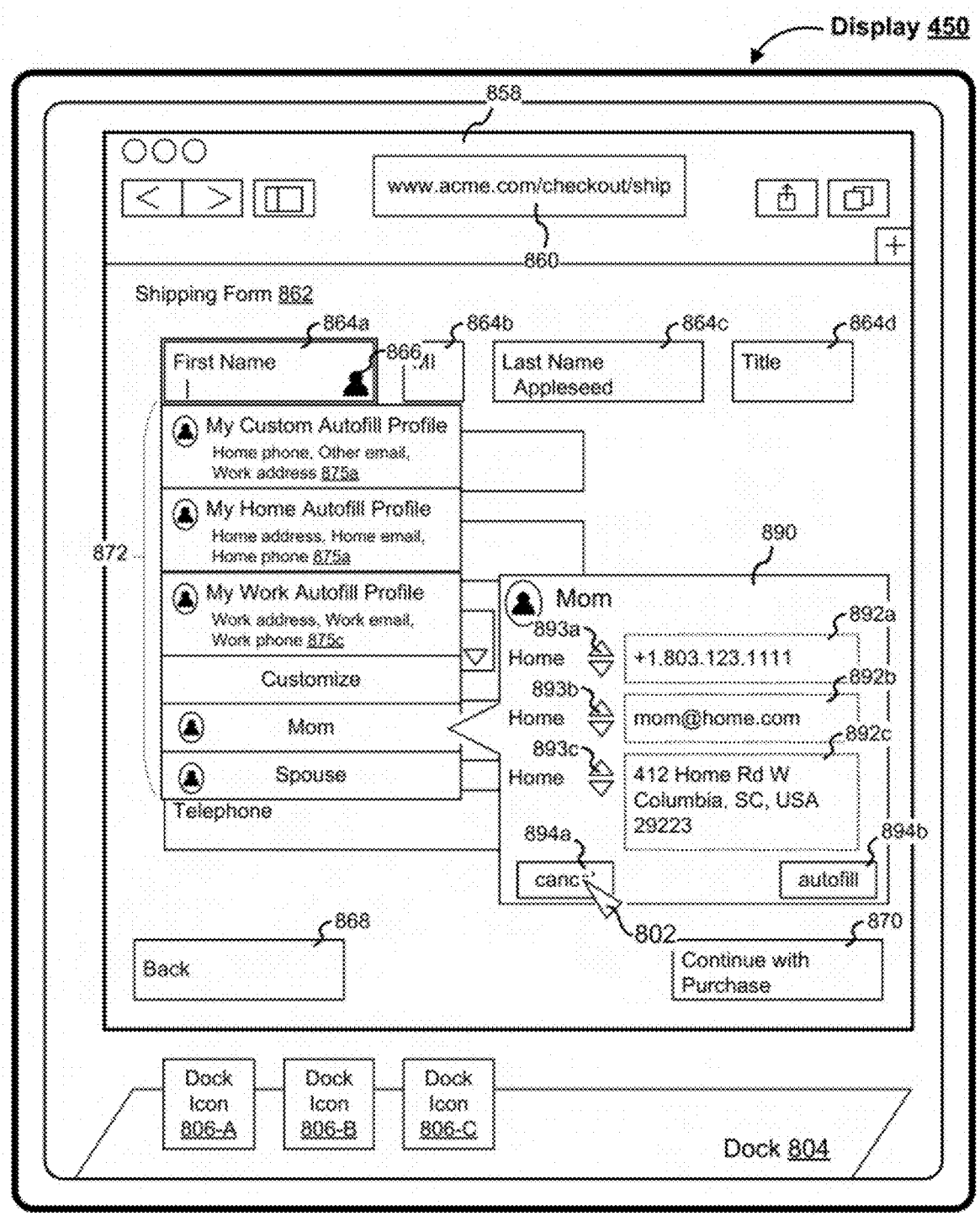
Figure 8U:
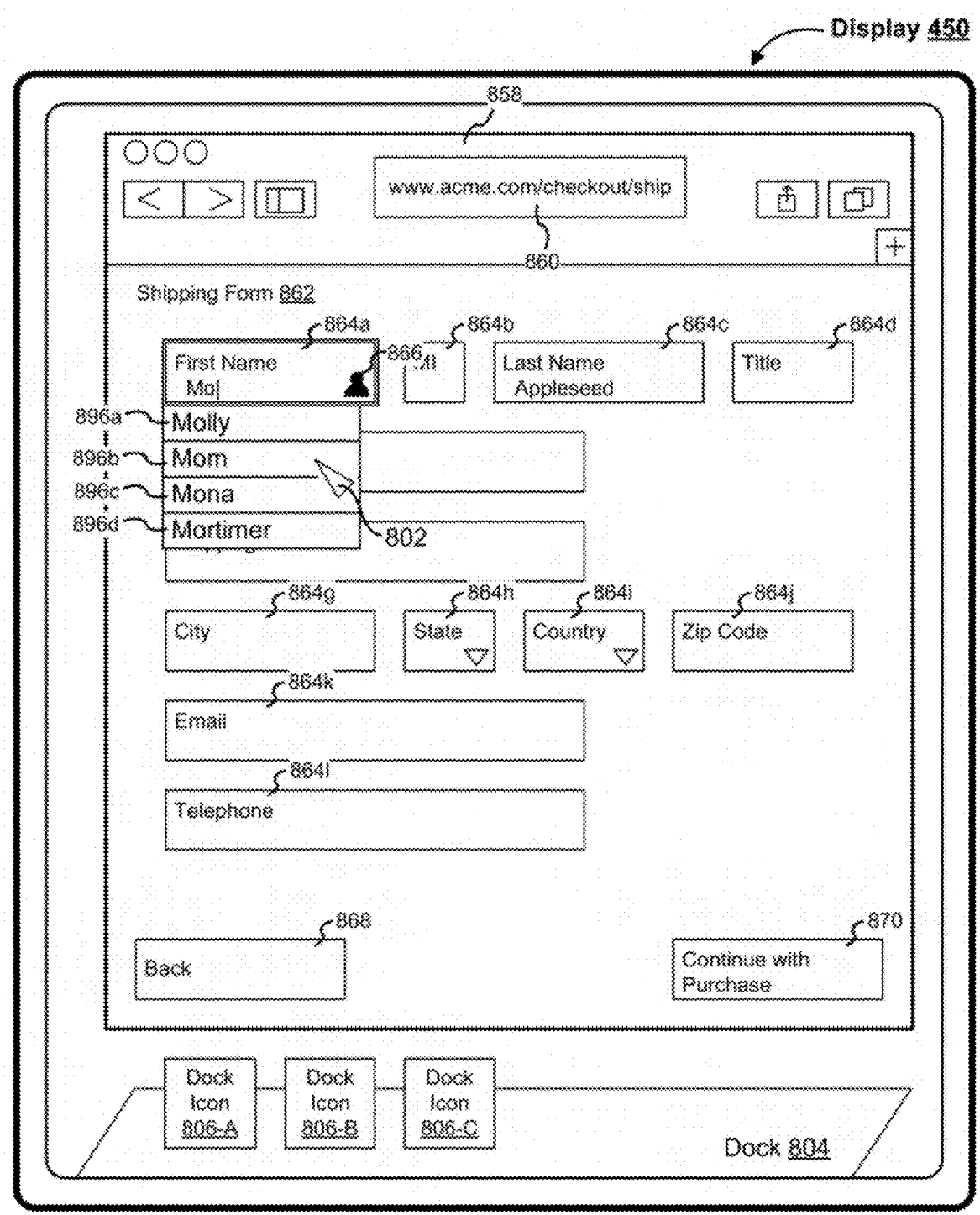
Figure 8V:
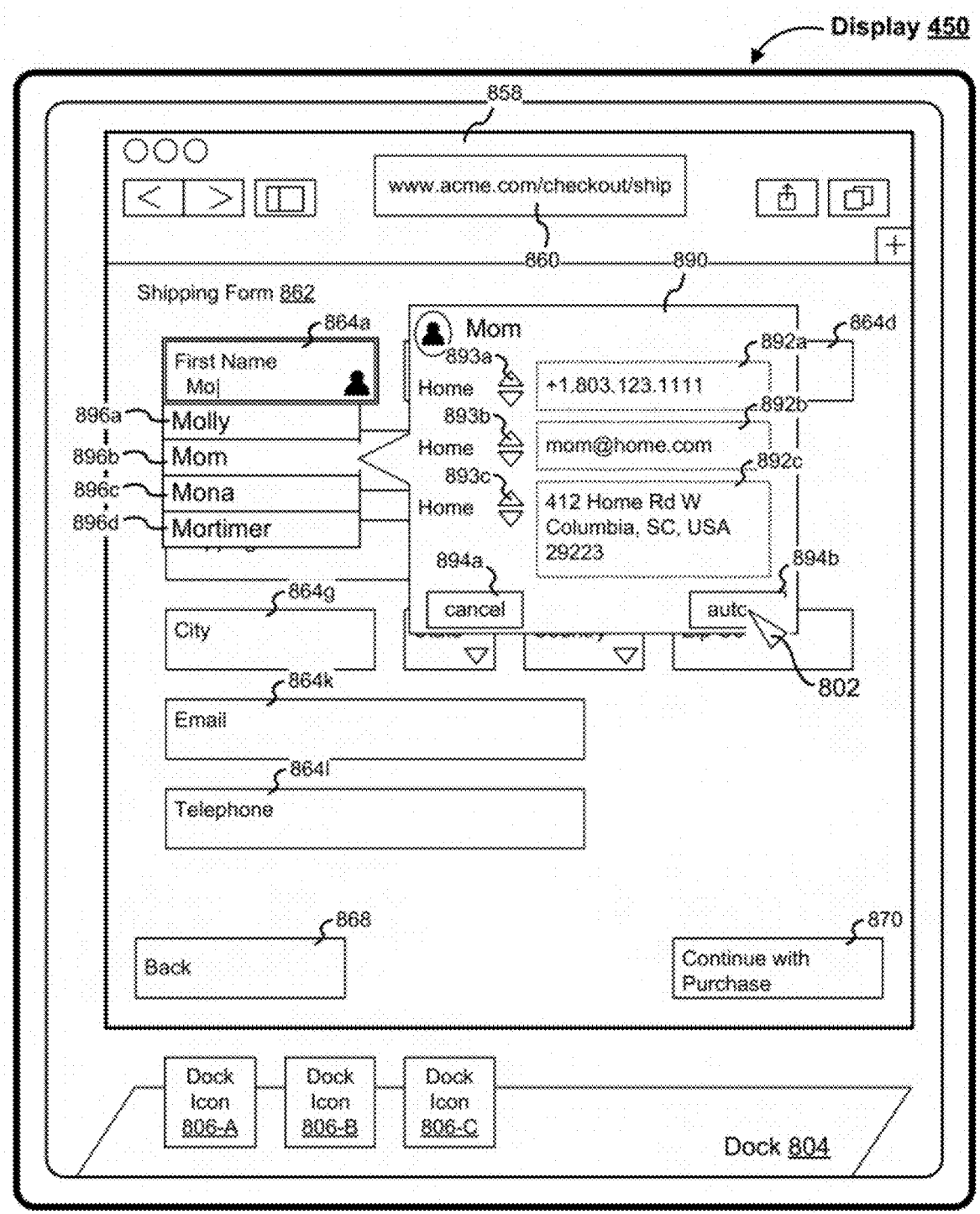
Figure 8W:
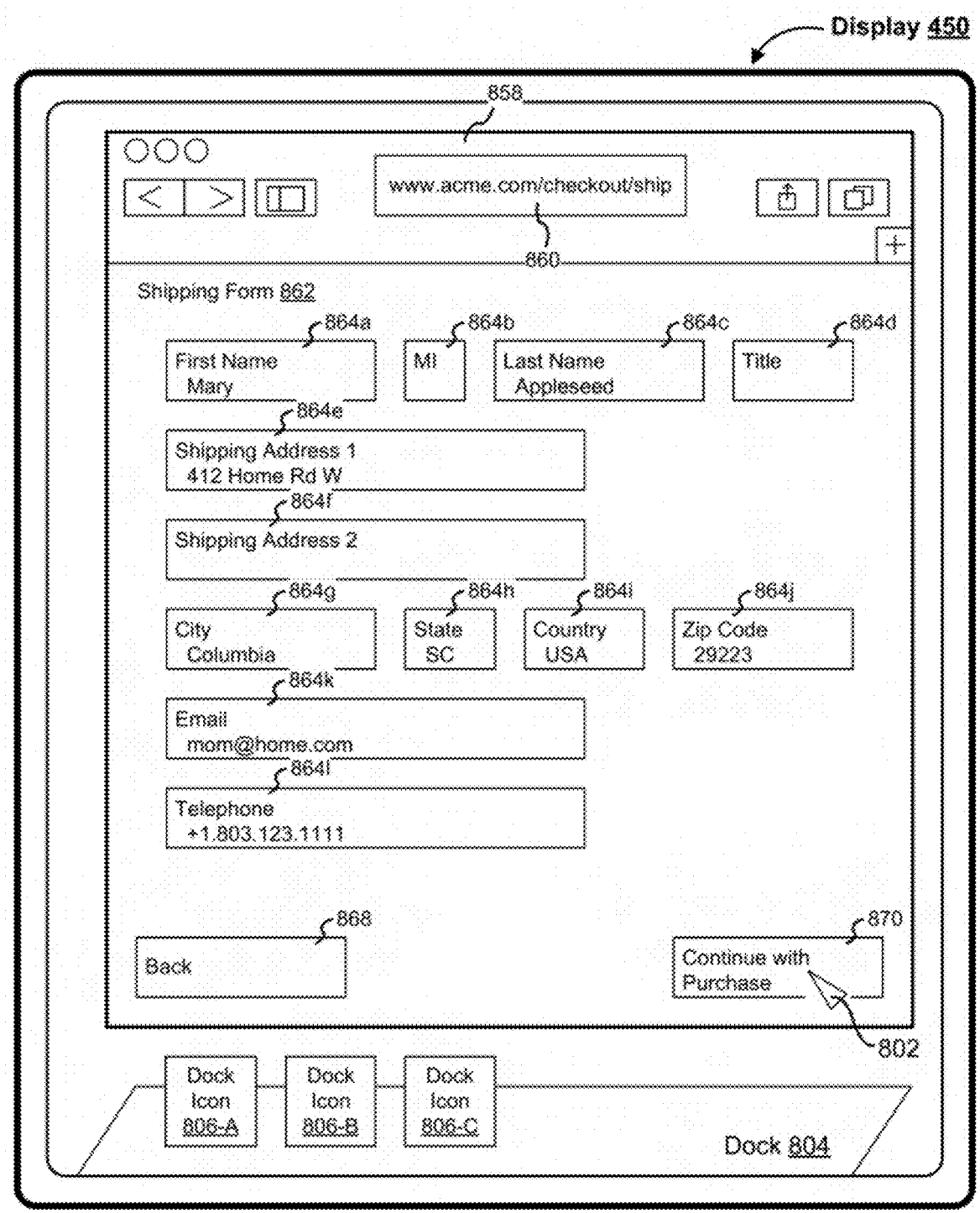

FIGS. 8A-8W illustrate example user interfaces for populating fields of an electronic form in accordance with some embodiments. The user interfaces in these figures are used to illustrate the processes described below, including the processes in FIGS. 11A-11D. Although some of the examples which follow will be given with reference to inputs on a touch-sensitive surface 451 that is separate from the display 450 that control a focus selector 802, in some embodiments, the device detects inputs on a touch-screen display (where the touch-sensitive surface and the display are combined), as shown in FIG. 4A.

As shown in FIGS. 8A-8W, a device (e.g., device 300, FIG. 3) displays a user interface with a plurality of user-interface elements and a focus selector 802 on display 450. In some embodiments, focus selector 802 (sometimes also referred to as a "cursor") is controlled by a separate input device such as a mouse, stylus, motion sensing input device, speech command processing device, touchpad (e.g., the touch-sensitive surface 451 in FIG. 4B), or the like. In some embodiments, the user interface includes a dock 804 with a plurality of dock icons 806-A, 806-B, and 806-C corresponding to different applications.

FIGS. 8A-8B illustrate contact information for a "Me" contact 817 and a "Mom" contact 819 (e.g., contact cards) displayed within a window 810, respectively. FIG. 8A illustrates contact information for the "Me" contact 817 displayed in the third pane 818 of the window 810. FIG. 8A also illustrates focus selector 802 at a location corresponding to the "Mom" contact 819 within the second pane 814 of the window 810.

As shown in FIG. 8A, the window 810 corresponds to an address book or contacts application. The window 810 includes a first pane 812 with a plurality of groups of contacts, including: "All," "Work," "Family," "Group A," "Group B," and "Miscellaneous" (Misc). In FIG. 8A, the "All" group 813 is active.

As shown in FIG. 8A, the window 810 also includes a second pane 814 with a plurality of contacts associated with the "All" group 813, including: "Cousin," "Dad," "Me," "Molly," "Mom," "Mona," "Mortimer, "Sister," and "Spouse." In FIG. 8A, the "Me" contact 817 is active. The second pane 814 also includes a search box 816 for searching contacts in the active group (e.g., the "All" group 813 in FIG. 8A).

As shown in FIG. 8A, the window 810 further includes a third pane 818 with contact information for the "Me" contact 817 (e.g., a contact card). As shown in FIG. 8A, the contact information for the "Me" contact 817 includes: an avatar or image 820, a name 822a, a work title and company 822b, a plurality of telephone numbers 824, a plurality of email addresses 826, a date of birth 828, (optionally) a spouse's name 830, a home address 832, and a work address 834. In FIG. 5A, the third pane 818 also includes an addition affordance 838 for adding a contact, an edit affordance 840 for editing the contact information for the "Me" contact 817, and a share affordance 842 for sharing the contact information for the "Me" contact 817 via one or more sharing methods (e.g., SMS, email, social media network X, social media network Y, and/or the like).

FIG. 8B illustrates contact information for the "Mom" contact 819 displayed in the third pane 818 of the window 810 in response to selection of the "Mom" contact 819 within the second pane 814 with the focus selector 802 (e.g., with a single or double click) in FIG. 8A. As such, in FIG. 8B, the "Mom" contact 819 is active. As shown in FIG. 8B, the contact information for the "Mom" contact 819 includes: an avatar or image 844, a name 846a, (optionally) an alias 846b, a telephone number 848, an email address 850, a date of birth 852, and an address 854.

FIG. 8C illustrates a window 858 (e.g., for a web browser application) displaying an electronic form 862 corresponding to the URL (uniform resource locator) in the address bar 860. For example, in FIG. 8C, the electronic form 862 corresponds to a shipping form associated with a check-out process for a retail purchase. FIG. 8C also illustrates the focus selector 802 at a location corresponding to the last name field 864c within the electronic form 862.

As shown in FIG. 8C, the electronic form 862 includes a plurality of fields (sometimes collectively referred to as the "fields 864" herein), including: a first name field 864a, a middle initial (MI) field 864b, a last name field 864c, a title field 864d, a first shipping address field 864e, a second shipping address field 864f, a city field 864g, a state field 864h, a country field 864i, a zip code field 864j, an email address field 864k, and a telephone number field 864l. In FIG. 8C, the last name field 864c includes an autofill affordance 866, for example, in response to hovering the focus selector 802 over the last name field 864c. The electronic form 862 also includes a back affordance 868 for replacing display of the electronic form 862 with a previous screen or web page, and a "Continue with Purchase" affordance 870 for completing the check-out process or advancing to a next stage of the check-out process for a retail purchase.

FIGS. 8D-8E illustrate a sequence in which at least some the fields 864 of the electronic form 862 are populated with a custom data set. FIG. 8D illustrates an autofill menu 872 overlaid on the electronic form 862 in response to selection of the last name field 864c in FIG. 8C. FIG. 8D also illustrates the focus selector 802 at a location corresponding to the first autofill profile affordance 874a.

As shown in FIG. 8D, the autofill menu 872 includes: a first autofill profile affordance 874a associated with a custom data set for the user of the device 300, a second autofill profile affordance 874b associated with a home data set for the user of the device 300, a third autofill profile affordance 874c associated with a work data set for the user of the device 300, a customization affordance 874d provided to edit the custom data set, (optionally) a fourth autofill profile affordance 874e associated with a third party data set for a "Mom" contact, and (optionally) a fifth autofill profile affordance 874f associated with a third party data set for a "Spouse" contact. For example, the autofill profile affordances 874a, 874b, and 874c are configured to populate at least some of the fields 864 of the electronic form 862 with a corresponding data set (e.g., a work data set for the third autofill profile affordance 874c) in response to activation thereof (e.g., a single or double click with the focus selector 802). For example, the customization affordance 874d is configured to display a customization menu (e.g., the customization menu 876 in FIG. 8I) in response to activation thereof (e.g., a single or double click with the focus selector 802). In some embodiments, custom data sets are stored on a per domain basis. In some embodiments, the user may select between a plurality of custom data sets via the customization menu 876.

For example, in some embodiments, when activated (e.g., with a single or double click with the focus selector 802), the autofill profile affordances 874e and 874f are configured to display a third party contact menu (e.g., as shown in FIGS. 8S-8T). In another example, in some embodiments, when activated (e.g., with a single or double click with the focus selector 802), the autofill profile affordances 874e and 874f are configured to populate at least some of the fields 864 of the electronic form 862 with a corresponding third party data set. According to some embodiment, the fourth autofill profile affordance 874e and the fifth autofill profile affordance 874f correspond to third party data sets associated with the most frequent contacts of the user. According to some embodiment, the fourth autofill profile affordance 874e and the fifth autofill profile affordance 874f correspond to third party data sets associated with a text string entered in the last name field 864c.

As shown in FIG. 8D, for example, the first autofill profile affordance 874a includes a descriptor 875a (e.g., a text description) of the contact information from the "Me" contact 817 in FIG. 8A that corresponds to the custom data set (e.g., the mobile phone number (+1.408.123.2355) from the plurality of phone numbers 824, the other email address (appleseed@other.com) from the plurality of email addresses 826, and the work address 834). Similarly, the second autofill profile affordance 874b includes a descriptor 875b (e.g., a text description) of the contact information from the "Me" contact 817 in FIG. 8A that corresponds to the home data set (e.g., the home phone number, the home email address, and the home address). And, the third autofill profile affordance 874c includes a descriptor 875c (e.g., a text description) of the contact information from the "Me" contact 817 in FIG. 8A that corresponds to the work data set (e.g., the work phone number, the work email address, and the work address).

FIG. 8E illustrates at least some of the fields 864 of the electronic form 862 populated with contact information associated with the custom data set from the "Me" contact 817 in FIG. 8A in response to selection of the first autofill profile affordance 874a (e.g., with a single or double click) in FIG. 8D. For example, in FIG. 8E, the telephone number field 863l includes the mobile phone number (+1.408.123.2355) from the plurality of phone numbers 824, and the email address field 864k includes the other email address (appleseed@other.com) from the plurality of email addresses 826. Continuing with this example, in FIG. 8E, the first shipping address field 864e, the city field 864g, the state field 864h, the country field 864i, and the zip code field 864j include the work address 834.

FIGS. 8F-8G illustrate a sequence in which at least some the fields 864 of the electronic form 862 are populated with a work data set. FIG. 8F illustrates an autofill menu 872 overlaid on the electronic form 862 in response to selection of the last name field 864c in FIG. 8C. FIG. 8F also illustrates the focus selector 802 at a location corresponding to the third profile affordance 874c.

FIG. 8G illustrates at least some of the fields 864 of the electronic form 862 populated with contact information associated with the work data set from the "Me" contact 817 in FIG. 8A in response to selection of the third autofill profile affordance 874c (e.g., with a single or double click) in FIG. 8F. For example, in FIG. 8G, the telephone number field 863l includes the work telephone number (+1.408.123.9675) from the plurality of telephone numbers 824, and the email address field 864k includes the work email address (appleseed@work.com) from the plurality of email addresses 826. Continuing with this example, in FIG. 8F, the first shipping address field 864e, the city field 864g, the state field 864h, the country field 864i, and the zip code field 864j include the work address 834.

FIGS. 8H-8K illustrate a sequence in which the custom data set is edited. FIG. 8H illustrates an autofill menu 872 overlaid on the electronic form 862 in response to selection of the last name field 864c in FIG. 8C. FIG. 8H also illustrates the focus selector 802 at a location corresponding to the customization affordance 874d.

FIG. 8I illustrates a customization menu 876 overlaid on the electronic form 862 in response to selection of the customization affordance 874d in FIG. 8H. FIG. 8I also illustrates the focus selector 802 at a location corresponding to the first indication 878a of the telephone number associated with the custom data set.

As shown in FIG. 8I, the customization menu 876 includes: a first indication 878a of the telephone number associated with the custom data set (e.g., the mobile telephone number (+1.408.123.2355) from among the plurality of telephone numbers 824 in FIG. 8A), a second indication 878b of the email address associated with the custom data set (e.g., the other email address (appleseed@other.com) from among the plurality of email address 826 in FIG. 8A), and a third indicator 878c of the address associated with the custom data set (e.g., the work address 834 in FIG. 8A). The customization menu 876 also includes: a first set of controls 879a for changing the telephone number associated with the custom data set, a second set of controls 879b for changing the email address associated with the custom data set, and a third set of controls 879c for changing the address associated with the custom data set. For example, the user of the device 300 is also able to change the telephone number associated with the custom data set by selecting the first indication 878a, the email address associated with the custom data set by selecting the second indication 878b, or the address associated with the custom data set by selecting the third indication 878c.

As shown in FIG. 8I, the customization menu 876 further includes a "cancel" affordance 880a, which, when activated (e.g., via a single or double click with the focus selector 802), causes the device 300 to cease displaying the customization menu 876 without applying any edits to the custom data set. The customization menu 876 further includes a "finish" affordance 880b, which, when activated (e.g., via a single or double click with the focus selector 802), causes the device 300 to cease displaying the customization menu 876 and to apply any edits to the custom data set. The customization menu 876 further includes an "autofill" affordance 880c, which, when activated (e.g., via a single or double click with the focus selector 802), causes the device 300 to populate at least some of the fields 864 of the electronic form 862 with contact information associated with the custom data set from the "Me" contact 817 in FIG. 8A.

FIG. 8J illustrates a plurality of options 882a, 882b, 882c, 882d, 882e, and 882f for the telephone numbers to be included as part of the custom data set overlaid on the customization menu 876 in response to selection of the first indication 878a in FIG. 8I. FIG. 8J also illustrates the focus selector 802 at a location corresponding to the first option 882a (e.g., home telephone+1.408.123.4663). For example, the options 882a, 882b, 882c, 882d, and 882e correspond to the plurality of telephone numbers 824 from the "Me" contact 817 in FIG. 8A. For example, the option 882f corresponds to skipping telephone number fields of electronic forms when using the custom data set.

FIG. 8K illustrates that the first indication 878a of the telephone number associated with the custom data set has changed from the mobile telephone number (+1.408.123.2355) in FIG. 8I to the home telephone number (+1.408.123.2355) in response to selection of the first option 882a in FIG. 8J. FIG. 8K also illustrates the focus selector 802 at a location corresponding to the "autofill" affordance 880c within the customization menu 876.

FIGS. 8K-8L illustrate a sequence in which at least some the fields 864 of the electronic form 862 are populated with the custom autofill dataset, which was edited in FIGS. 8H-8K. FIG. 8L illustrates at least some of the fields 864 of the electronic form 862 populated with contact information associated with the custom data set (e.g., as edited in FIGS. 8H-8K) from the "Me" contact 817 in FIG. 8A in response to selection of the "autofill" affordance 880c (e.g., with a single or double click) in FIG. 8K. In FIG. 8L, the email address field 864k includes the autofill affordance 866, for example, in response to hovering the focus selector 802 over the email address field 864k. FIG. 8L also illustrates the focus selector 802 at a location corresponding to the autofill affordance 866.

For example, in FIG. 8L, the telephone number field 864l includes the home telephone number (+1.408.123.2355) from the plurality of telephone numbers 824, and the email address field 864k includes the other email address (appleseed@other.com) from the plurality of email addresses 826. Continuing with this example, in FIG. 8L, the first shipping address field 864e, the city field 864g, the state field 864h, the country field 864i, and the zip code field 864j include the work address 834.

FIGS. 8L-8N illustrate a sequence in which a field of the electronic form 862 is edited. As such, in this example, the user of the device 300 makes a correction to a text string that filled/populated the email address field 864k according to the autofill process. FIG. 8M illustrates a plurality of options 884a, 884b, and 884c for populating the email address field 864k in response to selection of the autofill affordance 866 in FIG. 8L. FIG. 8M also illustrates the focus selector 802 at a location corresponding to the first option 884a. For example, the plurality of options 848a, 884b, and 884c for the email address field 864k correspond to the plurality of email addresses 826 from the "Me" contact 817 in FIG. 8A. FIG. 8N illustrates that the text string in the email address field 864k has changed from the other email address (appleseed@other.com) to the home email address (appleseed@home.com) in response to selection of the first option 884a in FIG. 8M.

FIGS. 8O-8Q illustrate a sequence in which a field population menu 886 is overlaid on the electronic form 862. FIG. 8O illustrates the window 858 (e.g., for a web browser application) displaying the electronic form 862 corresponding to the URL in the address bar 860. For example, in FIG. 8O, the electronic form 862 corresponds to a shipping form associated with a check-out process for a retail purchase. FIG. 8O also illustrates the focus selector 802 at a location corresponding to the first shipping address field 864e within the electronic form 862. In FIG. 8O, the first shipping address field 864e includes the autofill affordance 866, for example, in response to hovering the focus selector 802 over the first shipping address field 864e.

FIG. 8P illustrates a field population menu 886 overlaid on the electronic form 862 in response to selection of the first shipping address field 864e in FIG. 8O. FIG. 8P also illustrates the focus selector 802 at a location corresponding to the customization affordance 888d.

As shown in FIG. 8P, the field population menu 886 includes: a first field population affordance 888a, which, when activated (e.g., with a single or double click), causes the first shipping address field 864e to be populated with a portion of the address associated with the custom data set (e.g., 123 Applework Circle); a second field population affordance 888b, which, when activated (e.g., with a single or double click), causes the first shipping address field 864e to be populated with a portion of the home address 832 (e.g., 123 Appleseed Lane) from the "Me" contact 817 in FIG. 8A; a third field population affordance 888c, which, when activated (e.g., with a single or double click), causes the first shipping address field 864e to be populated with a portion of the work address 834 (e.g., 123 Applework Circle) from the "Me" contact 817 in FIG. 8A; and a customization affordance 888d, which, when activated (e.g., with a single or double click), causes a customization menu 876 to be displayed (e.g., as shown in FIG. 8Q).

FIG. 8Q illustrates the customization menu 876 overlaid on the electronic form 862 in response to selection of the customization affordance 888d in FIG. 8P. FIG. 8Q also illustrates the focus selector 802 at a location corresponding to the "cancel" affordance 880a. In some embodiments, the field population menu 886 and the customization menu 876 are concurrently displayed. In some embodiments, while the customization menu 876 is displayed, the field population menu 886 ceases being displayed (e.g., similar to FIGS. 8H-8I).

FIGS. 8R-8T illustrate a sequence in which a third party contact menu 890 for editing and applying a third party data set is displayed. FIG. 8R illustrates ceasing to display the field population menu 886 and the customization menu 876 in response to selection of the "cancel" affordance 880a in FIG. 8Q. FIG. 8R also illustrates window 858 (e.g., for a web browser application) displaying the electronic form 862 corresponding to the URL in the address bar 860. FIG. 8R further illustrates the focus selector 802 at a location corresponding to the autofill affordance 866 within the first name field 864a. In FIG. 8R, the first name field 864a includes the autofill affordance 866, for example, in response to hovering the focus selector 802 over the first name field 864a.

FIG. 8S illustrates the autofill menu 872 overlaid on the electronic form 862 in response to selection of the autofill affordance 866 in FIG. 8R. FIG. 8S also illustrates the focus selector 802 at a location corresponding to the fourth autofill profile affordance 874e associated with a third party data set for the "Mom" contact in FIG. 8B.

FIG. 8T illustrates a third party contact menu 890 associated with the "Mom" contact 819 in FIG. 8B in response to selection of the fourth autofill profile affordance 874e in FIG. 8S. FIG. 8T also illustrates the focus selector 802 at a location corresponding to the "cancel" affordance 894a. In some embodiments, the autofill menu 872 and the third party contact menu 890 are concurrently displayed. In some embodiments, while the third party contact menu 890 is displayed, the autofill menu 872 ceases being displayed (e.g., similar to FIGS. 8H-8I).

As shown in FIG. 8T, the third party contact menu 890 includes: a first indication 892a of the telephone number associated with the third party data set (e.g., the home telephone number 848 in FIG. 8B), a second indication 892b of the email address associated with the third party data set (e.g., the home email address 850 in FIG. 8B), and a third indication 892c of the address associated with the third party data set (e.g., the home address 854 in FIG. 8B). The third party contact menu 890 also includes: a first set of controls 893a for changing the telephone number associated with the third party data set, a second set of controls 893b for changing the email address associated with the third party data set, and a third set of controls 893c for changing the address associated with the third party data set. For example, the user of the device 300 is also able to change the telephone number associated with the third party data set by selecting the first indication 892a or the first set of controls 893a, the email address associated with the third party data set by selecting the second indication 892b or the second set of controls 893b, or the address associated with the third party data set by selecting the third indication 892c or the third set of controls 893c.

As shown in FIG. 8T, the third party contact menu 890 further includes a "cancel" affordance 894a, which, when activated (e.g., via a single or double click with the focus selector 802), causes the device 300 to cease displaying the third party contact menu 890 without applying any edits to the custom data set. The third party contact menu 890 further includes an "autofill" affordance 894b, which, when activated (e.g., via a single or double click with the focus selector 802), causes the device 300 to populate at least some of the fields 864 of the electronic form 862 with contact information associated with the third party data set from the "Mom" contact 819 in FIG. 8B.

FIGS. 8U-8W illustrate a sequence in which at least some the fields 864 of the electronic form 862 are populated with a third party data set associated with the "Mom" contact 819. FIG. 8U illustrates a plurality of third party candidate autofill profile affordances 896a, 896b, 896c, and 896d for populating at least some the fields 864 of the electronic form 862 with corresponding third party data sets in response to entry of the text string "Mo" in the first name field 864a. FIG. 8U also illustrates the focus selector 802 at a location corresponding to the third party candidate autofill profile affordance 896b associated with the "Mom" contact 819 in FIG. 8B.

FIG. 8V illustrates the third party contact menu 890 associated with the "Mom" contact 819 in FIG. 8B in response to selection of the third party candidate autofill profile affordance 896*b* in FIG. 8U. FIG. 8V also illustrates the focus selector 802 at a location corresponding to the "autofill" affordance 894*b*.

FIG. 8W illustrates at least some of the fields 864 of the electronic form 862 populated with contact information associated with the third party data set from the "Mom" contact 819 in FIG. 8B in response to selection of the "autofill" affordance 894*b* (e.g., with a single or double click) in FIG. 8V.

For example, in FIG. 8W, the telephone number field 864*l* includes the home telephone number 848 (+1.803.123.1111) in FIG. 8B, and the email address field 864*k* includes the home email address 850 (mom@home.com) in FIG. 8B. Continuing with this example, in FIG. 8W, the first shipping address field 864*e*, the city field 864*g*, the state field 864*h*, the country field 864*i*, and the zip code field 864*j* include the home address 854 in FIG. 8B.

Figure 9A:
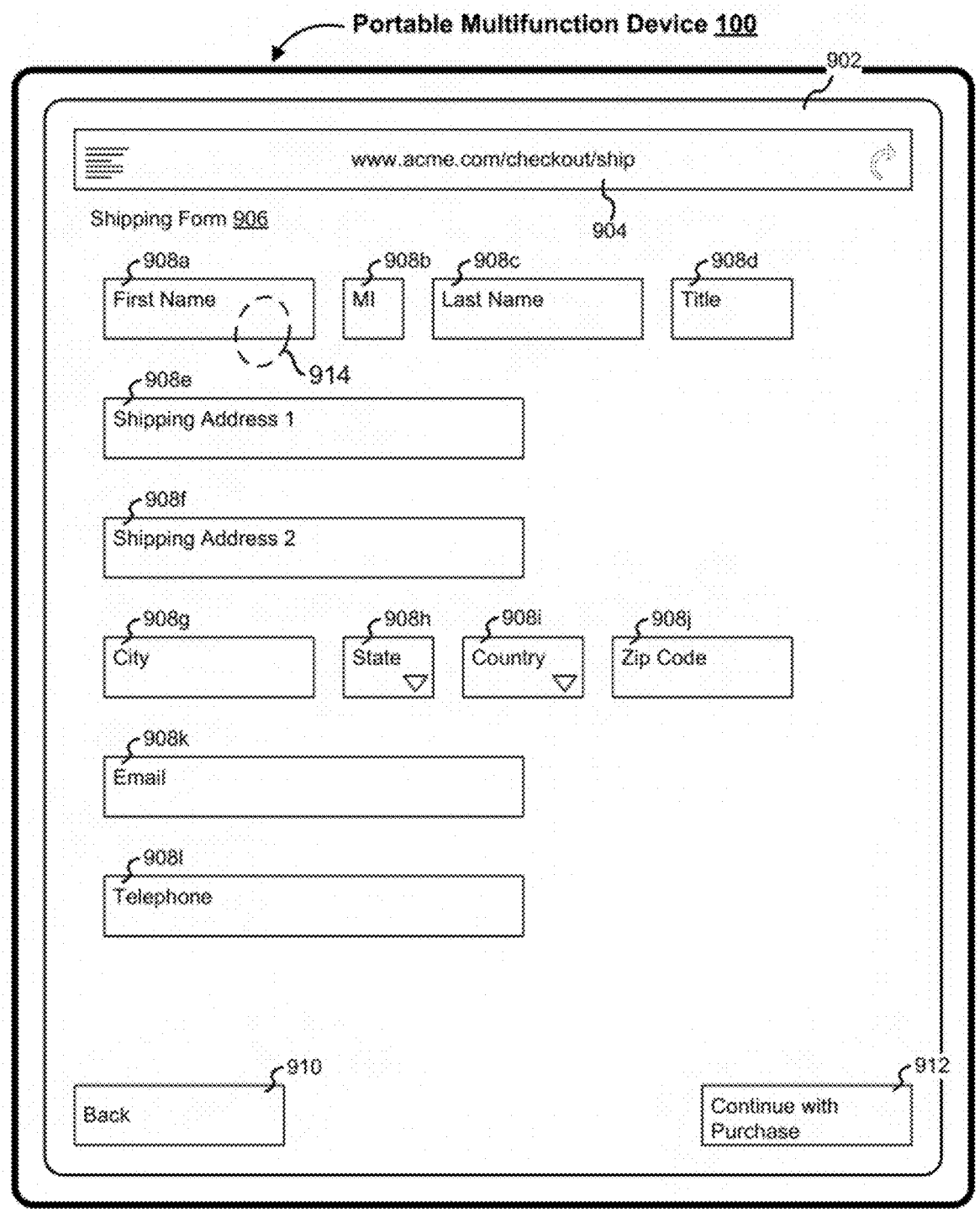
FIGS. 9A-9N illustrate example user interfaces for populating fields of an electronic form in accordance with some embodiments.
Figure 9B:
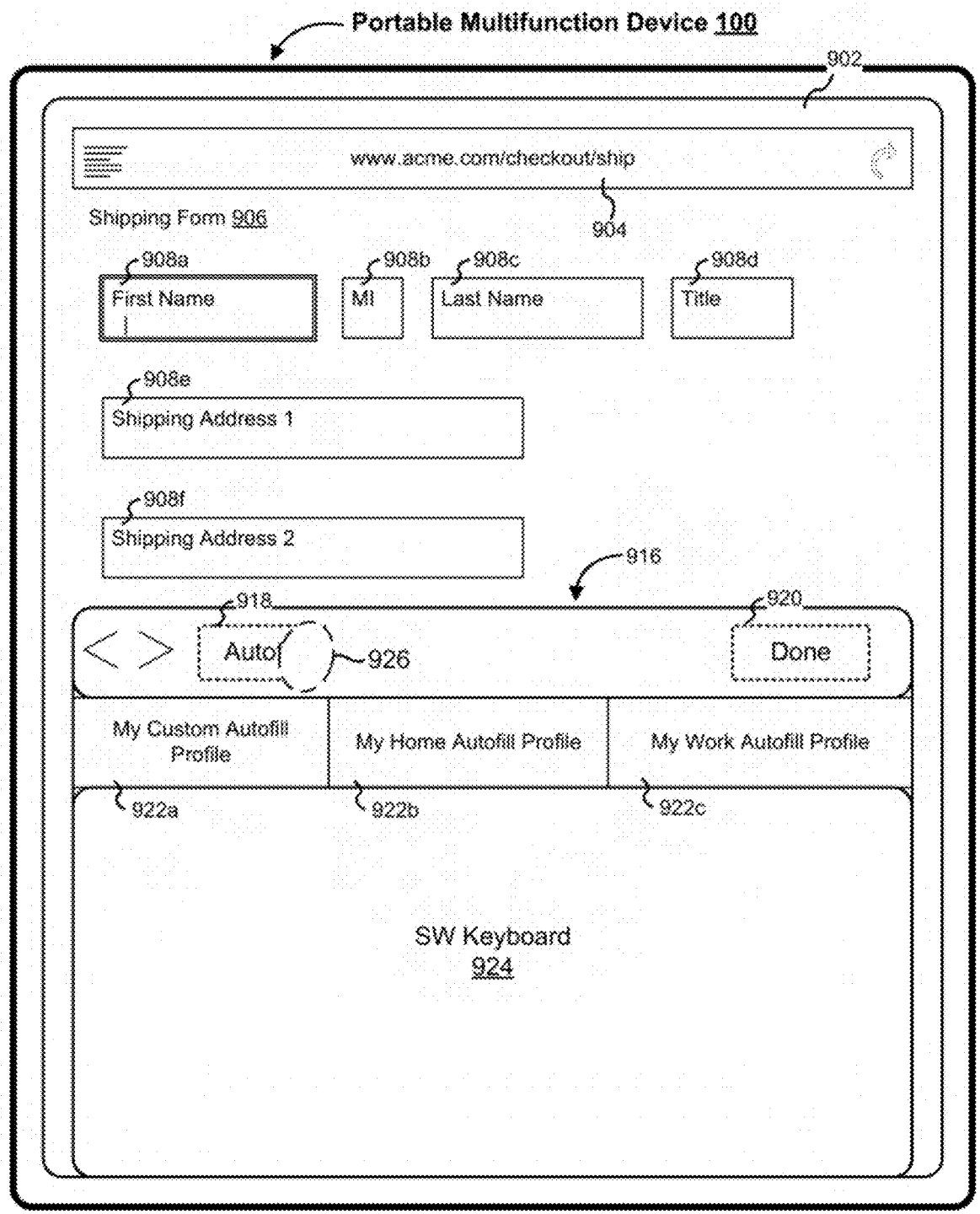
Figure 9C:
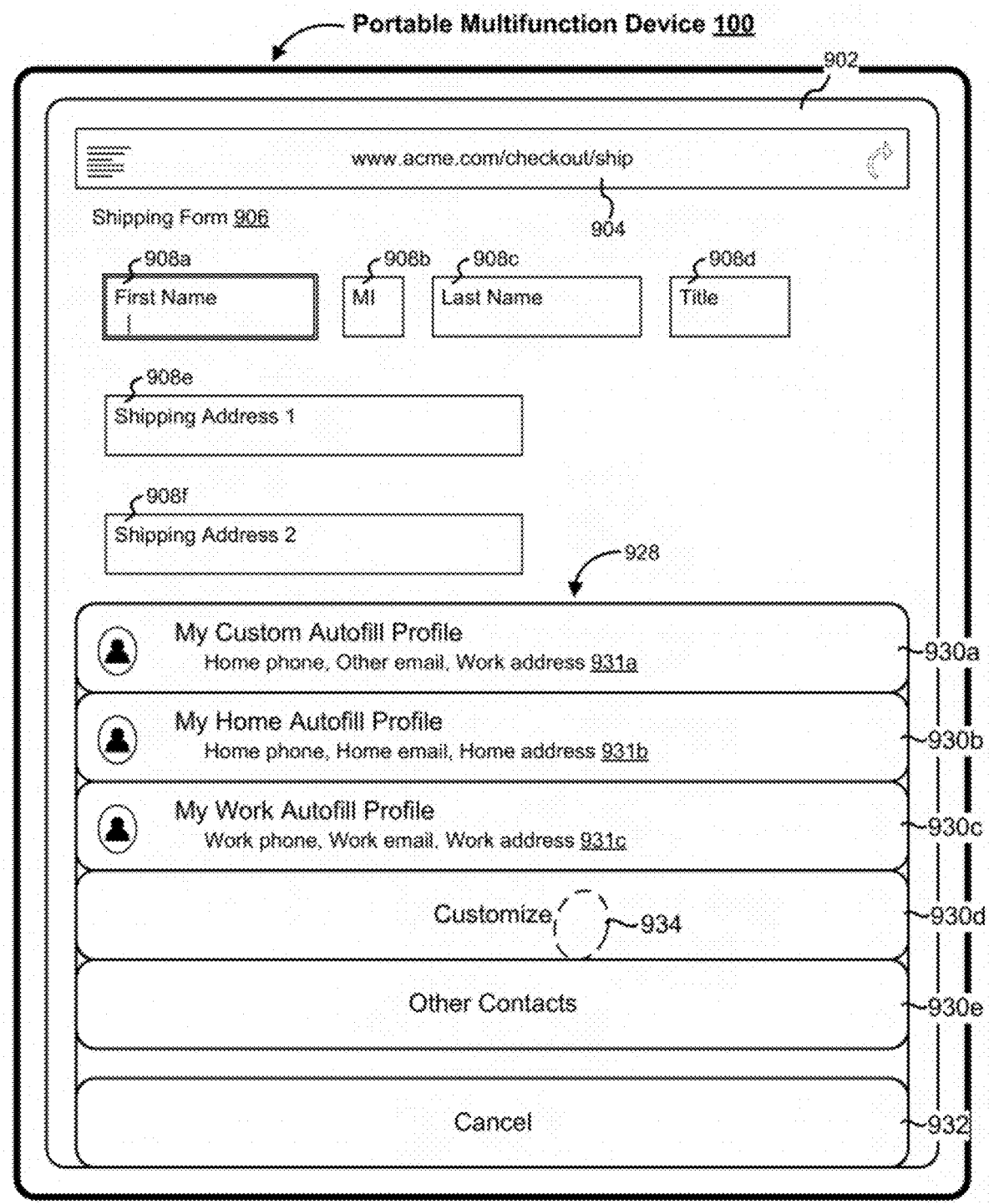
Figure 9D:
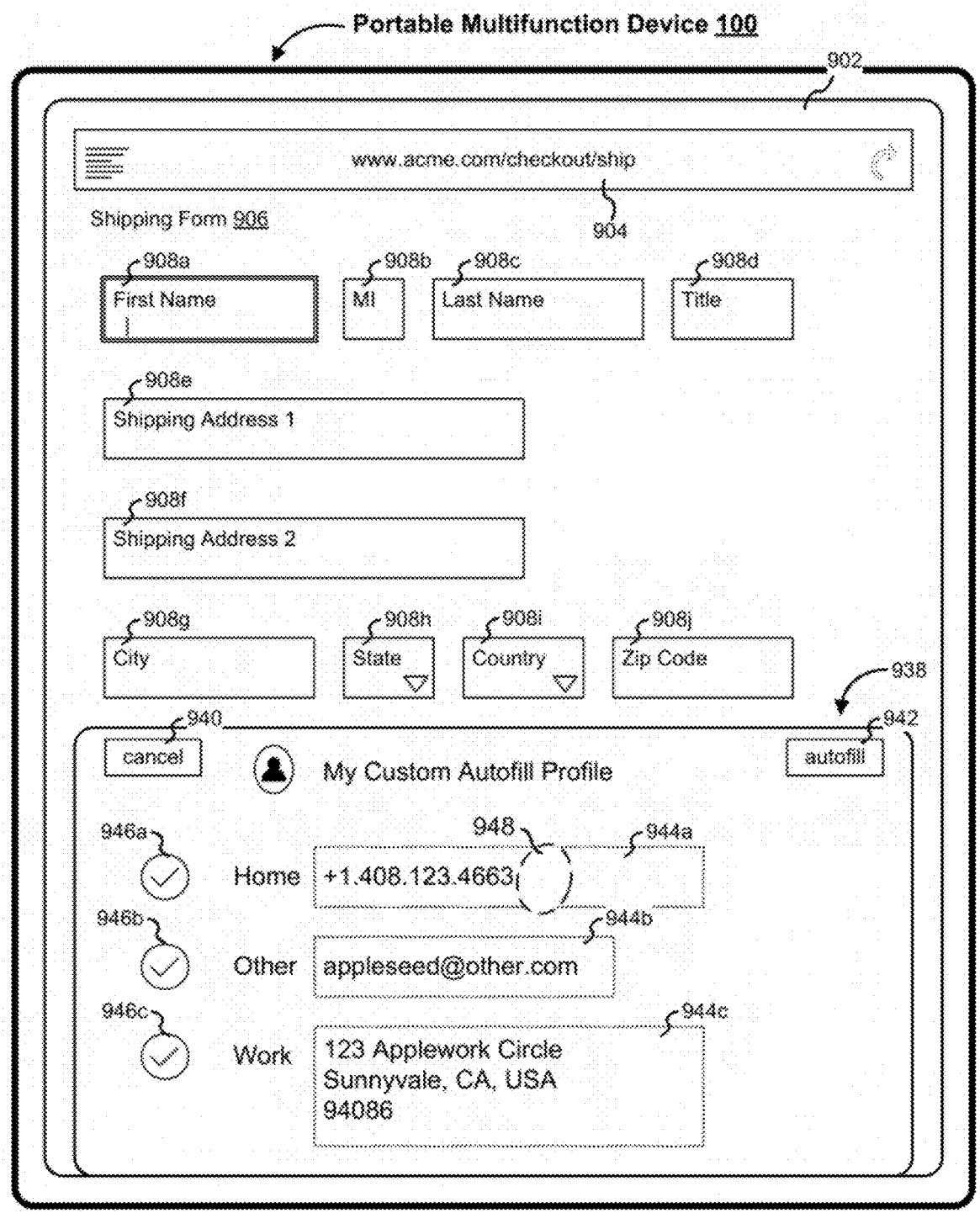
Figure 9E:
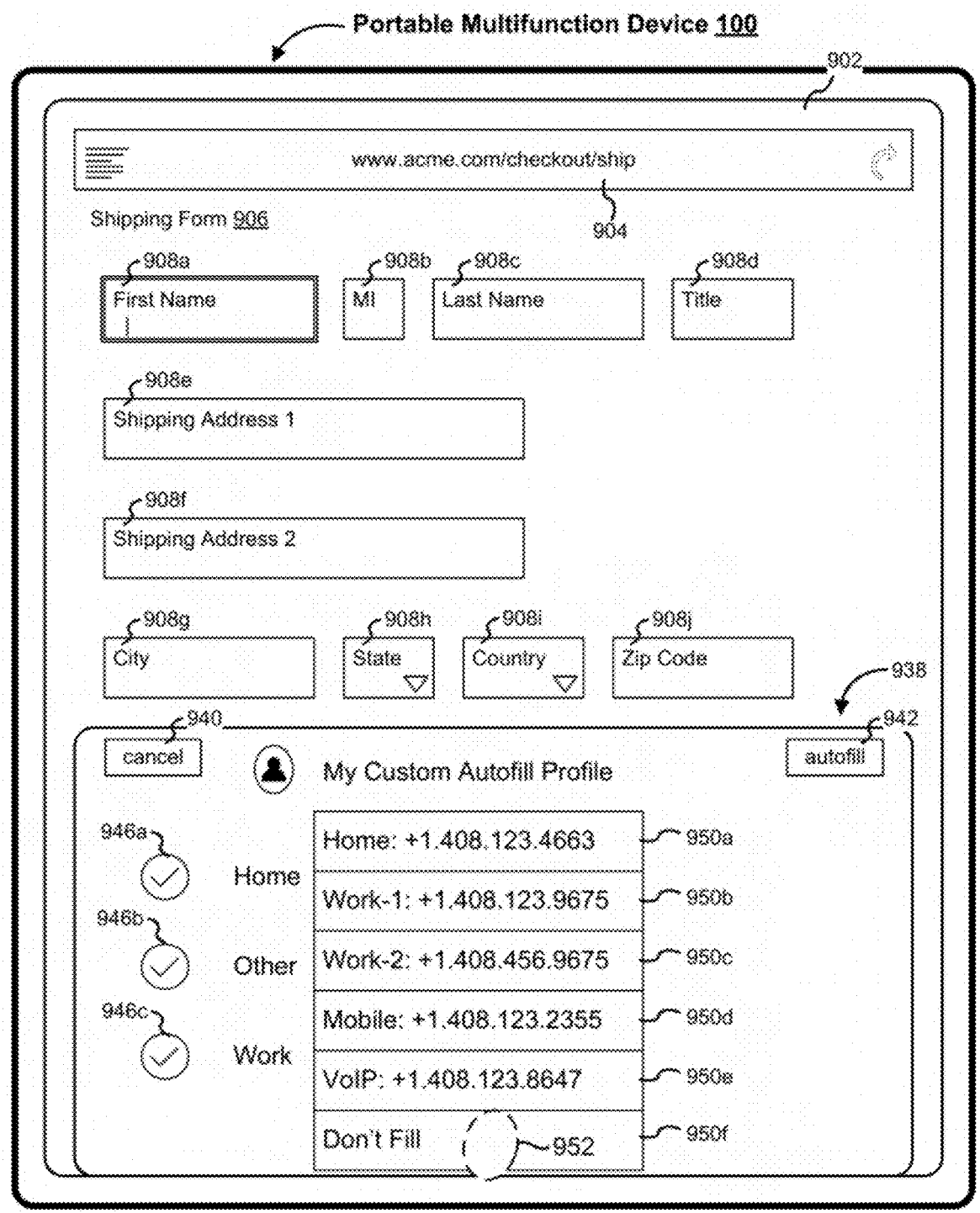
Figure 9F:
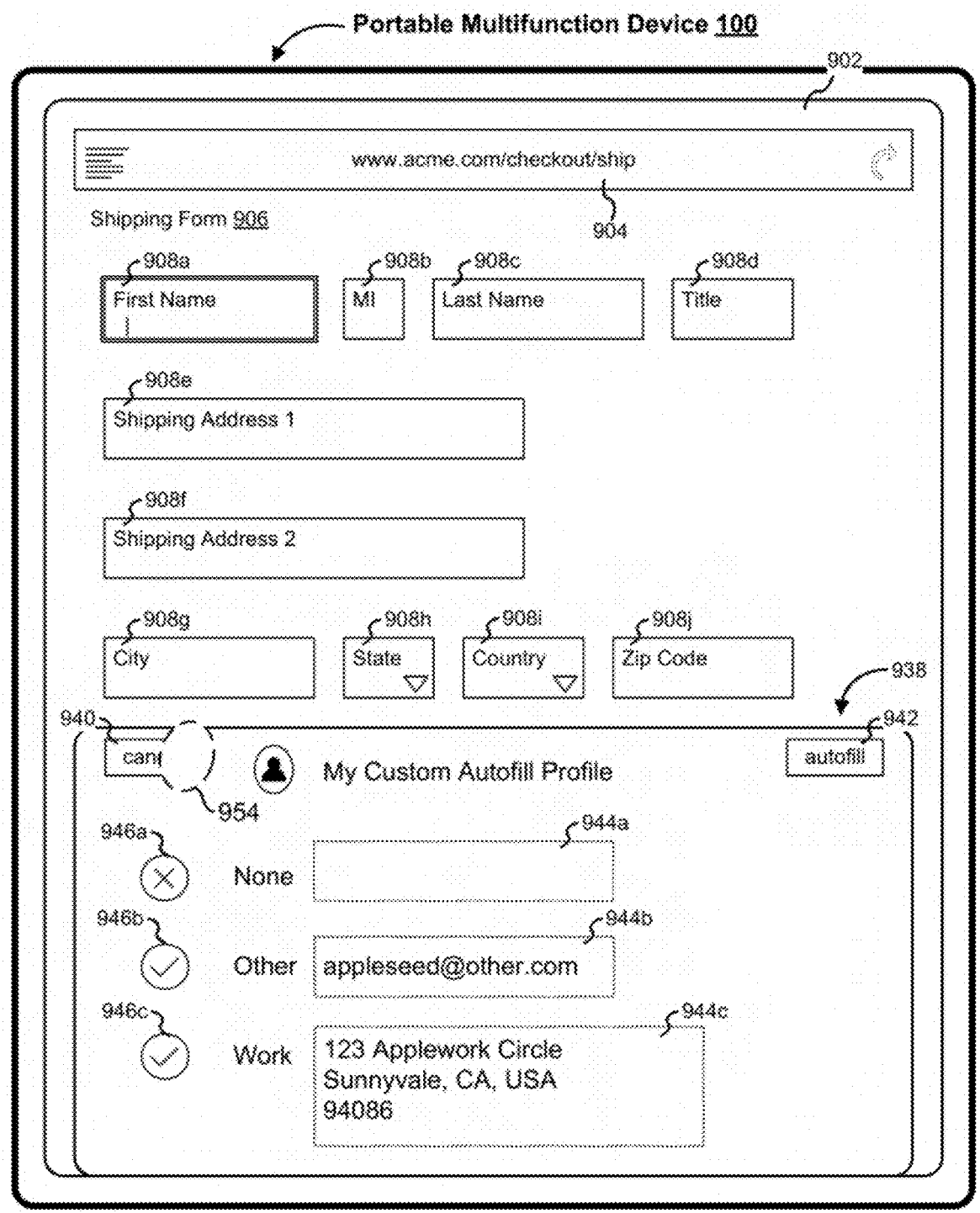
Figure 9G:
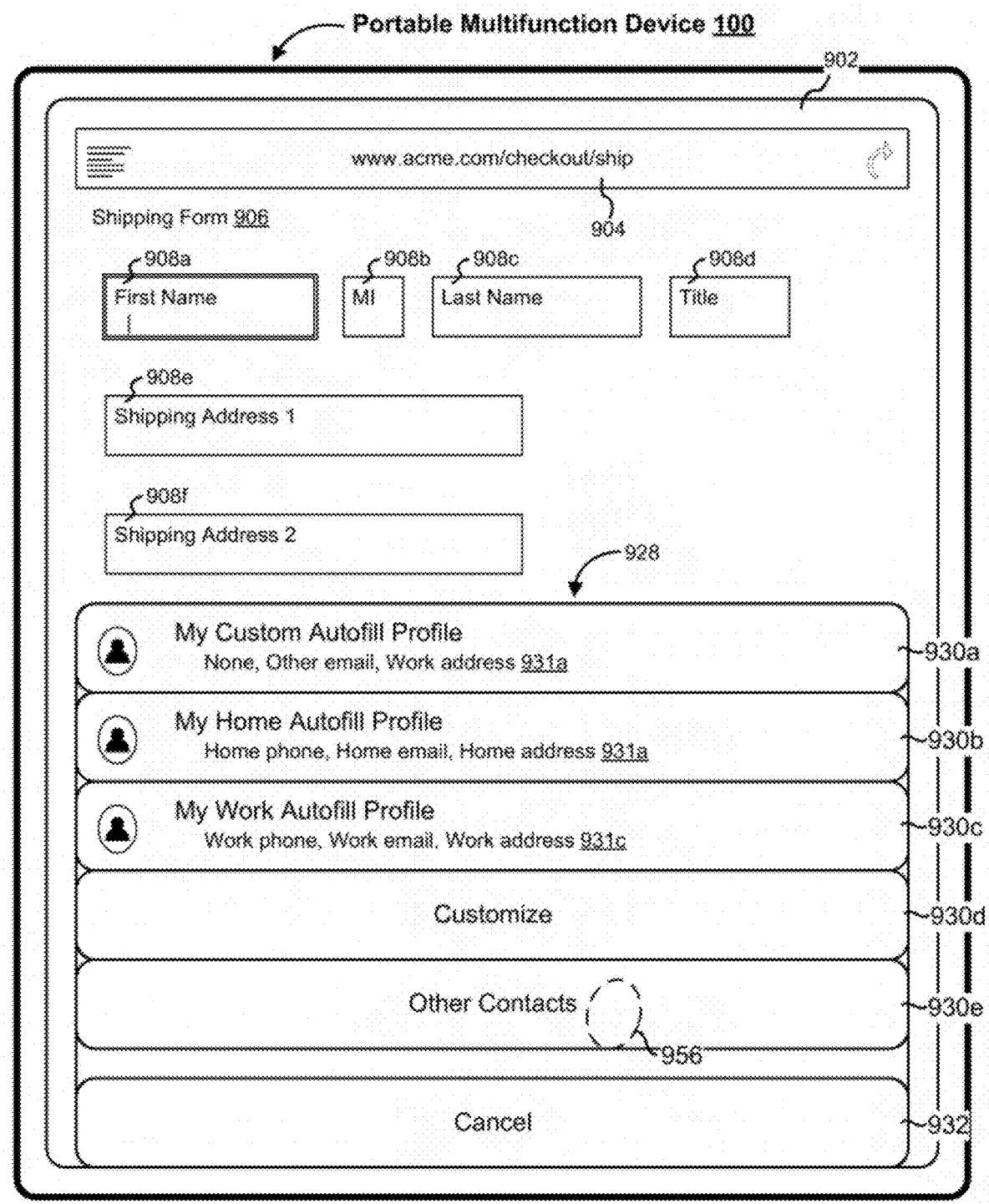
Figure 9H:
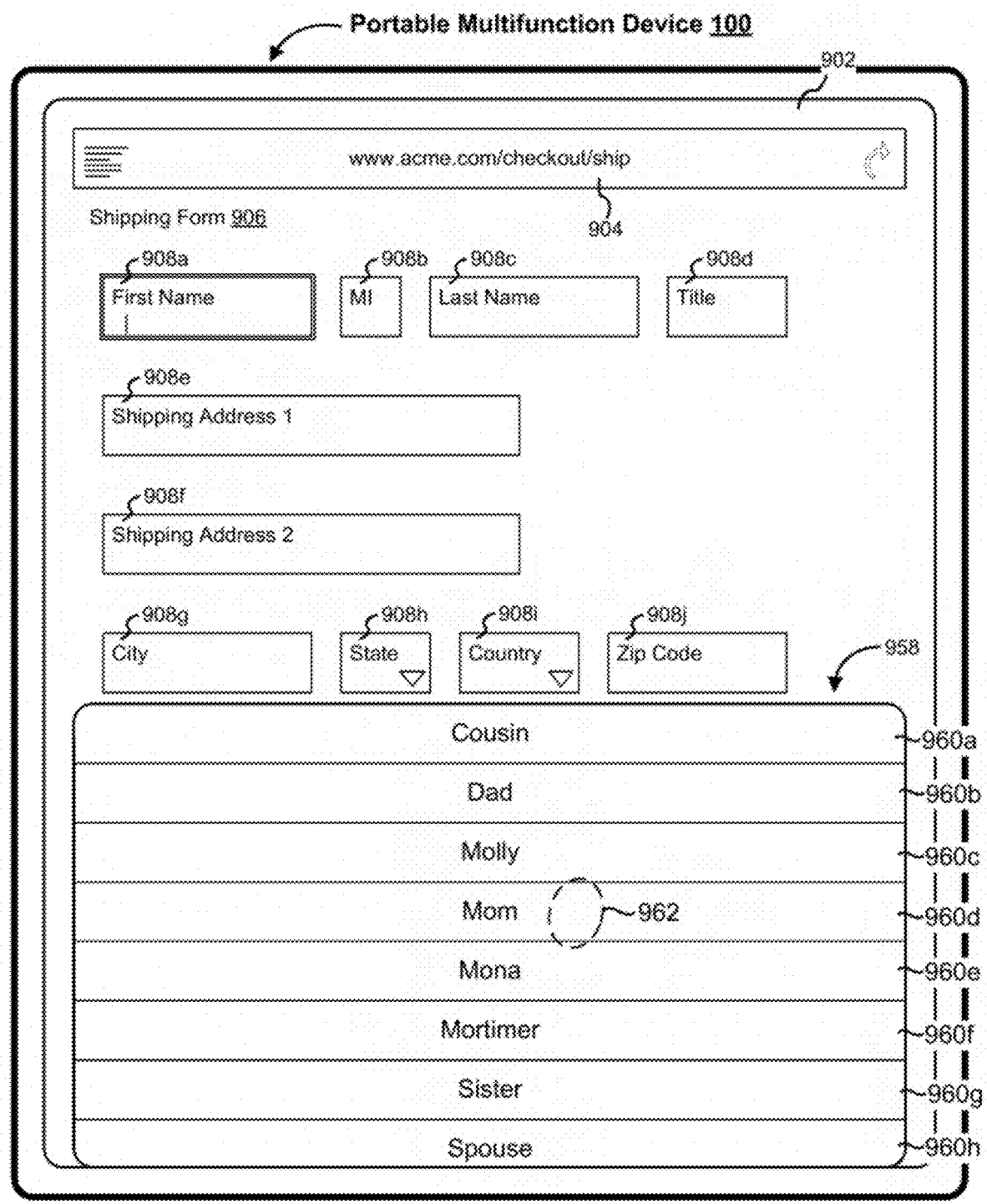
Figure 9I:
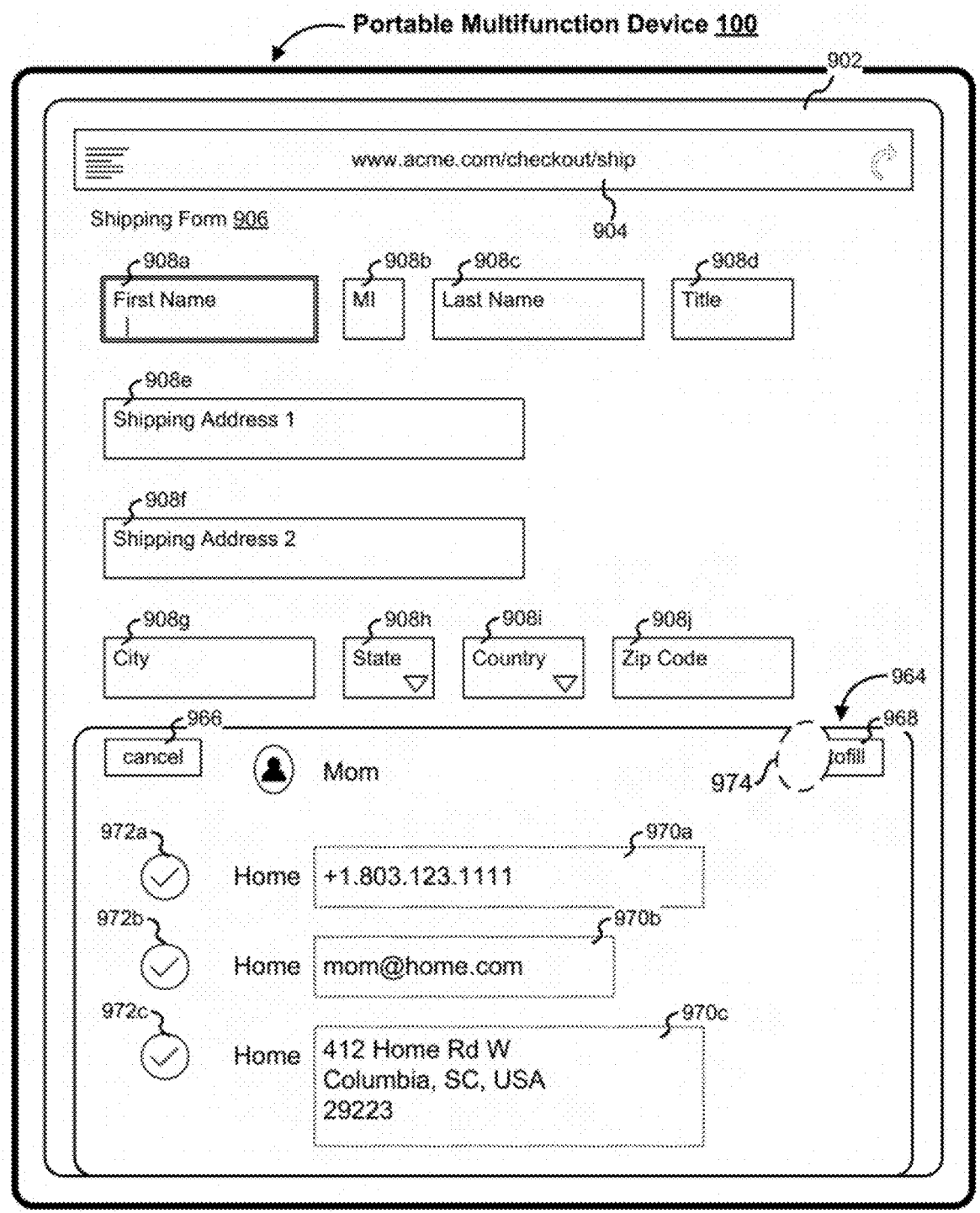
Figure 9J:
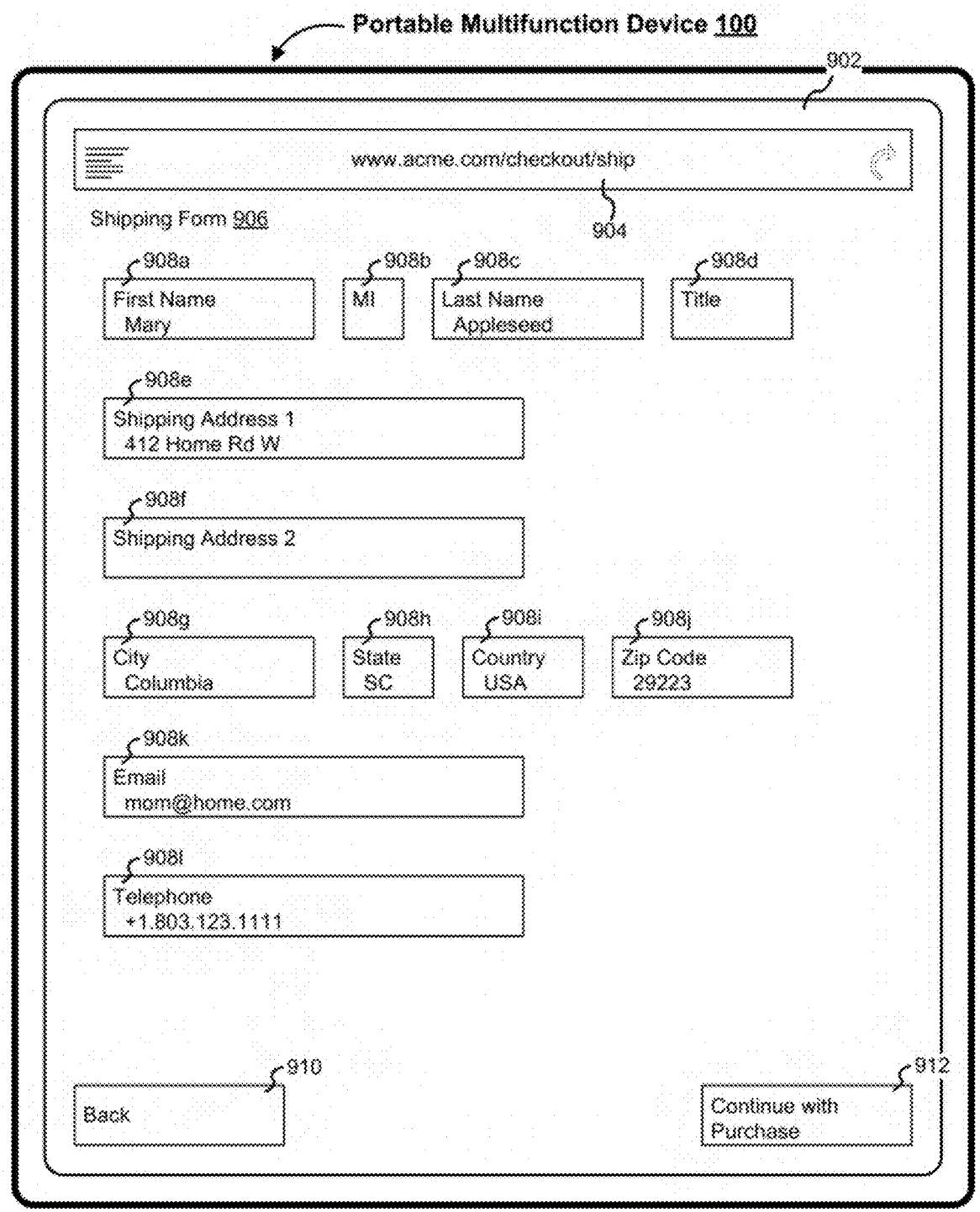
Figure 9K:
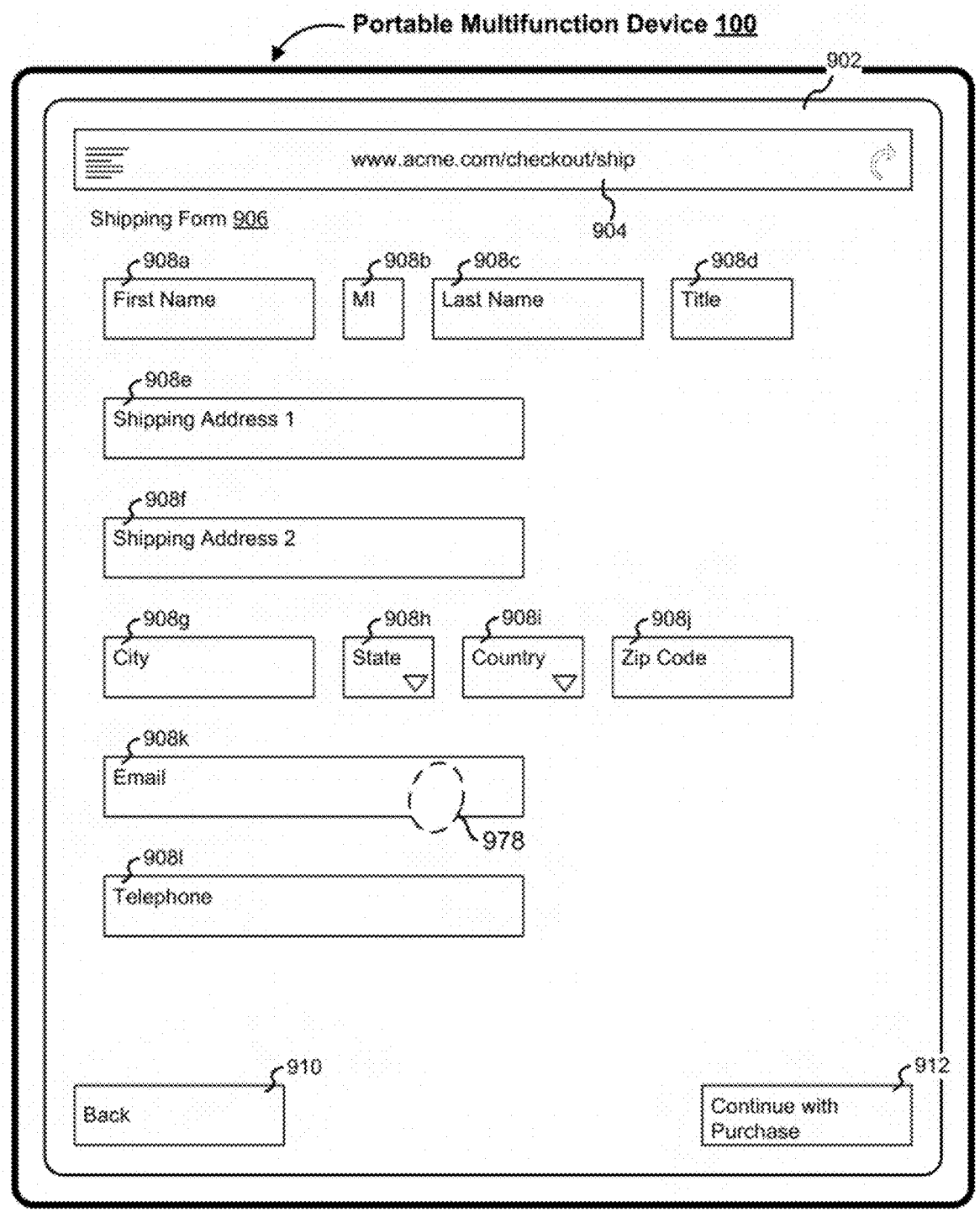
Figure 9L:
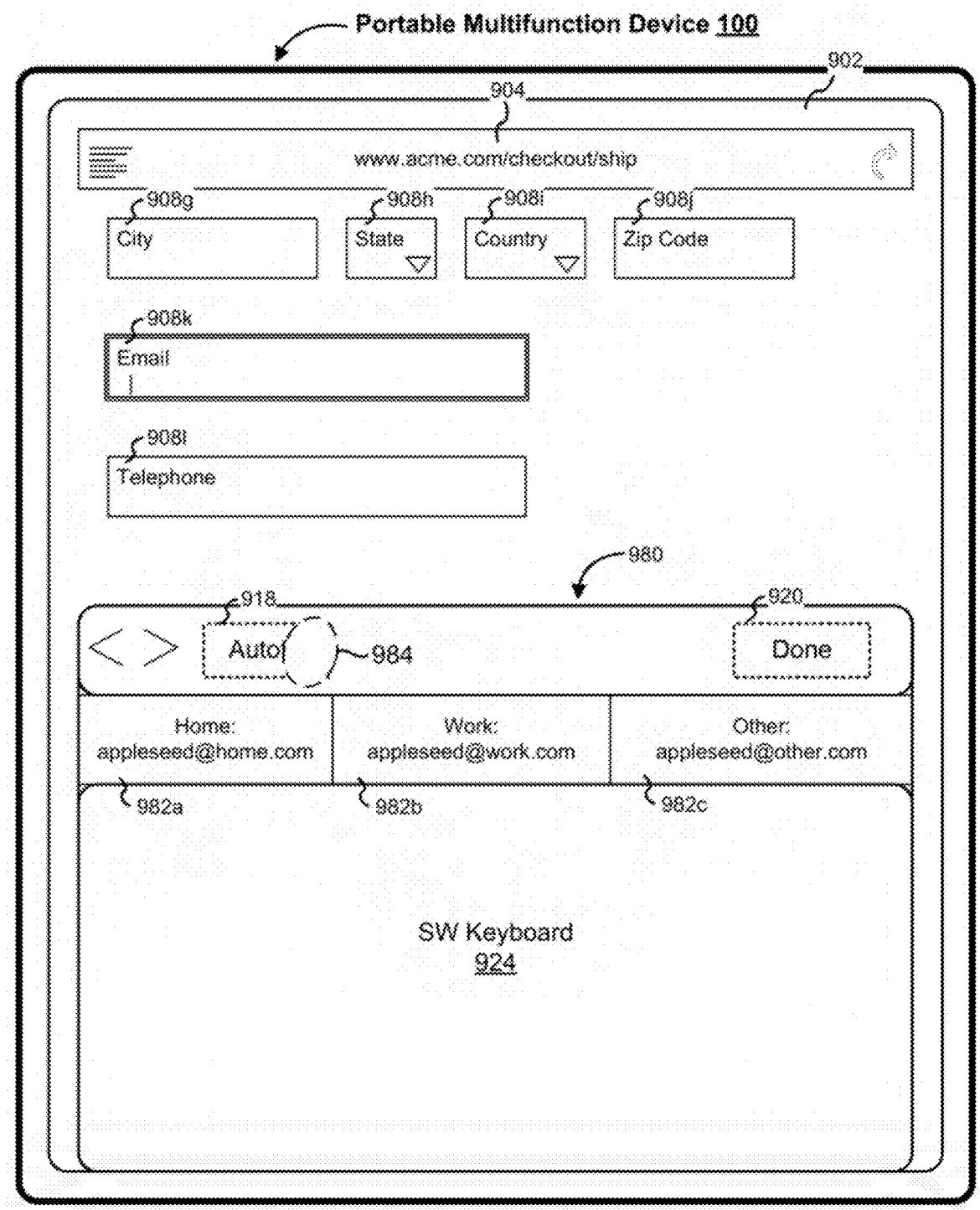
Figure 9M:
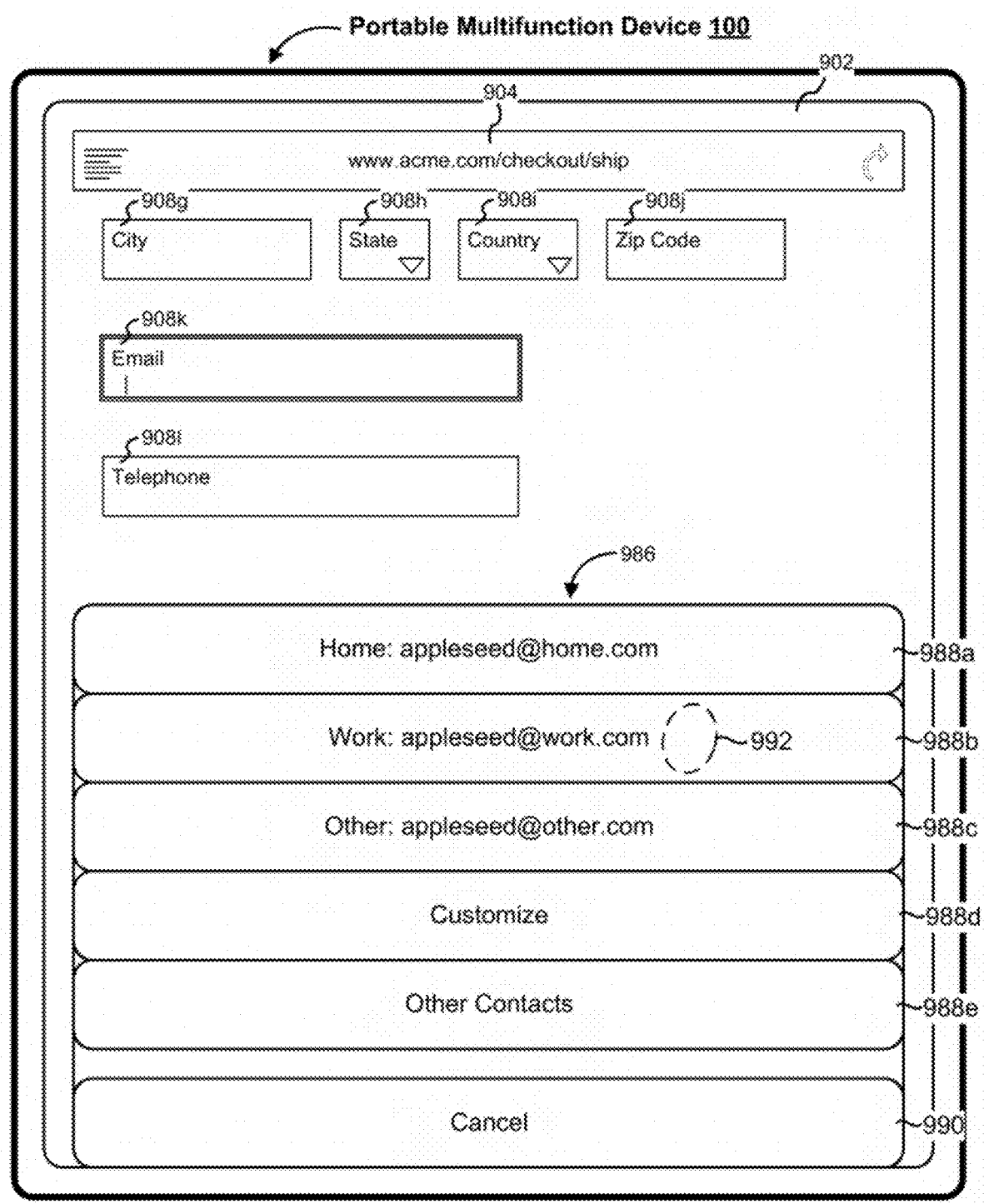
Figure 9N:
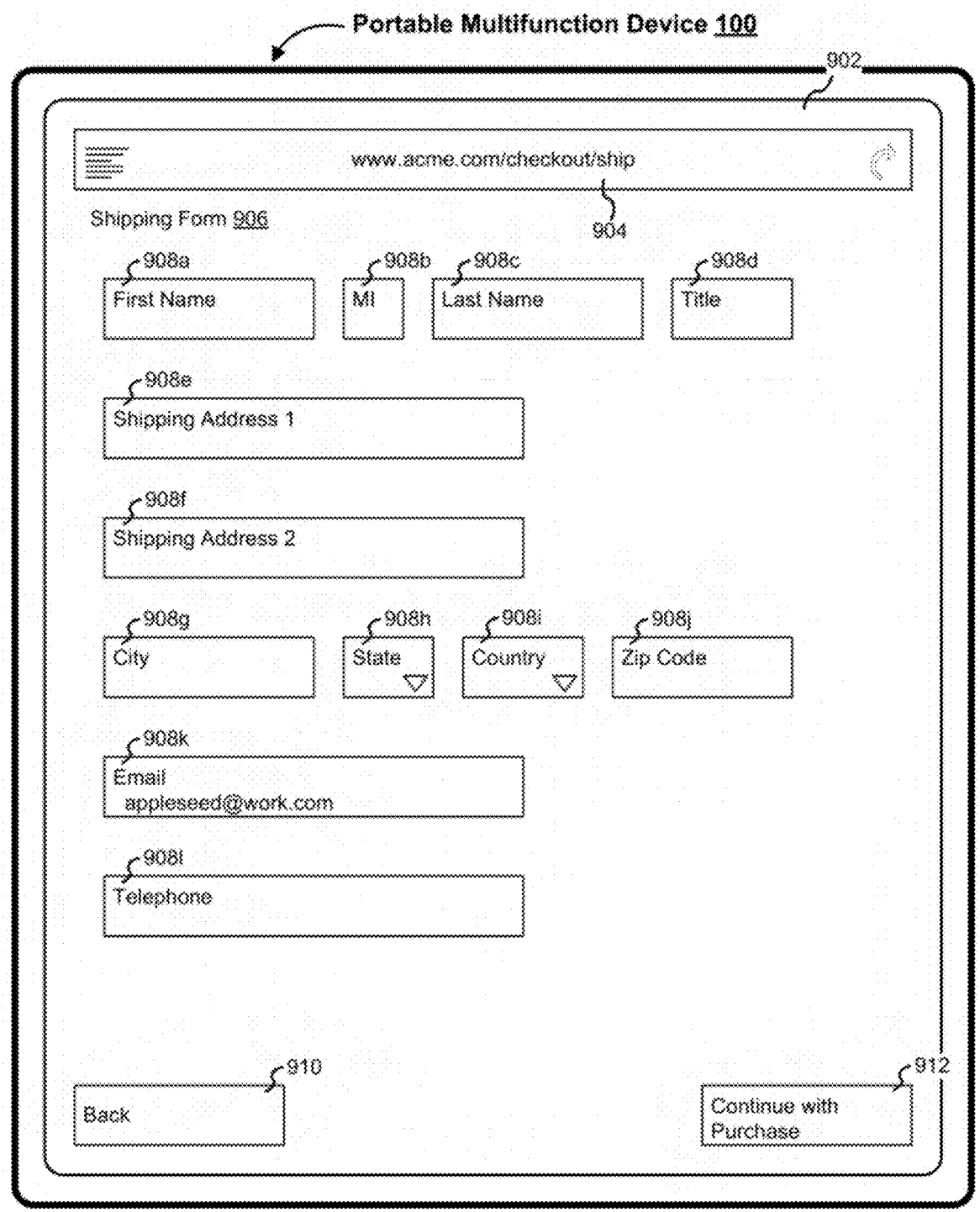
Figure 10B:
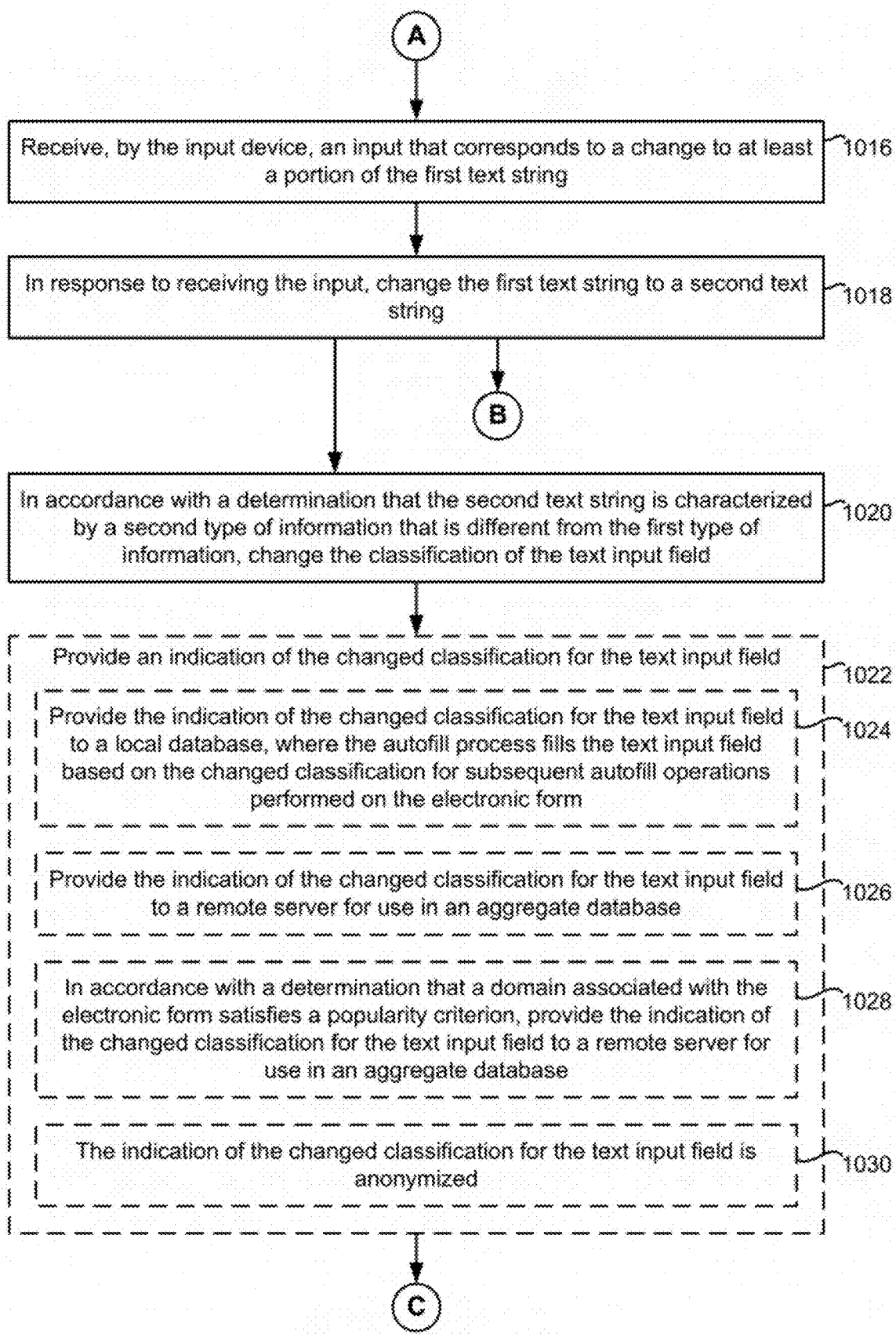
Figure 10C:
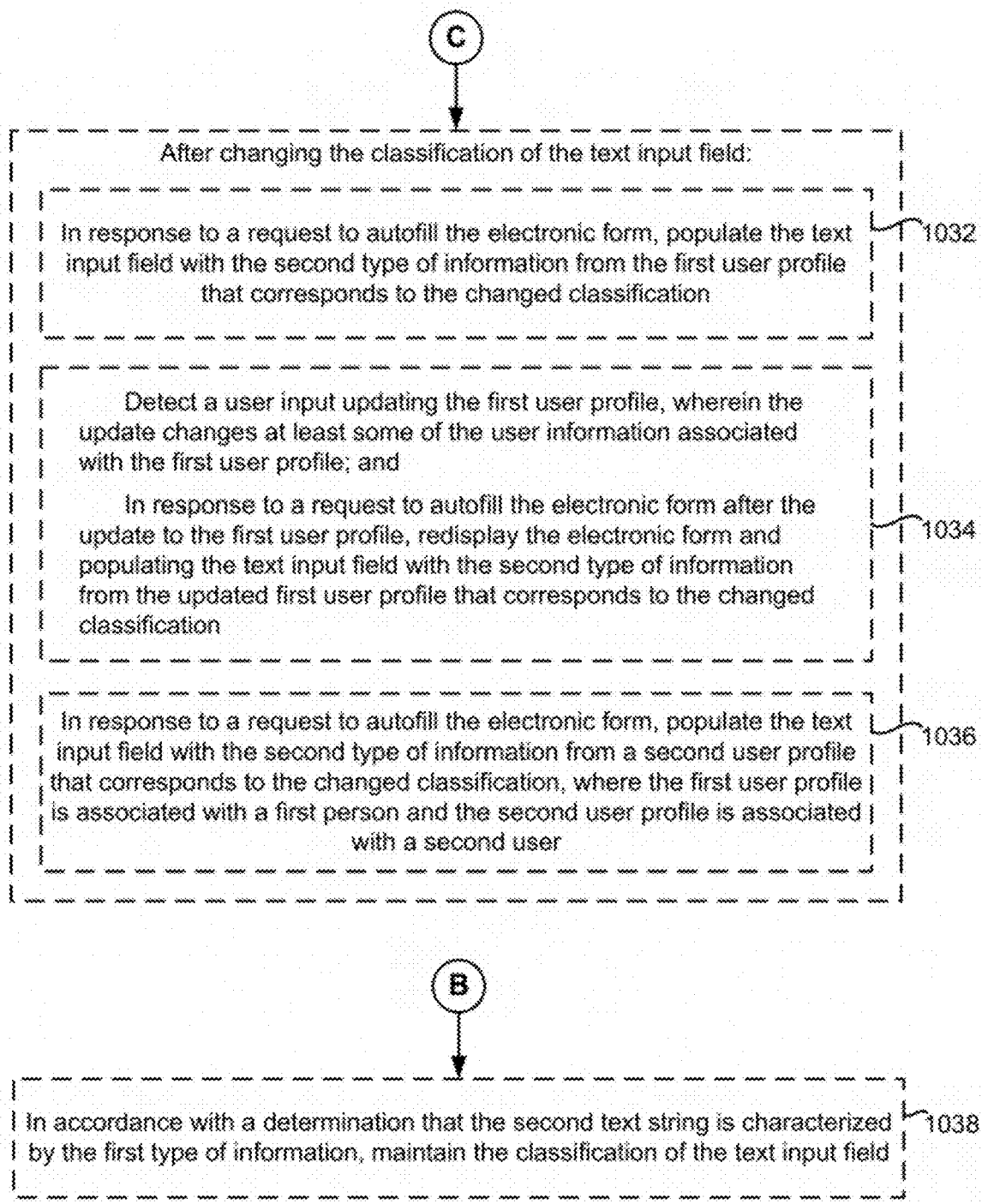
Figure 11A:
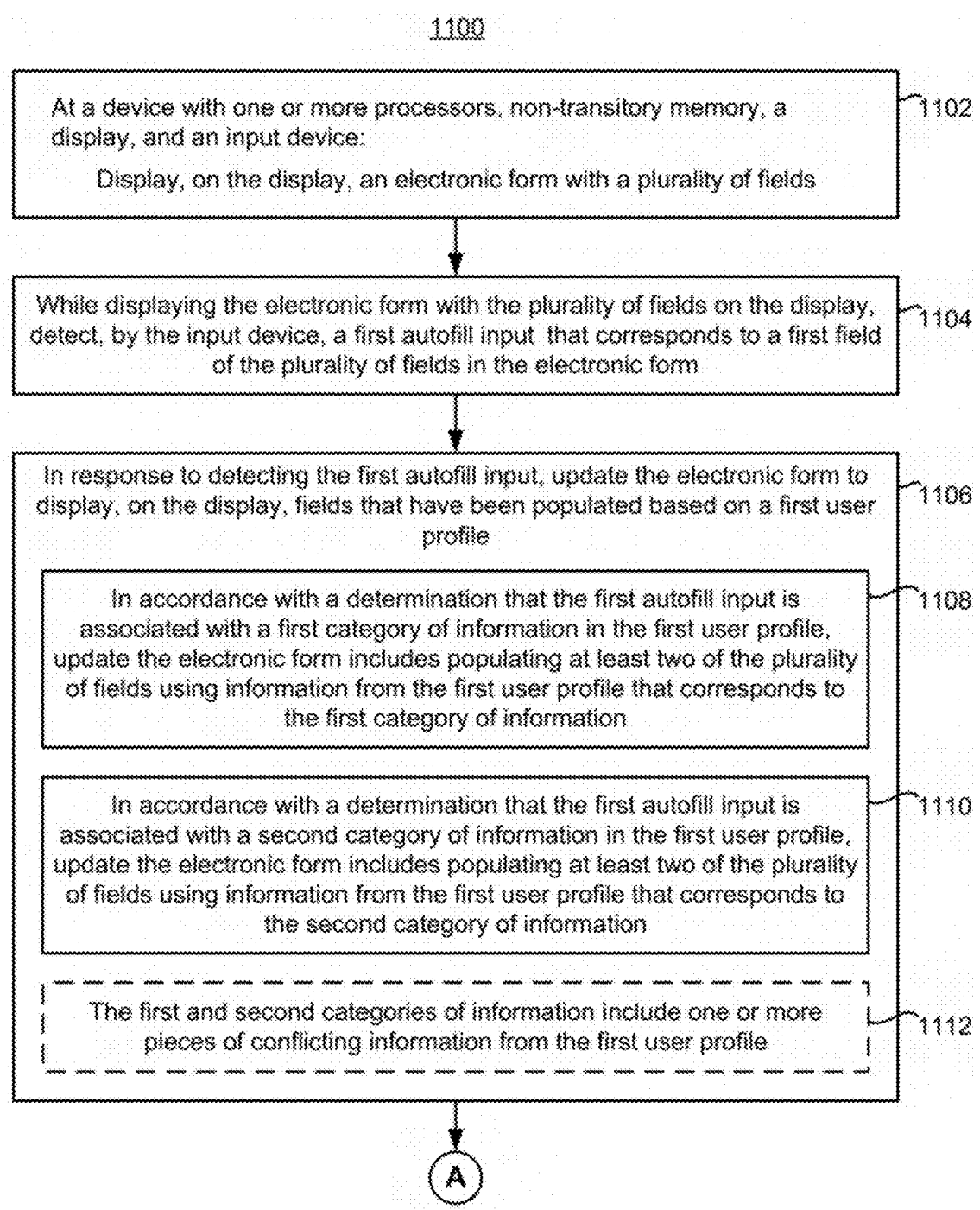
FIGS. 11A-11D illustrate a flow diagram of a method of populating fields of an electronic form in accordance with some embodiments.
Figure 11B:
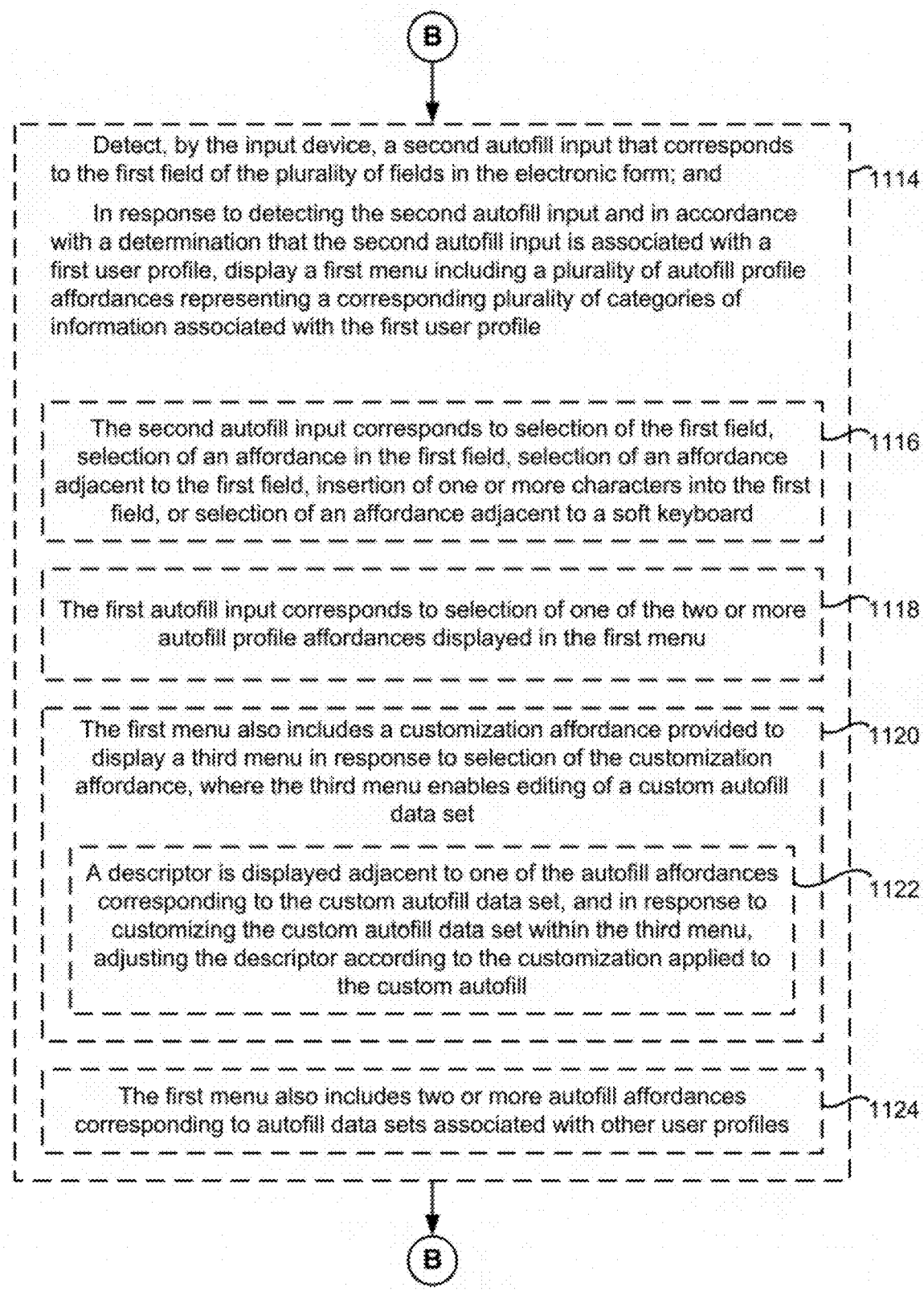
Figure 11C:
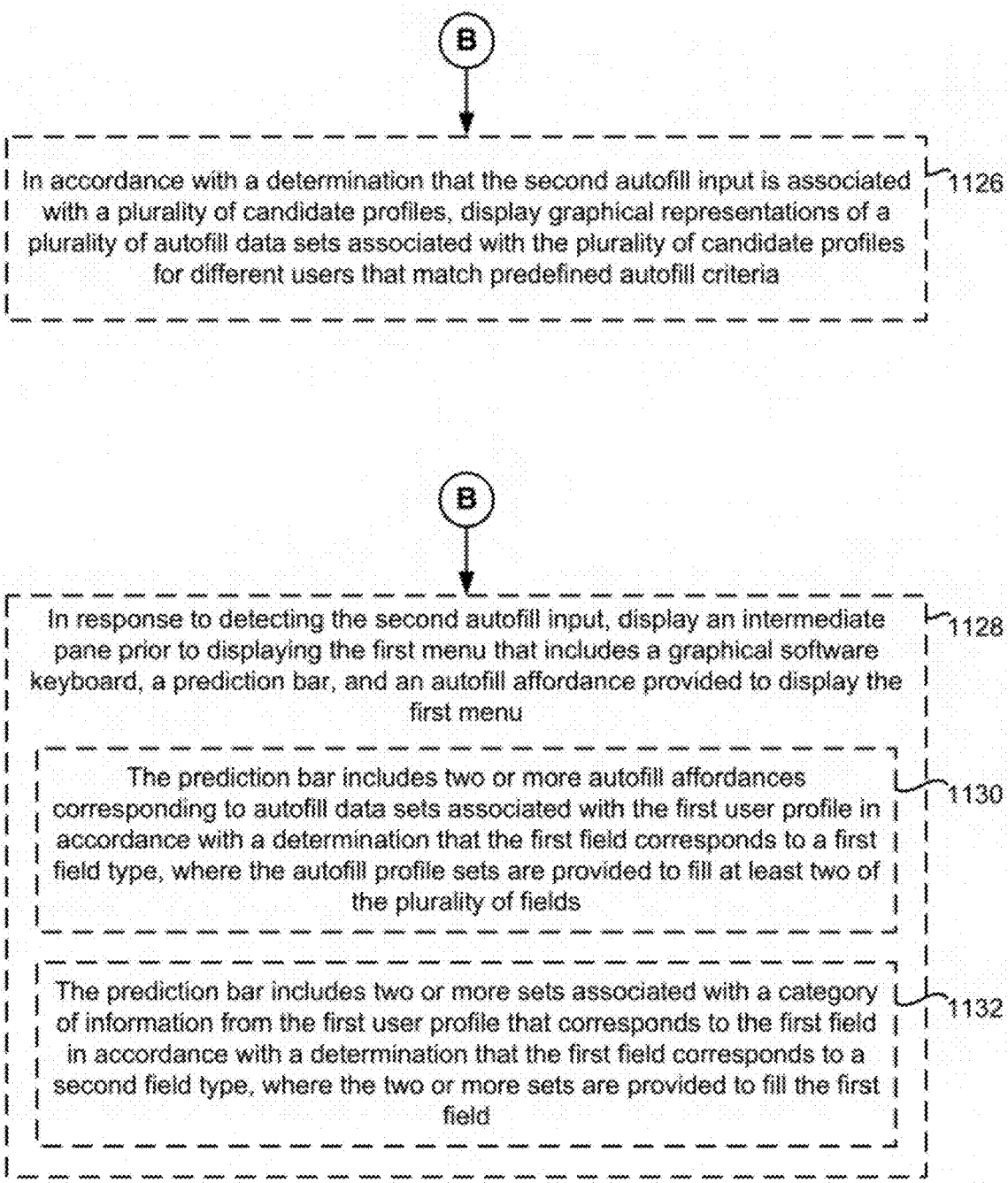
Figure 11D:
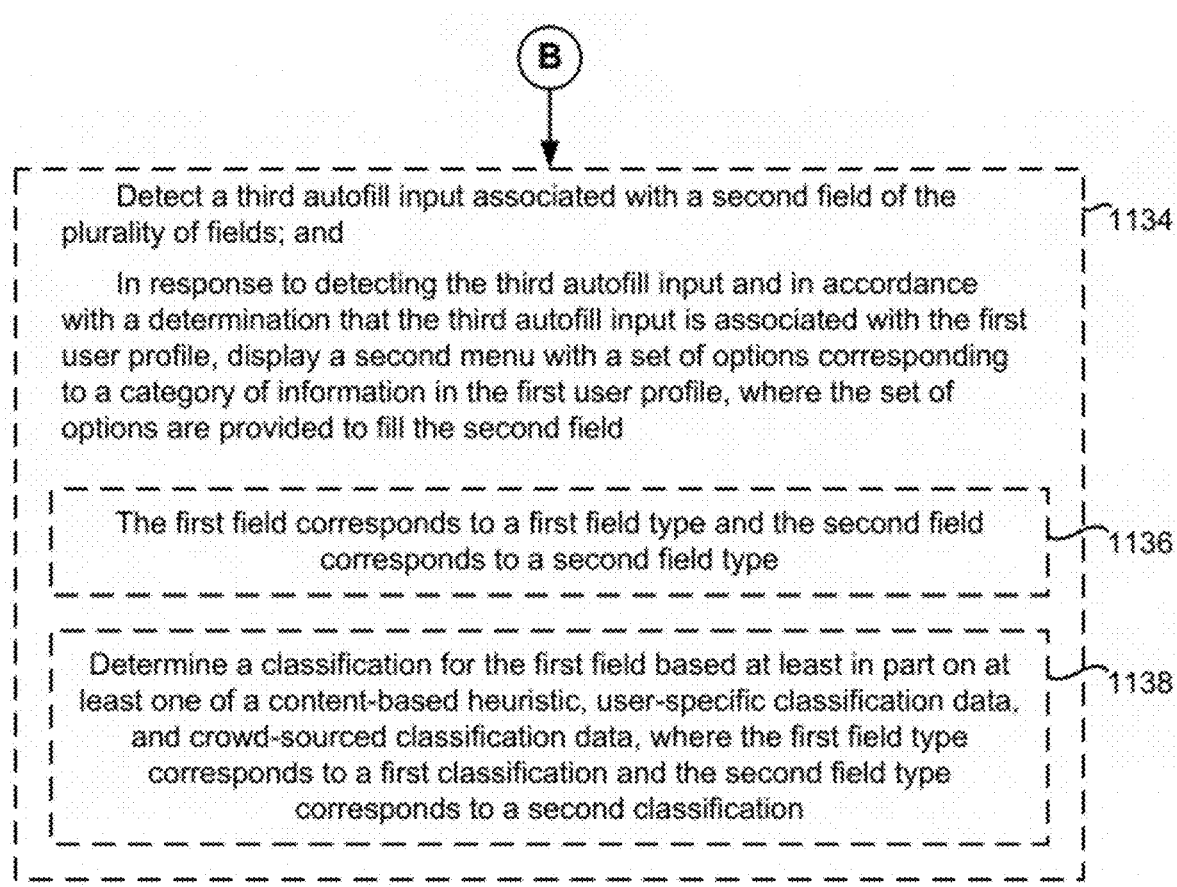

FIGS. 9A-9N illustrate example user interfaces for populating fields of an electronic form in accordance with some embodiments. The user interfaces in these figures are used to illustrate the processes described below, including the processes in FIGS. 11A-11D. Although some of the examples which follow will be given with reference to inputs on a touch-screen display (where the touch-sensitive surface and the display are combined), in some embodiments, the device detects inputs on a touch-sensitive surface 651 that is separate from the display 650, as shown in FIG. 6B.

FIGS. 9A-9C illustrate a sequence in an autofill menu 928 is overlaid on an electronic form 906. FIG. 9A illustrates a user interface 902 (e.g., associated with a web browser application) displaying an electronic form 906 corresponding to the URL (uniform resource locator) in the address bar 904. For example, in FIG. 9A, the electronic form 906 corresponds to a shipping form associated with a check-out process for a retail purchase. FIG. 9A also illustrates a contact 914 detected at a location corresponding to the first name field 908*a* within the electronic form 906.

As shown in FIG. 9A the electronic form 906 includes a plurality of fields (sometimes collectively referred to as the "fields 908" herein), including: a first name field 908*a*, a middle initial (MI) field 908*b*, a last name field 908*c*, a title field 908*d*, a first shipping address field 908*e*, a second shipping address field 908*f*, a city field 908*g*, a state field 908*h*, a country field 908*i*, a zip code field 908*j*, an email address field 908*k*, and a telephone number field 908*l*. In FIG. 9A, the electronic form 906 also includes a back affordance 910 for replacing display of the electronic form 906. with a previous screen or web page, and a "Continue with Purchase" affordance 912 for completing the check-out process or advancing to a next stage of the check-out process for a retail purchase.

In some embodiments, the device offers to fill specific fields in a cascading manner. As one example, if the user selects the city field (e.g., with a one finger tap gesture) in an electronic form that contains city, state, country and zip code fields, the device offers to fill the city, state, country and zip code fields with corresponding user information from one or more autofill data sets. As another example, if the user selects the state field (e.g., with a one finger tap gesture) in an electronic form that contains city, state, country and zip code fields, the device offers to fill the state, country and zip code fields with corresponding user information from one or more autofill data sets. As another example, if the user selects the zip code field (e.g., with a one finger tap gesture) in an electronic form that contains city, state, country and zip code fields, the device offers to fill the zip code field with corresponding user information from one or more autofill data sets.

FIG. 9B illustrates an intermediate menu 916 overlaid on the electronic form 906 in response to selection of the first name field 908*a* with the contact 914 in FIG. 9A. FIG. 9B also illustrates a contact 926 detected at a location corresponding to the "Autofill" affordance 918.

As shown in FIG. 9B, the intermediate menu 916 includes: an "Autofill" affordance 918, which, when activated (e.g., with a contact), causes display of an autofill menu (e.g., the autofill menu 928 in FIG. 9C); a "Done" affordance 920, which, when activated (e.g., with a contact), causes the intermediate menu 916 to cease to be displayed; and a software keyboard 924 (sometimes also referred to as a "soft keyboard" herein). As shown in FIG. 9B, the intermediate menu 916 also includes a plurality of autofill profile affordances 922*a*, 922*b*, and 922*c*, which, when activated (e.g., with a contact), cause at least some of the fields 908 of the electronic form 906 to be populated with a corresponding data set (e.g., a custom, home, and work data sets, respectively).

FIG. 9C illustrates an autofill menu 928 overlaid on the electronic form 906 in response to selection of the "Autofill" affordance 918 with the contact 926 in FIG. 9B. FIG. 9C also illustrates a contact 934 detected at a location corresponding to the customization affordance 930*d*. As shown in FIG. 9C, the autofill menu 928 includes: a first autofill profile affordance 930*a* associated with a custom data set for the user of the portable multifunction device 100, a second autofill profile affordance 930*b* associated with a home data set for the user of the portable multifunction device 100, a third autofill profile affordance 930*c* associated with a work data set for the user of the portable multifunction device 100, a customization affordance 930*d* provided to edit the custom data set, a third party contacts affordance 930*e* provided to select a third party data set, and a cancellation affordance 932 provided to cease display of the autofill menu 928.

For example, the autofill profile affordances 930*a*, 930*b*, and 930*c* are configured to populate at least some of the fields 908 of the electronic form 906 with a corresponding data set (e.g., a work data set for the third autofill profile affordance 930*c*) in response to activation thereof (e.g., a contact). For example, the customization affordance 930*d* is configured to display a customization menu (e.g., the customization menu 938 in FIG. 9D) in response to activation thereof (e.g., a contact).

As shown in FIG. 9C, for example, the first autofill profile affordance 930*a* includes a descriptor 931*a* (e.g., a text description) of the contact information that corresponds to the custom data set (e.g., the home telephone number, the other email address, and the work address). Similarly, the second autofill profile affordance 930*b* includes a descriptor 931*b* (e.g., a text description) of the contact information that corresponds to the home data set (e.g., the home telephone number, the home email address, and the home address). And, the third autofill profile affordance 930*c* includes a descriptor 931*c* (e.g., a text description) of the contact information that corresponds to the work data set (e.g., the work telephone number, the work email address, and the work address).

FIGS. 9C-9D illustrate a sequence in which a customization menu 938 is overlaid on the electronic form 906. FIG. 9D illustrates a customization menu 938 overlaid on the electronic form 906 in response to selection of customization affordance 930*d* with the contact 934 in FIG. 9C. FIG. 9D also illustrates a contact 948 detected at a location corresponding to the first indication 944a of the telephone number associated with the custom data set.

As shown in FIG. 9D, the customization menu 938 includes: a first indication 944a of the telephone number associated with the custom data set (e.g., home telephone number +1.408.123.4663), a second indication 944b of the email address associated with the custom data set (e.g., other email address appleseed@other.com), and a third indicator 944c of the address associated with the custom data set (e.g., the work address). The customization menu 976 also includes a plurality of status indicators 946a, 946b, and 946c (sometimes referred to collectively as the "status indicators 946") indicating that the telephone number, email address, and address, respectively, portions of the custom data set will be filled in corresponding fields when using the custom data set.

As shown in FIG. 9D, the customization menu 938 further includes a "cancel" affordance 940, which, when activated (e.g., with a contact), ceases to display the customization menu 938. The customization menu 938 further includes an "autofill" affordance 942, which, when activated (e.g., with a contact), causes at least some of the fields 908 of the electronic form 906 to be populated with contact information associated with the custom data set.

FIGS. 9D-9F illustrate a sequence in which the custom data set is edited via the customization menu 938. FIG. 9E illustrates a plurality of options 950a, 950b, 950c, 950d, 950e, and 950f for the telephone number to be included as part of the custom data set overlaid on the electronic form 906 in response to selection of the first indication 944a with contact 948 in FIG. 9D. FIG. 9E also illustrates detecting a contact 952 at a location corresponding to the sixth option 950f (e.g., "Don't Fill").

FIG. 9F illustrates that the first indication 944a of the telephone number associated with the custom data set has changed from the home telephone number +1.408.123.4663 in FIG. 9D to the absence of a telephone number (e.g., a null set) in response to selection of the sixth option 950f in FIG. 9E. Furthermore, the status indicator 946a has changed to show that the telephone number portion of the custom data set is disabled. As such, for example, the email address and address portions of the custom data set will be filled in corresponding fields when using the custom data but telephone number fields will not be filled set based on the status indicators 946 in FIG. 9F. As shown in FIG. 9G, for example, the descriptor 931 associated with the first autofill profile affordance 930a has changed to indicate that the custom data set corresponds to no telephone number, the other email address, and the work address. FIG. 9F also illustrates a contact 954 detected at a location corresponding to the "cancel" affordance 940.

FIGS. 9G-9I illustrate a sequence in which a third party contact menu 964 is overlaid on the electronic form 906. FIG. 9G illustrates the autofill menu 928 overlaid on the electronic form 906 in response to selection of the "cancel" affordance 940 with the contact 954 in FIG. 9F. FIG. 9G also illustrates a contact 956 detected at a location corresponding to the third party contacts affordance 930e.

FIG. 9H illustrates a list of contacts 958 of the user of the portable multifunction device 100 in response to selection of the third party contacts affordance 930e with the contact 956 in FIG. 9G. FIG. 9H also illustrates a contact 962 detected at a location corresponding to the "Mom" contact 960d. As shown in FIG. 9H, the list of contacts 958 includes a "Cousin" contact 960a, a "Dad" contact 960b, a "Molly" contact 960c, a "Mom" contact 960d, a "Mona" contact 960e, a "Mortimer" contact 960f, a "Sister" contact 960g, and a "Spouse" contact 960h.

FIGS. 9I-9J illustrate a sequence in which at least some the fields 908 of the electronic form 906 are populated with a third party data set associated with a "Mom" contact 960d. FIG. 9I illustrates a third party contact menu 964 associated with the "Mom" contact 960d in response to selection of the with the "Mom" contact 960d with the contact 962 in FIG. 9H. FIG. 9I also illustrates a contact 974 detected at a location corresponding to the "autofill" affordance 968.

As shown in FIG. 9I, the third party contact menu 964 includes: a first indication 970a of the telephone number (e.g., home telephone number +1.803.123.1111) for the third party data set associated with the "Mom" contact 960d, a second indication 970b of the email address (e.g., home email address mom@home.com) for the third party data set associated with the "Mom" contact 960d, and a third indicator 970c of the address (e.g., the home address) for the third party data set associated with the "Mom" contact 960d. The third party contact menu 964 also includes a plurality of status indicators 972a, 972b, and 972c (sometimes referred to collectively as the "status indicators 972") indicating that the telephone number, email address, and address, respectively, portions of the custom data set will be filled in corresponding fields when using the custom data set.

As shown in FIG. 9I, the third party contact menu 964 further includes a "cancel" affordance 966, which, when activated (e.g., with a contact), ceases to display the third party contact menu 964, and an "autofill" affordance 968, which, when activated (e.g., with a contact), causes at least some of the fields 908 of the electronic form 906 to be populated with the third party data set associated with the "Mom" contact 960d.

FIG. 9J illustrates at least some of the fields 908 of the electronic form 906 populated with the third party data set associated with the "Mom" contact 960d in response to selection of the "autofill" affordance 968 with the contact 974 in FIG. 9I.

For example, in FIG. 9J, the telephone number field 908l includes the home telephone number (+1.803.123.1111) corresponding to the first indication 970a in FIG. 9I, and the email address field 908k includes the home email address (mom@home.com) corresponding to the second indication 970b in FIG. 9I. Continuing with this example, in FIG. 9J, the first shipping address field 908e, the city field 908g, the state field 908h, the country field 908i, and the zip code field 908j include the home address 954 corresponding to the third indication 970c in FIG. 9I.

FIGS. 9K-9M illustrate a sequence in which a field population menu 986 is overlaid on the electronic form 906. FIG. 9K illustrates the user interface 902 (e.g., associated with a web browser application) displaying the electronic form 906 corresponding to the URL (uniform resource locator) in the address bar 904. For example, in FIG. 9K, the electronic form 906 corresponds to a shipping form associated with a check-out process for a retail purchase. FIG. 9K also illustrates a contact 978 detected at a location corresponding to the email address field 908k within the electronic form 906.

FIG. 9L illustrates an intermediate menu 980 overlaid on the electronic form 906 in response to selection of the email address field 908k with the contact 978 in FIG. 9K. FIG. 9L also illustrates a contact 984 detected at a location corresponding to the "Autofill" affordance 918.

As shown in FIG. 9L, the intermediate menu 980 includes: an "Autofill" affordance 918, which, when activated (e.g., with a contact), causes display of a field population menu (e.g., the field population menu 986 in FIG. 9M); a "Done" affordance 920, which, when activated (e.g., with a contact), causes the intermediate menu 980 to cease to be displayed; and a software keyboard 924. As shown in FIG. 9L, the intermediate menu 980 also includes a plurality of field population affordances 982*a*, 982*b*, and 982*c*, which, when activated (e.g., with a contact), cause the email address field 908*k* to be populated with a corresponding email address (e.g., home, work, and other email addresses, respectively).

FIG. 9M illustrates a field population menu 986 overlaid on the electronic form 906 in response to selection of the "Autofill" affordance 918 with the contact 984 in FIG. 9L. FIG. 9M also illustrates a contact 992 detected at a location corresponding to the second field population affordance 988*b*.

As shown in FIG. 9M, the field population menu 986 includes: a first field population affordance 988*a*, which, when activated (e.g., with a contact), causes the email address field 908*k* to be populated with the home email address (e.g., appleseed@home.com); a second field population affordance 988*b*, which, when activated (e.g., with a contact), causes the email address field 908*k* to be populated with the work email address (e.g., appleseed@work.com); a third field population affordance 988*c*, which, when activated (e.g., with a contact), causes the email address field 908*k* to be populated with the other email address (e.g., appleseed@other.com); a customization affordance 988*d*, which, when activated (e.g., with a contact), causes display of a customization menu for editing the custom data set (e.g., the customization menu 938 in FIG. 9D); and a third party contacts affordance 988*e* provided to select a third party data set (e.g., display the list of contacts 958 in FIG. 9H). The field population menu 986 also includes a cancellation affordance 990, which, when activated (e.g., with a contact), ceases display of the field population menu 986.

FIGS. 9M-9N illustrate a sequence in which a field of the electronic form 906 is populated. FIG. 9N illustrates a text string (e.g., appleseed@work.com) populating the email address field 908*k* in response to selection of the second field population affordance 988*b* with the contact 992 in FIG. 9M.

FIGS. 10A-10C illustrate a flow diagram of a method 1000 of changing a classification for a field in an electronic form in accordance with some embodiments. The method 1000 is performed at an electronic device (e.g., the portable multifunction device 100 in FIG. 1A, or the device 300 in FIG. 3) with a one or more processors, non-transitory memory, a display, and an input device. In some embodiments, the display is a touch-screen display and the input device is on or integrated with the display. In some embodiments, the display is separate from the input device. Some operations in method 1000 are, optionally, combined and/or the order of some operations is, optionally, changed.

As described below, the method 1000 provides an intuitive way to change a classification for a field in an electronic form. The method reduces the cognitive burden on a user when changing a classification for a field in an electronic form, thereby creating a more efficient human-machine interface. For battery-operated electronic devices, enabling a user to change a classification for a field in an electronic form faster and more efficiently conserves power and increases the time between battery charges.

The device displays (1002), on the display, an electronic form having a text input field populated with a first text string (e.g., email address) from a first user profile (e.g., a contact card with user information for a first user) based on a classification of the text input field associated with an autofill process, where the classification classifies the text input field as accepting a first type of information, and selection of the first text string is based at least in part on the classification. According to some embodiment, text input fields and text strings are described for ease of illustration. However, one of ordinary skill in the art will appreciate that the text input field may be a generic input field that accepts text strings as well as other inputs such as binary data. In some embodiments, the field is populated with binary data such as an image, a one-time key, generated payment data, or the like. In some embodiments, the classification of the text input field is a value. In some embodiments, the classification of the text input field is an initial classification. FIG. 5C, for example, shows a first electronic form 562 with a plurality of fields 566. For example, the first electronic form 562 corresponds to a shipping form associated with a check-out process for a retail purchase. FIGS. 5C-5E, for example, shows a sequence in which at least some of the fields 566 of the first electronic form 562 are populated based on classifications for the fields 566 determined by an autofill process and contact information from the "Me" contact 517 in FIG. 5A (e.g., the first user profile).

In some embodiments, the autofill process includes (1004): determining the (initial) classification for the text input field; and populating the text input field with the first text string based on the classification of the text input field, where the first text string corresponds to the first type of information from the first user profile. For example, information from a first name category in a user profile fills a field classified as a first name field, information from a last name category in a user profile fills a field classified as a last name field, and so on.

In some embodiments, the autofill process is performed in response to selection of an autofill affordance (e.g., selection of the "Yes" affordance 576*a* within the autofill prompt 574 in FIG. 5D). In some embodiments, the autofill process is performed in response to detecting a key combination for initiating the autofill process. In some embodiments, the autofill process is performed in response to detecting a gesture for initiating the autofill process. In some embodiments, the autofill process is performed in response to selecting an affordance or menu option for initiating the autofill process. In some embodiments, the autofill process is performed in response to a user input indicating selection of the field. In some embodiments, the autofill process is performed automatically when rendering the electronic form. In some embodiments, the classification is determined prior to detecting the autofill request (e.g., prior to the selection of the "Yes" affordance 576*a* from the autofill prompt 574 in FIG. 5D).

In some embodiments, determining the (initial) classification for the text input field includes generating (1006) an initial classification for the text input field based at least in part on a content-based classification heuristic. In some embodiments, the content-based classification heuristic determines a classification for each field of the electronic form based on its relationship to other fields (e.g., a last name or middle initial field might be adjacent or proximate to a first name), location (e.g., a name field is more likely to be at the top of an electronic form), size (e.g., a smaller field area-wise might be a state field and a larger field area-wise might be an address field), name, accompanying markup (e.g., a state or country field might be associated with a drop down menu), field identifiers (e.g., a first name field may be named "firstname" in the markup), static text nearby the field, and/or the like.

In some embodiments, some fields are purposefully not filled for security and/or privacy reasons such as a credit card CVV code. In some embodiments, some fields are purposefully not filled due to the user customization (e.g., removal of telephone number from custom autofill data set). As one example, in FIGS. 5S-5V a user amendment adds the text string "xxx" to the CVV code field 594*l*. However, in this example, the classification for the CVV code field 594*l* is not changed because the CVV code field is purposefully associated with a null classification for security reasons.

In some embodiments, determining the (initial) classification for the text input field includes generating (1008) an initial classification for the text input field based at least in part on a first classification determined based on a previous user amendment of the text input field by a user of the device. As such, for example, the autofill process is improved based on previous amendments made by the user such that fewer future user amendments are made to auto-filled fields. Thus, in some scenarios, this improvement to the autofill process saves users the time and effort exerted to correct fields that are incorrectly auto-filled. In some embodiments, the first classification is obtained from a local corrections database of classifications based on previous user-specific amendments to fields populated by the autofill process (e.g., the local field classifications database 620 in FIGS. 6-7).

In some embodiments, determining the (initial) classification for the text input field includes generating (1010) an initial classification for the text input field based at least in part on a second classification determined based on aggregate amendments of the text input field by other users. As such, for example, the autofill process is improved based on amendments made by other users such that fewer future user amendments are made to auto-filled fields. Thus, in some scenarios, this improvement to the autofill process saves users the time and effort exerted to correct fields that are incorrectly auto-filled. In some embodiments, the second classification is obtained from an aggregate corrections database of classifications based on amendments to fields populated by the autofill process that were made by at least a predefined number of other users (e.g., crowd-sourced or aggregated amendments from the aggregate field classifications database 630 in FIGS. 6-7). In some embodiments, the crowd-sourced or aggregated amendments are limited to a subset of the most popular websites or websites most frequently visited by the user to reduce the size of the aggregate corrections database in order to safeguard the identity of users that visit potentially distinguishable websites such as an exotic web forum with a limited number of users.

In some embodiments, the first and second classifications supersede (1012) a classification generated by the content-based heuristic, and the first classification supersedes the second classification. In some embodiments, a classification determined by a previous user-specific amendment is prioritized over a classification determined by crowd-sourced or aggregate amendments (e.g., because it represents a preference generated from the user in question as to the proper value to fill in the field). In some embodiments, a classification determined by either (A) a previous user-specific amendment or (B) crowd-sourced or aggregate amendments is prioritized over a classification determined by the content-based classification heuristic. As such, for example, the process tailors the autofill process to the behavior of the user by prioritizing previous user-specific amendments over amendments made by other users.

In some embodiments, the device obtains (1014) at least one aggregate amendment associated with a different classification for the text input field from the remote server, where the at least one crowd-sourced user amendment satisfies a frequency threshold. For example, the frequency threshold is satisfied when a same amendment to a field is reported by X users, where X is scaled based on the popularity of the associated domain. As such, for example, the frequency threshold serves as a filtering mechanism that disregards isolated or mistaken user amendments. In some embodiments, the aggregate corrections database pushes indications of crowd-sourced or aggregate amendments that satisfy the frequency threshold to the device according to a predefined schedule (e.g., once per hour, once per day, or upon each update to the device OS, device firmware, or web browser).

The device receives (1016), by the input device, an input that corresponds to a change to at least a portion of the first text string. For example, the change includes a user amendment or correction of the first text string by overwriting (replacing), deleting, modifying, or adding text to a portion of the first text string. In another example, input changes binary data that populates the field. FIGS. 5E-5G, for example, show a sequence in which changes are made to text strings filling/populating some of the fields 566 of the first electronic form 562. For example, "Unit 3" is added to the second shipping address field 566*f*, which was previously empty. As another example, "appleseed@home.com" replaces the previous text string that populated the email address field 566*k*. As yet another example, "+1.408.123.4663" replaces the previous text string that populated the telephone number field 566*l*.

In response to receiving the input, the device changes (1018) the first text string to a second text string. In some embodiments, the device determines whether the first and second text strings correspond to different categories of user information from the user profile such as email address and telephone number. In some embodiments, the user change/amendment to the text string in the text input field is detected in real time such as a keystroke inputs, a voice input, or selection from other autofill options. In some embodiments, the user change/amendment to the text string in the text input field is detected after submission of the electronic form (e.g., after selection of the "Continue to Payment" affordance 588 in FIG. 5R) when the first text string is compared to the second text strong associated with the submitted field. In some embodiments, the user change/amendment to the text string in the text input field is detected after reloading the electronic form (e.g., after selection of the refresh affordance 568 in FIG. 5G).

In accordance with a determination that the second text string is characterized by a second type of information that is different from the first type of information, the device changes (1020) the classification of the text input field. In some embodiments, a new classification of the text input field replaces the initial classification of the text input field such switching from the classification for a field from an email address field to a telephone number field. As such, for example, fewer future user amendments to the text input field will be made by the user of the device and also by other users during subsequent visits to the electronic form. Thus, in some scenarios, this improvement to the autofill process saves users the time and effort exerted to correct fields that are incorrectly auto-filled.

As a first example, after selection of the refresh affordance 568 in FIG. 5G and entry of the text string "Unit 3" in FIGS. 5E-5G, the classification for the second shipping address field 566f is changed from a null classification to an overflow address classification. As another example, after selection of the refresh affordance 568 in FIG. 5G and entry of the text string "appleseed@home.com" in FIGS. 5E-5G, the classification for the email address field 566k is changed from a telephone number classification to an email address classification. As yet another example, after selection of the refresh affordance 568 in FIG. 5G and entry of the text string "+1.408.123.4663" in FIGS. 5E-5G, the classification for the telephone number field 566l is changed from an email address classification to a telephone number classification. As yet another example, after selection of the "Continue to Payment" affordance 588 in FIG. 5R and deletion of the text string "10-25-1986" in FIGS. 5O-5R, the classification for the rewards number field 584g is changed from a date of birth classification to a null classification.

In some embodiments, the new classification is determined by matching the user amendment to a different piece of information in the user profile (e.g., the "Me" contact 517 in FIG. 5A). In some embodiments, the new classification is determined based on a rule set. For example, an email address is identified based on the inclusion of the "@" character, a first name is identified based on the inclusion of only alphabetic characters, and an address is identified based on the inclusion of both alphabetic and numeric characters.

In some embodiments, the device provides (1022) an indication of the changed classification for the text input field. For example, with reference to FIGS. 6-7, an indication of the changed classification for the text input field is provided to the local field classification database 620 and/or the aggregate field classification database 630. For example, with reference to FIG. 7, the representative indication 702 includes a fingerprint portion 704 that characterizes the respective field and a classification portion 708 associated with the classification of respective field (e.g., the changed classification).

In some embodiments, the indication of the changed classification for the text input field is provided to (1024) a local database, where the autofill process fills the text input field based on the changed classification for subsequent autofill operations performed on the electronic form. As such, for example, on subsequent visits to a web page that includes the electronic form the test input field is be populated based on the changed classification. For example, with reference to FIGS. 6-7, the indication of the changed classification is provided to the local field classification database 620. In some embodiments, the indication includes the new classification for the field and a fingerprint for the field in order to index the local corrections database. In one example, the fingerprint is a function of the CSS (cascading style sheet) field for the field, the name of the field, the ID of the field, the domain associated with the electronic form, and (optionally) a version number of the autofill heuristic. In some embodiments, the local database is erased due to a request to erase the browser cache or browsing history.

In some embodiments, the device provides (1026) the indication of the changed classification for the text input field to a remote server for use in an aggregate database. As such, for example, the changed classification can be applied to other users who visit the electronic form, which saves those users the potential time and effort exerted when correcting incorrectly auto-filled field. For example, with reference to FIGS. 6-7, an indication of the changed classification for the text input field is provided to the aggregate field classification database 630. In some embodiments, the indication includes the new classification for the field and a fingerprint for the field in order to index the aggregate database.

In some embodiments, in accordance with a determination that a domain associated with the electronic form satisfies a popularity criterion, the device provides (1028) the indication of the changed classification for the text input field to a remote server for use in an aggregate database (e.g., a remote server). For example, the domain is a host name, a URL (uniform resource locator), or an IP address. For example, the popularity criterion is satisfied when the domain associated with the electronic form is one of the N most popular websites in a specified geographic region. In some embodiments, information that is sent to the remote server about user amendments to fields populated by the autofill process corrections is limited to popular websites to preserve user privacy by avoiding sending information to the remote server about infrequently visited websites that are visited by user of the device.

In some embodiments, in accordance with a determination that the domain of the electronic form does not satisfy the popularity criterion, the indication of the changed classification for the text input field is not provided to the remote server. In some embodiments, an indication of all changed classifications are provided to the remote server. However, the domain is only an attribute of the fingerprint when the popularity criterion is satisfied. In some embodiments, the remote server is a server that is operated at the direction of an entity that is responsible for creation of the web browser (e.g., a company that created the web browser). In some embodiments, the remote server is a server that is under the control of a third party such as a writer of an autofill extension or plugin. In some embodiments, the remote server is under the control of a party who controls the network in which the electronic device operates (e.g., a corporate or educational intranet).

In some embodiments, the indication of the changed classification for the text input field is (1030) anonymized. As such, for example, the identity of the user who made the user amendment is safeguarded. In some embodiments, the indication of the changed classification includes the new classification for the field and a fingerprint for the field in order to index the local and/or aggregate database. For example, as shown in FIG. 7, the fingerprint 704 is a function of one or more attributes 706 associated with the respective field. For example, the fingerprint 704 is a value, which is a hash of the one or more attributes 706. Thus, according to some embodiments, the fingerprint 704 is anonymized In some embodiments, the one or more attributes 706 include at least one of: a CSS (cascading style sheet) class 706a for the respective field; a name 706b for the respective field; an identifier (ID) or identification value 706c for the respective field; a domain 706d (e.g., a host name, a uniform resource locator (URL), an IP address, or the like) associated with the electronic form that includes the respective field; and a version number 706e associated with the web browser or the content-based classification heuristic.

In some embodiments, after changing the classification of the text input field (e.g., when the web page associated with the electronic form is reloaded or a different contact is selected for autofill) and in response to a request to autofill (e.g., automatically populate) the electronic form, the device optionally redisplays the electronic form and populates (1032) the text input field with the second type of information from the first user profile that corresponds to the changed classification. As one example, in FIG. 5J, the fields 566 of the first electronic form 562 are populated with contact information for the "Me" contact 517 based on the previous amendments made to the fields 566 by the user of the device 300 in FIGS. 5E-5G. As such, in FIG. 5J, the second shipping address field 566f is no longer under filled/populated. Furthermore, in FIG. 5J, the email address field 566k and the telephone number fields 566l are no longer improperly filled/populated.

In some embodiments, after changing the classification of the text input field, the device detects (1034) a user input updating the first user profile, where the update changes at least some of the user information associated with the first user profile (e.g., overwriting an address category), and, in response to a request to autofill the electronic form, the device redisplays the electronic form and populating the text input field with the second type of information from the updated first user profile that corresponds to the changed classification. As such, the autofill process does not store or remember the text string that the user previously entered as part of the amendment/correction that changed the classification for the text input field. Instead, for subsequent visits to the electronic form that includes the text input field, the autofill process correctly populates the text input field based on the changed classification. This applies to updated contact information in the user profile or contact information for a user profile of a third party.

As one example, in FIG. 5L, the fields 566 of the first electronic form 562 are populated with contact information for the "Spouse" contact 519 based on the previous amendments made to the fields 566 by the user of the device 300 in FIGS. 5E-5G. As such, in FIG. 5L, the second shipping address field 566f is no longer under filled/populated. Furthermore, in FIG. 5L, the email address field 566k, and the telephone number fields 566l are no longer improperly filled/populated.

In some embodiments, after changing the classification of the text input field and in response to a request to autofill the electronic form, the device populates (1036) the text input field with the second type of information from a second user profile that corresponds to the changed classification, where the first user profile is associated with a first person and the second user profile is associated with a second user. As such, for example, the text input field will be filled based on the changed classification, which saves the user time and effort to correct an otherwise incorrectly auto-filled field. For example, after a first family member corrects an incorrectly or improperly populated field on a web page, the field is correctly populated when a second family member subsequently accesses the web page based on the correction by the first family member.

As one example, in FIG. 5K, the fields 566 of the first electronic form 562 are populated with updated contact information for the "Me" contact 517 (e.g., a different telephone number from the plurality of telephone numbers 524 in FIG. 5A) based on the previous amendments made to the fields 566 by the user of the device 300 in FIGS. 5E-5G. For example, the user of the device 300 updated the "Me" contact 517 so that the home telephone number was changed from "+1.408.123.4663" to "+1.408.333.8888." As such, in FIG. 5K, the second shipping address field 566f is no longer under filled/populated. Furthermore, in FIG. 5K, the email address field 566k, and the telephone number fields 566l are no longer improperly filled/populated.

In some embodiments, in accordance with a determination that the second text string is characterized by the first type of information, the device maintains (1038) the classification of the text input field. For example, the user changes an old email address populating a field to a new work email address. In this example, the classification of the field is not changed because the classification of the field (e.g., email address classification) was correct but stale/extraneous information from the user profile was used to populate the field.

It should be understood that the particular order in which the operations in FIGS. 10A-10C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600 and 1100) are also applicable in an analogous manner to method 1000 described above with respect to FIGS. 10A-10C. For example, the contacts, gestures, user interface objects, and focus selectors described above with reference to method 1000 optionally have one or more of the characteristics of the contacts, gestures, user interface objects, and focus selectors described herein with reference to other methods described herein (e.g., methods 600 and 1100). For brevity, these details are not repeated here.

FIGS. 11A-11D illustrate a flow diagram of a method 1100 of populating fields of an electronic form in accordance with some embodiments. The method 1100 is performed at an electronic device (e.g., the portable multifunction device 100 in FIG. 1A, or the device 300 in FIG. 3) with a one or more processors, non-transitory memory, a display, and an input device. In some embodiments, the display is a touch-screen display and the input device is on or integrated with the display. In some embodiments, the display is separate from the input device. Some operations in method 1100 are, optionally, combined and/or the order of some operations is, optionally, changed.

As described below, the method 1100 provides an intuitive way to populate fields of an electronic form. The method reduces the cognitive burden on a user when populating fields of an electronic form, thereby creating a more efficient human-machine interface. For battery-operated electronic devices, enabling a user to populate fields of an electronic form faster and more efficiently conserves power and increases the time between battery charges.

The device displays (1102), on the display, an electronic form with a plurality of fields. As one example, FIG. 8C shows a window 858 (e.g., for a web browser application) displaying an electronic form 862 corresponding to the URL (uniform resource locator) in the address bar 860 with a plurality of fields 864. For example, in FIG. 8C, the electronic form 862 corresponds to a shipping form associated with a check-out process for a retail purchase. As another example, FIG. 9A shows a user interface 902 (e.g., associated with a web browser application) displaying an electronic form 906 corresponding to the URL (uniform resource locator) in the address bar 904 with a plurality of fields 908. For example, in FIG. 9A, the electronic form 906 corresponds to a shipping form associated with a check-out process for a retail purchase.

While displaying the electronic form with the plurality of fields on the display, the device detects (1104), by the input device, a first autofill input (e.g., select an autofill profile affordance from a first menu) that corresponds to a first field of the plurality of fields in the electronic form. FIG. 8D, for example, shows the focus selector 802 at a location corresponding to the first autofill profile affordance 874a within the autofill menu 872 (e.g., the first autofill input). FIG. 8F, for example, shows the focus selector 802 at a location corresponding to the first third profile affordance 874c within the autofill menu 872 (e.g., the first autofill input). FIG. 9I, for example, shows a contact 974 detected at a location corresponding to the autofill affordance 968 within the third party contact menu 964 (e.g., the first autofill input).

In response to detecting the first autofill input, the device updates (1106) the electronic form to display, on the display, fields that have been populated based on a first user profile. As one example, FIG. 8E shows at least some of the fields 864 of the electronic form 862 populated with contact information associated with the custom data set from the "Me" contact 817 in FIG. 8A (e.g., the first profile) in response to selection of the first autofill profile affordance 874a (e.g., with a single or double click) in FIG. 8D. As another example, FIG. 8G shows at least some of the fields 864 of the electronic form 862 populated with contact information associated with the work data set from the "Me" contact 817 in FIG. 8A (e.g., the first profile) in response to selection of the first autofill profile affordance 874a (e.g., with a single or double click) in FIG. 8F. As yet another example, FIG. 9J shows at least some of the fields 908 of the electronic form 906 populated with the third party data set associated with the "Mom" contact 960d (e.g., a user profile for a third party) in response to selection of the "autofill" affordance 968 with the contact 974 in FIG. 9I.

In accordance with a determination that the first autofill input is associated with a first category of information in the first user profile, updating the electronic form includes populating (1108) at least two of the plurality of fields using information from the first user profile that corresponds to the first category of information. For example, the first category of information in the first user profile corresponds to a custom data set that includes the mobile phone number, the other email address, and the work address from the user profile. FIG. 8E, for example, shows at least some of the fields 864 of the electronic form 862 populated with contact information associated with the custom data set from the "Me" contact 817 in FIG. 8A (e.g., the first profile) in response to selection of the first autofill profile affordance 874a (e.g., with a single or double click) in FIG. 8D.

In accordance with a determination that the first autofill input is associated with a second category of information in the first user profile, updating the electronic form includes populating (1110) at least two of the plurality of fields using information from the first user profile that corresponds to the second category of information. For example, the second category of information in the first user profile corresponds to a work data set that includes the work phone number, the work email address, and the work address from the user profile. FIG. 8G, for example, shows at least some of the fields 864 of the electronic form 862 populated with contact information associated with the work data set from the "Me" contact 817 in FIG. 8A (e.g., the first profile) in response to selection of the first autofill profile affordance 874a (e.g., with a single or double click) in FIG. 8F. As such, as discussed in blocks 1108 and 1110, the user is provided with two or more autofill profile options for filling some of the fields of the electronic form, which saves the user time and effort. Thus, the user is provided with autofill options that are flexible enough to meet the situation presented by the current electronic form.

In some embodiments, the first and second categories of information include (1112) one or more pieces of conflicting information from the first user profile. For example, the custom and work data sets include different telephone numbers from the user profile such as the mobile phone number and work phone number respectively as shown by the descriptor 875a associated with the first autofill profile affordance 874a and the descriptor 875c associated with the third autofill profile affordance 874c in FIG. 8D.

In some embodiments, the first and second categories of information include one or more pieces of common information from the first user profile. For example, the custom and work data sets include the same address (e.g., the work address) as shown by the descriptor 875a associated with the first autofill profile affordance 874a and the descriptor 875c associated with the third autofill profile affordance 874c in FIG. 8D.

In some embodiments, the first and second categories of information correspond to one of a custom autofill data set that includes select information from the first user profile, a home autofill data set that includes residence related information from first user profile, or a work autofill data set that includes workplace related information from first user profile. As one example, in FIG. 8D, the autofill menu 872 includes: a first autofill profile affordance 874a associated with a custom data set for the user of the device 300, a second autofill profile affordance 874b associated with a home data set for the user of the device 300, and a third autofill profile affordance 874c associated with a work data set for the user of the device 300. As another example, in FIG. 9C, the autofill menu 928 includes: a first autofill profile affordance 930a associated with a custom data set for the user of the portable multifunction device 100, a second autofill profile affordance 930b associated with a home data set for the user of the portable multifunction device 100, and a third autofill profile affordance 930c associated with a work data set for the user of the portable multifunction device 100.

In some embodiments, the device detects (1114), by the input device, a second autofill input (e.g., hovering a focus selector over a field, inputting text into a field, selection of a field with a focus selector, etc.) that corresponds to the first field of the plurality of fields in the electronic form (e.g., a first type of field such as a name field), and, in response to detecting the second autofill input and in accordance with a determination that the second autofill input is associated with a first user profile, the device displays a first menu including a plurality of autofill profile affordances representing a corresponding plurality of categories of information (e.g., autofill data sets) associated with the first user profile. For example, the first menu includes (a first set of) autofill profile affordances for a custom autofill data set, a home autofill data set, and a work autofill data set, each of which is associated with a different subset of the information from the first user profile or contact card. In some embodiments, the first menu also includes a customization affordance provided to display a third menu provided to edit the custom autofill data set. In some embodiments, the first menu further includes (a second set of) two or more autofill profile affordances corresponding to autofill data sets for other user profiles (e.g., two most frequently contacted users or a link to a contact picker).

As one example, FIG. 8D shows an autofill menu 872 (e.g., the first menu) overlaid on the electronic form 862 in response to selection of the last name field 864c in FIG. 8C (e.g., the second autofill input). As shown in FIG. 8D, the autofill menu 872 includes: a first autofill profile affordance 874a associated with a custom data set for the user of the device 300, a second autofill profile affordance 874b associated with a home data set for the user of the device 300, a third autofill profile affordance 874c associated with a work data set for the user of the device 300, a customization affordance 874d provided to edit the custom data set, a fourth profile affordance 874e associated with a third party data set for a "Mom" contact, and a fifth profile affordance 874f associated with a third party data set for a "Spouse" contact.

As another example, FIG. 9C shows the autofill menu 928 (e.g., the first menu) overlaid on the electronic form 906 in response to selection of the "Autofill" affordance 918 with the contact 926 in FIG. 9B (e.g., the second autofill input). As shown in FIG. 9C, the autofill menu 928 includes: a first autofill profile affordance 930a associated with a custom data set for the user of the portable multifunction device 100, a second autofill profile affordance 930b associated with a home data set for the user of the portable multifunction device 100, a third autofill profile affordance 930c associated with a work data set for the user of the portable multifunction device 100, a customization affordance 930d provided to edit the custom data set, a third party contacts affordance 930e provided to select a third party data set, and a cancellation affordance 932 provided to cease display of the autofill menu 928.

In some embodiments, the second autofill input corresponds to (1116) selection of the first field, selection of an affordance in the first field, selection of an affordance adjacent to the first field, insertion of one or more characters into the first field (e.g., start typing), or selection of an affordance adjacent to a soft keyboard. As one example, FIG. 8D shows an autofill menu 872 overlaid on the electronic form 862 in response to selection of the last name field 864c in FIG. 8C (e.g., the first field). As another example, FIG. 8S shows the autofill menu 872 overlaid on the electronic form 862 in response to selection of the autofill affordance 866 in FIG. 8R (e.g., the affordance in the first field). As yet another example, FIG. 8U shows a plurality of third party candidate autofill profile affordances 896a, 896b, 896c, and 896d for populating at least some the fields 864 of the electronic form 862 in response to entry of the text string "Mo" in the first name field 864a. As yet another example, FIG. 9C shows the autofill menu 928 overlaid on the electronic form 906 in response to selection of the "Autofill" affordance 918 with the contact 926 in FIG. 9B (e.g., the affordance adjacent to the soft keyboard).

In some embodiments, the first autofill input corresponds to (1118) selection of one of the two or more autofill profile affordances displayed in the first menu. As one example, FIG. 8E shows at least some of the fields 864 of the electronic form 862 populated with the custom data set in response to selection of the first autofill profile affordance 874a within the autofill menu 872 in FIG. 8D. As another example, FIG. 8G shows at least some the fields 864 of the electronic form 862 populated with a work data set in response to selection of the third autofill profile affordance 874c within the autofill menu 872 in FIG. 8F.

In some embodiments, the first menu also includes (1120) a customization affordance provided to display a third menu in response to selection of the customization affordance, where the third menu enables editing of a custom autofill data set. In some embodiments, the third menu enables editing of telephone, email address, and physical address for the custom autofill data set. In some embodiments, the third menu includes an option to skip the inclusion of one or more of the aforementioned categories from the custom autofill data set. As such, for example, the user is able to customize an autofill data set on-the-fly without navigating away from the current electronic form, which saves the user time and effort.

FIG. 8I, for example, shows a customization menu 876 (e.g., the third menu) overlaid on the electronic form 862 in response to selection of the customization affordance 874d in FIG. 8H. As shown in FIG. 8I, the customization menu 876 includes: a first indication 878a of the telephone number associated with the custom data set (e.g., mobile telephone number +1.408.123.2355 from among the plurality of telephone numbers 824 in FIG. 8A), a second indication 878b of the email address associated with the custom data set (e.g., other email address appleseed@other.com from among the plurality of email address 826 in FIG. 8A), and a third indicator 878c of the address associated with the custom data set (e.g., the work address 834 in FIG. 8A). The customization menu 876 also includes: a first set of controls 879a for changing the telephone number associated with the custom data set, a second set of controls 879b for changing the email address associated with the custom data set, and a third set of controls 879c for changing the address associated with the custom data set.

As one example, FIGS. 8I-8K illustrate a sequence in which the custom data set via the customization menu 876. In this example, the telephone number associated with the custom data set is changed from the mobile telephone number (+1.408.123.2355) in FIG. 8I to the home telephone number (+1.408.123.2355) in FIG. 8K.

In some embodiments, a descriptor is displayed (1122) adjacent to one of the autofill affordances corresponding to the custom autofill data set, and in response to customizing the custom autofill data set within the third menu, adjusting the descriptor according to the customization applied to the custom autofill. In some embodiments, the descriptor is a text description of the telephone number type (e.g., home, work, mobile, or other), email address type (e.g., home, work, or other), and address type e.g., home, work, or other) associated with the data set. In some embodiments, the descriptor is only displayed along with the custom autofill data set. In some embodiments, descriptors are displayed along with each of the autofill data sets. For example, the user customizes the custom data set so that the descriptor for the custom autofill data set is changed from "Home phone, Other email, Work address" to "Skip phone, Other email, Work address" in response to removing the telephone from the custom autofill data set within the third menu.

In some embodiments, the descriptor is pruned to include information germane to the current electronic form. For example, if the custom data set is tailored to exclude date of birth, the descriptor will not indicate "Skip Birthday" if the current electronic form does not include a birthday field. Similarly, in another example, if the custom data set includes a work phone number, the descriptor will not indicate "Skip Work Phone" if the current electronic form does not include a telephone field.

As one example, in FIG. 8D, the first autofill profile affordance 874a includes a descriptor 875a (e.g., a text description) that indicates that the custom data set includes the mobile phone number, the other email address, and the work address. For example, the custom data set is updated to reflect the changes made by the user of the device 300 in 8I-8K. As such, in FIG. 8P, the customization menu 876 indicates that the custom data set includes the home phone number, the other email address, and the work address.

In some embodiments, the first menu also includes (1124) two or more autofill affordances corresponding to autofill data sets associated with other user profiles. (e.g., two most frequently contacted users or a link to a contact picker). As such, for example, the user is able to access autofill data for other users, which saves the user time and effort. Thus, the user is provided with autofill options that are flexible enough to meet the situation presented by the current electronic form (e.g., shipping a gift to user's Mother or Sister). As one example, in FIG. 8D, the autofill menu 872 includes a fourth autofill profile affordance 874e associated with a third party data set for a "Mom" contact and a fifth autofill profile affordance 874f associated with a third party data set for a "Spouse" contact. As another example, FIG. 9H shows a list of contacts 958 of the user of the portable multifunction device 100 in response to selection of the third party contacts affordance 930e with the contact 956 in FIG. 9G.

In some embodiments, in accordance with a determination that the second autofill input is associated with a plurality of candidate profiles, the device displays (1126) graphical representations of a plurality of autofill data sets associated with the plurality of candidate profiles for different users that match predefined autofill criteria. As such, for example, the user is able to access autofill data for other users, which saves the user time and effort. Thus, the user is provided with autofill options that are flexible enough to meet the situation presented by the current electronic form. For example, the plurality of candidate profiles for different users correspond to a set of specified favorite/VIP contacts, most frequent contacts, recent contacts, and/or contacts that match a portion of a text based input. In some embodiments, the graphical representations are displayed as the user starts typing another user's name. For example, as the user types "Jel" display autofill options for Jennifer, Jeremy, Jessie, etc. As one example, FIG. 8U shows a plurality of third party candidate autofill profile affordances 896a, 896b, 896c, and 896d for populating at least some the fields 864 of the electronic form 862 in response to entry of the text string "Mo" in the first name field 864a.

In some embodiments, in response to detecting the second autofill input, the device displays (1128) an intermediate pane prior to displaying the first menu that includes a graphical software keyboard, a prediction bar, and an autofill affordance provided to display the first menu. In some embodiments, the intermediate pane slides up from the bottom of the display and is overlaid on at least a portion of the electronic form. As one example, FIG. 9B shows an intermediate menu 916 overlaid on the electronic form 906 in response to selection of the first name field 908a with the contact 914 in FIG. 9A. As shown in FIG. 9B, the intermediate menu 916 includes: an "Autofill" affordance 918, which, when activated (e.g., with a contact), causes display of an autofill menu (e.g., the autofill menu 928 in FIG. 9C); a "Done" affordance 920, which, when activated (e.g., with a contact), causes the intermediate menu 916 to cease to be displayed; and a software keyboard 924.

In some embodiments, the prediction bar includes predictive text for filling the field. In some embodiments, when the soft keyboard is used for filling in text in other fields (e.g., a search field or a URL field, or an email/message text field), the prediction bar displays autocorrect suggestions or predicted words that are predicted based on characters that have been typed with the soft keyboard and/or words that precede a text insertion point. In some embodiments, the autofill affordances in the prediction bar include representations of different user profiles for different users that match partially typed text, but instead of simply filing in the user's name, a plurality of different fields are populated if the user selects one of the representations of user profiles in the prediction bar. In some embodiments, the prediction bar includes representations of a plurality of different autofill profiles for the user of the device (e.g., associated with custom, home, and work data sets) and selection of one of the representations of autofill profile causes at least some of the fields to be filled in with data from a corresponding data set rather than just filling in the field that is accepting input from the soft keyboard (e.g., the field that is currently "in focus").

In some embodiments, the prediction bar includes (1130) two or more autofill affordances corresponding to autofill data sets associated with the first user profile in accordance with a determination that the first field corresponds to a first field type, where the autofill profile sets are provided to fill at least two of the plurality of fields. As one example, the intermediate menu 916 in FIG. 9B also includes a plurality of autofill profile affordances 922a, 922b, and 922c, which, when activated (e.g., with a contact), cause at least some of the fields 908 of the electronic form 906 to be populated with a corresponding data set (e.g., a custom, home, and work data sets, respectively).

In some embodiments, the prediction bar includes (1132) two or more sets associated with a category of information from the first user profile that corresponds to the first field in accordance with a determination that the first field corresponds to a second field type, where the two or more sets are provided to fill the first field. As one example, the intermediate menu 980 in FIG. 9L also includes a plurality of field population affordances 982a, 982b, and 982c, which, when activated (e.g., with a contact), cause the email address field 908k to be populated with a corresponding email address (e.g., home, work, and other email addresses, respectively). Thus, for example, the plurality of different autofill profiles provided in the prediction bar saves the user time and effort.

In some embodiments, the device detects (1134) a third autofill input associated with a second field of the plurality of fields (e.g., a second first type of field such as an address or email field), and, in response to detecting the third autofill input and in accordance with a determination that the third autofill input is associated with the first user profile, the device displays a second menu with a set of options corresponding to a category of information in the first user profile (e.g., address, phone, or email options), where the set of options are provided to fill the second field. In one example, in accordance with a determination that the second field is classified as an address field (e.g., based on the method described above), the second menu includes address options from the first user profile or contact card.

As one example, FIG. 8P shows a field population menu 886 (e.g., the second menu) overlaid on the electronic form 862 in response to selection of the first shipping address field 864e in FIG. 8O (e.g., the third autofill input). As shown in FIG. 8P, the field population menu 886 includes: a first field population affordance 888a, which, when activated (e.g., with a single or double click), causes the first shipping address field 864e to be populated with an address portion of the custom data set (e.g., 123 Applework Circle); a second field population affordance 888b, which, when activated (e.g., with a single or double click), causes the first shipping address field 864e to be populated with a portion of the home address 832 (e.g., 123 Appleseed Lane) from the "Me" contact 817 in FIG. 8A; a third field population affordance 888c, which, when activated (e.g., with a single or double click), causes the first shipping address field 864e to be populated with a portion of the work address 834 (e.g., 123 Applework Circle) from the "Me" contact 817 in FIG. 8A; and a customization affordance 888d, which, when activated (e.g., with a single or double click), causes the customization menu 876 to be displayed (e.g., as shown in FIG. 8Q).

As another example, FIGS. 9K-9M show a sequence in which a field population menu 986 (e.g., the second menu)

is overlaid on the electronic form 906 in response to detecting the contact 978 at a location corresponding to the email address field 908k within the electronic form 906 (e.g., the third autofill input). As shown in FIG. 9M, the field population menu 986 includes: a first field population affordance 988a, which, when activated (e.g., with a contact), causes the email address field 908k to be populated with the home email address (e.g., appleseed@home.com); a second field population affordance 988b, which, when activated (e.g., with a contact), causes the email address field 908k to be populated with the work email address (e.g., appleseed@work.com); a third field population affordance 988c, which, when activated (e.g., with a contact), causes the email address field 908k to be populated with the other email address (e.g., appleseed@other.com); a customization affordance 988d, which, when activated (e.g., with a contact), causes display of a customization menu for editing the custom data set (e.g., the customization menu 938 in FIG. 9D); and a third party contacts affordance 988e provided to select a third party data set (e.g., display of the list of contacts 958 in FIG. 9H). The field population menu 986 also includes a cancellation affordance 990, which, when activated (e.g., with a contact), ceases display of the field population menu 986.

In some embodiments, the second menu also includes an autofill affordance corresponding to autofill data set (e.g., custom autofill data set) associated with the first user profile (e.g., the autofill profile affordance 888c within the field population menu 886). In one example, selection of the autofill affordance included in the second menu fills the plurality of fields. In another example, selection of the autofill affordance included in the second menu causes display of a third menu provided to edit the custom autofill data set.

In some embodiments, the first field corresponds to (1136) a first field type and the second field corresponds to a second field type. For example, display the first menu that includes representations of autofill profiles that correspond to multiple kinds of autofill data when a name field is focused, and display the second menu that includes a specific kind of autofill data when other types of fields are focused such as phone, email, or address.

In some embodiments, the device determines (1138) a classification for the first field based at least in part on at least one of a content-based heuristic, user-specific classification data, and crowd-sourced classification data, where the first field type corresponds to a first classification (e.g., name field) and the second field type corresponds to a second classification (e.g., email, telephone, or physical address field). The field classification scheme is described in more detail with reference to FIGS. 6 and 10A-10C.

It should be understood that the particular order in which the operations in FIGS. 11A-11D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600 and 1000) are also applicable in an analogous manner to method 1100 described above with respect to FIGS. 11A-11D. For example, the contacts, gestures, user interface objects, and focus selectors described above with reference to method 1100 optionally have one or more of the characteristics of the contacts, gestures, user interface objects, and focus selectors described herein with reference to other methods described herein (e.g., methods 600 and 1000). For brevity, these details are not repeated here.

Figure 12:
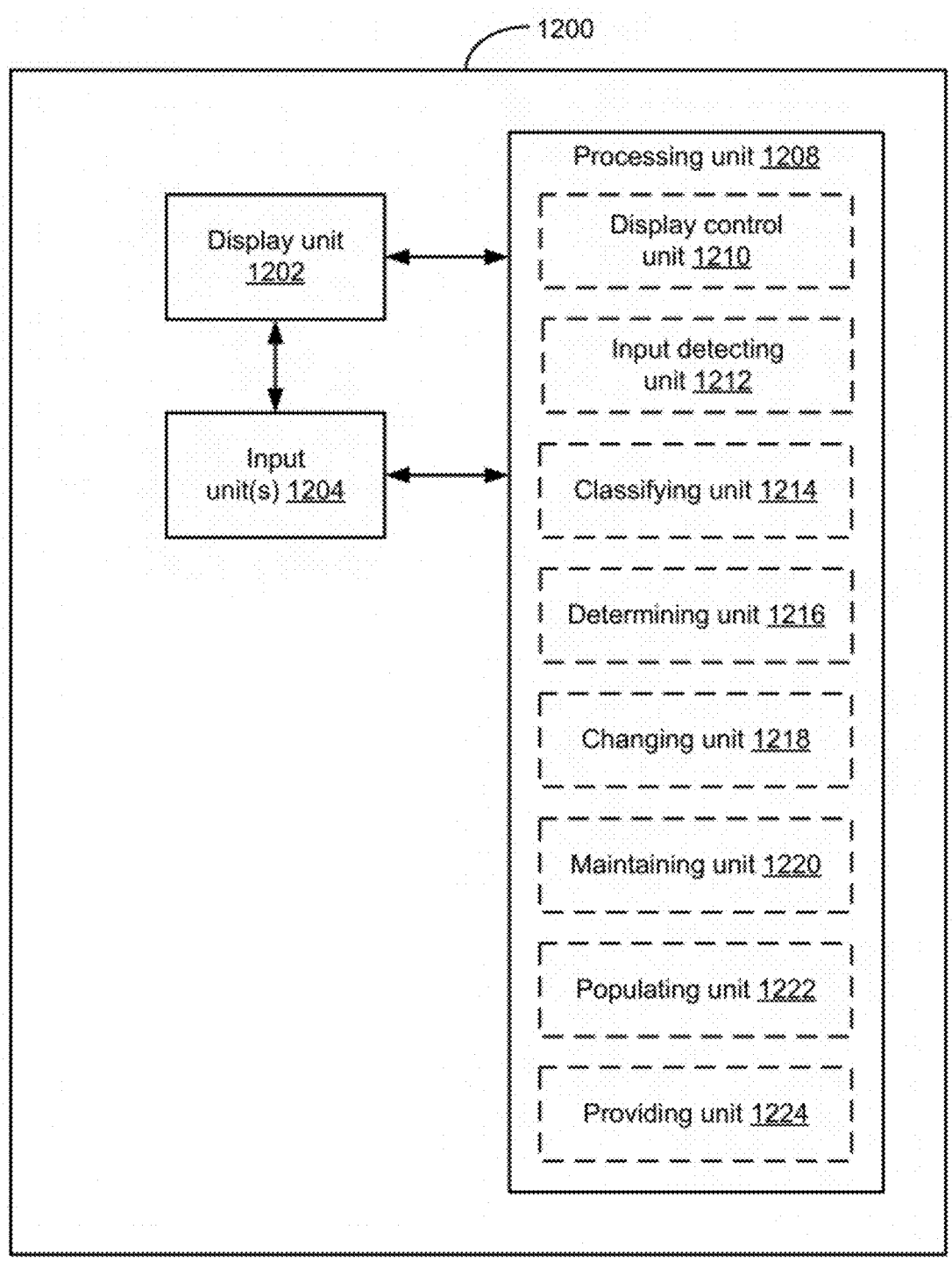
FIGS. 12-13 are functional block diagrams of an electronic device in accordance with some embodiments.

In accordance with some embodiments, FIG. 12 shows a functional block diagram of an electronic device 1200 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 12 are, optionally, combined or separated into sub-blocks to implement the principles of the various described embodiments. Therefore, the description herein optionally supports any possible combination or separation or further definition of the functional blocks described herein.

As shown in FIG. 12, an electronic device 1200 includes a display unit 1202 configured to display a user interface, one or more input units 1204 configured to receive user inputs, and a processing unit 1208 coupled to the display unit 1202 and the one or more input units 1204. In some embodiments, the processing unit 1208 includes: a displaying control unit 1208, an input detecting unit 1212, a classifying unit 1214, a determining unit 1216, a changing unit 1218, a maintaining unit 1220, a populating unit 1222, and a providing unit 1224.

The processing unit 1208 is configured to: enable display of (e.g., with the display control unit 1210) an electronic form on the display unit 1202 having a text input field populated with a first text string from a first user profile based on a classification of the text input field associated with an autofill process, where the classification classifies the text input field as accepting a first type of information, and selection of the first text string is based at least in part on the classification; receive (e.g., with the input detecting unit 1212) an input by the one of more input units 1204 that corresponds to a change to at least a portion of the first text string; in response to receiving the input, change (e.g., with the display control unit 1210) the first text string to a second text string; and in accordance with a determination (e.g., with the determining unit 1216) that the second text string is characterized by a second type of information that is different from the first type of information, change (e.g., with the changing unit 1218) the classification of the text input field.

In some embodiments, the processing unit 1208 is configured to maintain (e.g., with the maintaining unit 1220) the classification of the text input field in accordance with a determination (e.g., with the determining unit 1216) that the second text string is characterized by the first type of information.

In some embodiments, the processing unit 1208 is configured to populate (e.g., with the populating unit 1222) the text input field with the second type of information from the first user profile that corresponds to the changed classification to in response to a request to autofill the electronic form after changing the classification of the text input field.

In some embodiments, the processing unit 1208 is configured to: detect (e.g., with the input detecting unit 1212) a user input by the one or more input units 1204 updating the first user profile, where the update changes at least some of the user information associated with the first user profile; and enable redisplay of (e.g., with the display control unit 1210) the electronic form on the display unit 1202 and populate (e.g., with the populating unit 1222) the text input field with the second type of information from the updated first user profile that corresponds to the changed classification in response to a request to autofill the electronic form after changing the classification of the text input field and after the update to the first user profile.

In some embodiments, the processing unit 1208 is configured to populate (e.g., with the populating unit 1222) the text input field with the second type of information from a second user profile that corresponds to the changed classification in response to a request to autofill the electronic form after changing the classification of the text input field, where the first user profile is associated with a first person and the second user profile is associated with a second user.

In some embodiments, the autofill process includes: determining (e.g., with the classifying unit 1214) the classification for the text input field; and populating (e.g., with the populating unit 1222) the text input field with the first text string based on the classification of the text input field, where the first text string corresponds to the first type of information from the first user profile.

In some embodiments, determining the classification for the text input field includes generating (e.g., with the classifying unit 1214) an initial classification for the text input field based at least in part on a content-based heuristic.

In some embodiments, determining the classification for the text input field includes generating (e.g., with the classifying unit 1214) an initial classification for the text input field based at least in part on a first classification determined based on a previous user amendment of the text input field by a user of the electronic device 1200.

In some embodiments, determining the classification for the text input field includes generating (e.g., with the classifying unit 1214) an initial classification for the text input field based at least in part on a second classification determined based on aggregate amendments of the text input field by other users.

In some embodiments, the first and second classifications supersede a classification generated by the content-based heuristic, and the first classification supersedes the second classification.

In some embodiments, the processing unit 1208 is configured to provide (e.g., with the providing unit 1224) an indication of the changed classification for the text input field to a local database, where the autofill process fills the text input field based on the changed classification for subsequent autofill operations performed on the electronic form.

In some embodiments, the processing unit 1208 is configured to provide (e.g., with the providing unit 1224) an indication of the changed classification for the text input field to a remote server for use in an aggregate database.

In some embodiments, the processing unit 1208 is configured to provide (e.g., with the providing unit 1224) an indication of the changed classification for the text input field to a remote server for use in an aggregate database in accordance with a determination that a domain associated with the electronic form satisfies a popularity criterion.

In some embodiments, the indication of the changed classification for the text input field is anonymized.

In some embodiments, the processing unit 1208 is configured to obtain (e.g., with the classifying unit 1214) at least one aggregate amendment associated with a different classification for the text input field from the remote server, where the at least one crowd-sourced user amendment satisfies a frequency threshold.

Figure 13:
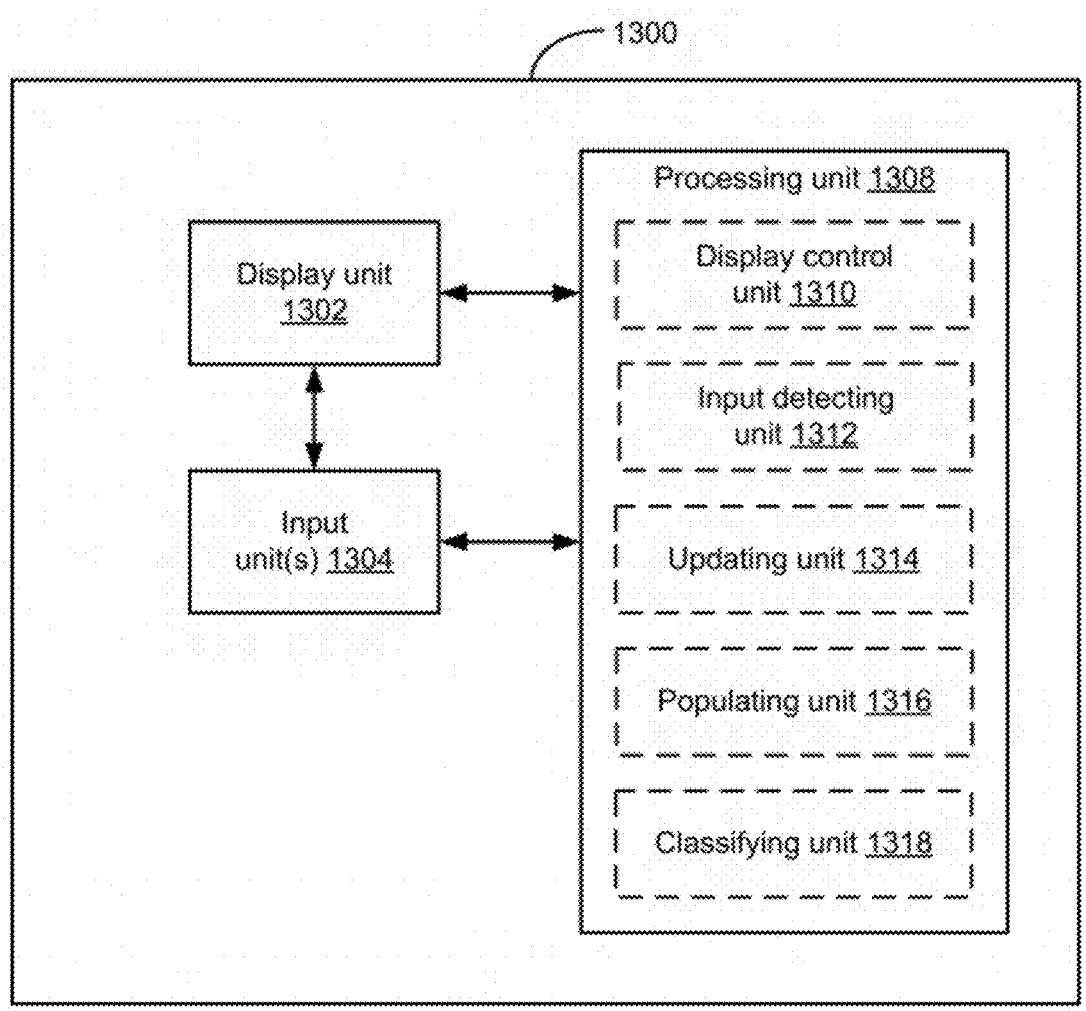

In accordance with some embodiments, FIG. 13 shows a functional block diagram of an electronic device 1300 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, an electronic device 1300 includes a display unit 1302 configured to display a user interface, one or more input units 1304 configured to receive user inputs, and a processing unit 1308 coupled to the display unit 1302 and the one or more input units 1304. In some embodiments, the processing unit 1308 includes: a displaying control unit 1308, an input detecting unit 1312, an updating unit 1314, a populating unit 1316, and a classifying unit 1318.

The processing unit 1308 is configured to: enable display of (e.g., with the display control unit 1310) an electronic form with a plurality of fields on the display unit 1302; while displaying the electronic form with the plurality of fields on the display unit 1302, detect (e.g., with the input detecting unit 1312) a first autofill input by the one or more input unit 1304 that corresponds to a first field of the plurality of fields in the electronic form; and in response to detecting the first autofill input, update (e.g., with the updating unit 1314) the electronic form to display fields that have been populated based on a first user profile on the display unit 1302, where: in accordance with a determination that the first autofill input is associated with a first category of information in the first user profile, updating the electronic form includes populating (e.g., with the populating unit 1316) at least two of the plurality of fields using information from the first user profile that corresponds to the first category of information, and in accordance with a determination that the first autofill input is associated with a second category of information in the first user profile, updating the electronic form includes populating (e.g., with the populating unit 1316) at least two of the plurality of fields using information from the first user profile that corresponds to the second category of information.

In some embodiments, the first and second categories of information include one or more pieces of conflicting information from the first user profile.

In some embodiments, the processing unit 1308 is configured to: detect (e.g., with the input detecting unit 1312) a second autofill input by the one or more input unit 1304 that corresponds to the first field of the plurality of fields in the electronic form; and in response to detecting the second autofill input and in accordance with a determination that the second autofill input is associated with a first user profile, enable display of (e.g., with the display control unit 1310) a first menu including a plurality of autofill profile affordances representing a corresponding plurality of categories of information associated with the first user profile.

In some embodiments, the second autofill input corresponds to selection of the first field, selection of an affordance in the first field, selection of an affordance adjacent to the first field, insertion of one or more characters into the first field, or selection of an affordance adjacent to a soft keyboard.

In some embodiments, the first autofill input corresponds to selection of one of the two or more autofill profile affordances displayed in the first menu.

In some embodiments, the first menu also includes a customization affordance provided to display a third menu in response to selection of the customization affordance, where the third menu enables editing of a custom autofill data set.

In some embodiments, a descriptor is displayed adjacent to one of the autofill affordances corresponding to the custom autofill data set, and in response to customizing the custom autofill data set within the third menu, the processing unit is configured to adjust (e.g., with the display control unit 1310) the descriptor according to the customization applied to the custom autofill.

In some embodiments, the first menu also includes two or more autofill affordances corresponding to autofill data sets associated with other user profiles.

In some embodiments, the processing unit 1308 is configured to enable display of (e.g., with the display control unit 1310) graphical representations of a plurality of autofill data sets associated with the plurality of candidate profiles for different users that match predefined autofill criteria in accordance with a determination that the second autofill input is associated with a plurality of candidate profiles.

In some embodiments, the processing unit 1308 is configured to enable display of (e.g., with the display control unit 1310) an intermediate pane prior to displaying the first menu that includes a graphical software keyboard, a prediction bar, and an autofill affordance provided to display the first menu in response to detecting the second autofill input.

In some embodiments, the prediction bar includes two or more autofill affordances corresponding to autofill data sets associated with the first user profile in accordance with a determination that the first field corresponds to a first field type, where the autofill profile sets are provided to fill at least two of the plurality of fields.

In some embodiments, the processing unit 1308 is configured to: detect (e.g., with the input detecting unit 1312) a third autofill input by the one or more input unit 1304 associated with a second field of the plurality of fields; and enable display of (e.g., with the display control unit 1310) a second menu with a set of options corresponding to a category of information in the first user profile in response to detecting the third autofill input and in accordance with a determination that the third autofill input is associated with the first user profile, where the set of options are provided to fill the second field.

In some embodiments, the first field corresponds to a first field type and the second field corresponds to a second field type.

In some embodiments, the processing unit 1308 is configured to determine (e.g., with the classifying unit 1318) a classification for the first field based at least in part on at least one of a content-based heuristic, user-specific classification data, or crowd-sourced classification data, where the first field type corresponds to a first and the second field type corresponds to a second classification.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6, 10A-C, and 11A-11D are, optionally, implemented by components depicted in FIGS. 1A-1B, FIG. 3, or 12-13. For example, receiving operation 1016, detecting operation 1104, and detecting operation 1114 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
   at a device with one or more processors, non-transitory memory, a display, and an input device:
   displaying, on the display, an electronic form with a plurality of fields;
   while displaying the electronic form with the plurality of fields on the display, detecting, by the input device, a first input that corresponds to displaying an autofill menu;
   in response to detecting the first input, displaying, on the display, the autofill menu overlaid on the electronic form that includes (i) a first affordance associated with a first category of information in a first user profile; (ii) a second affordance associated with a second category of information in the first user profile; and (iii) a third affordance associated with customizing information associated with the first user profile;
   while displaying the autofill menu overlaid on the electronic form, detecting, by the input device, a second input directed to the autofill menu; and
   in response to detecting the second input:
   in accordance with a determination that the second input is directed to the first affordance within the autofill menu overlaid on the electronic form, updating the electronic form by populating at least two of the plurality of fields using information from the first user profile that corresponds to the first category of information;
   in accordance with a determination that the second input is directed to the second affordance within the autofill menu overlaid on the electronic form, wherein the second category of information in the first user profile includes a combination of overlapping information and non-overlapping information with respect to the first category of information in the first user profile, updating the electronic form by populating at least two of the plurality of fields using information from the first user profile that corresponds to the second category of information; and in accordance with a determination that the second input is directed to the third affordance within the autofill menu overlaid on the electronic form, displaying, on the display, a customization menu overlaid on the electronic form, wherein the customization menu includes a plurality of affordances provided to edit information associated with the first user profile.

2. The method of claim 1, wherein the first and second categories of information include one or more pieces of conflicting information from the first user profile.

3. The method of claim 1, wherein the first input corresponds to selection of the first field, selection of an affordance in the first field, selection of an affordance adjacent to the first field, insertion of one or more characters into the first field, or selection of an affordance adjacent to a soft keyboard.

4. The method of claim 1, wherein the customization menu enables editing of a custom autofill data set.

5. The method of claim 4, wherein a descriptor is displayed adjacent to one of the autofill affordances corresponding to the custom autofill data set, and in response to customizing the custom autofill data set within the customization menu, adjusting the descriptor according to the customization applied to the custom autofill.

6. The method of claim 1, wherein the autofill menu also includes two or more autofill affordances corresponding to autofill data sets associated with other user profiles.

7. The method of claim 1, further comprising:
in response to detecting the first input, displaying an intermediate pane prior to displaying the autofill menu that includes a graphical software keyboard, a prediction bar, and an autofill affordance provided to display the first menu.

8. The method of claim 7, wherein the prediction bar includes two or more autofill affordances corresponding to autofill data sets associated with the first user profile in accordance with a determination that the first field corresponds to a first field type, wherein the autofill profile sets are provided to fill at least two of the plurality of fields.

9. The method of claim 8, wherein the prediction bar includes two or more sets associated with a category of information from the first user profile that corresponds to the first field in accordance with a determination that the first field corresponds to a second field type, wherein the two or more sets are provided to fill the first field.

10. The method of claim 1, further comprising:
detecting a third input, by the input device, directed to a second field of the plurality of fields; and
in response to detecting the third input and in accordance with a determination that the third input is associated with the first user profile, displaying a second menu with a set of options corresponding to a category of information in the first user profile, wherein the set of options are provided to fill the second field.

11. The method of claim 10, wherein the first field corresponds to a first field type and the second field corresponds to a second field type.

12. The method of claim 11, further comprising:
determining a classification for the first field based at least in part on at least one of a content-based heuristic, user-specific classification data, or crowd-sourced classification data, wherein the first field type corresponds to a first classification and the second field type corresponds to a second classification.

13. A non-transitory computer readable storage medium storing one or more programs, the one or more programs comprising instructions, which, when executed by an electronic device with a display, and an input device, cause the electronic device to:
display, on the display, an electronic form with a plurality of fields;
while displaying the electronic form with the plurality of fields on the display, detect, by the input device, a first input that corresponds to displaying an autofill menu;
in response to detecting the first input, display, on the display, the autofill menu overlaid on the electronic form that includes (i) a first affordance associated with a first category of information in a first user profile; (ii) a second affordance associated with a second category of information in the first user profile; and (iii) a third affordance associated with customizing information associated with the first user profile;
while displaying the autofill menu overlaid on the electronic form, detect, by the input device, a second input directed to the autofill menu; and
in response to detecting the second input:
in accordance with a determination that the second input is directed to the first affordance within the autofill menu overlaid on the electronic form, update the electronic form by populating at least two of the plurality of fields using information from the first user profile that corresponds to the first category of information;
in accordance with a determination that the second input is directed to the second affordance within the autofill menu overlaid on the electronic form, wherein the second category of information in the first user profile includes a combination of overlapping information and non-overlapping information with respect to the first category of information in the first user profile, update the electronic form by populating at least two of the plurality of fields using information from the first user profile that corresponds to the second category of information; and
in accordance with a determination that the second input is directed to the third affordance within the autofill menu overlaid on the electronic form, display, on the display, a customization menu overlaid on the electronic form, wherein the customization menu includes a plurality of affordances provided to edit information associated with the first user profile.

14. An electronic device comprising:
a display unit configured to display a user interface;
one or more input units configured to receive inputs; and
a processing unit coupled with the display unit and the one or more input units, the processing unit configured to:
enable display of, on the display unit, an electronic form with a plurality of fields;
while displaying the electronic form with the plurality of fields on the display, detect, by the one or more input devices, a first input that corresponds to displaying an autofill menu;
in response to detecting the first input, enable display of, on the display unit, the autofill menu overlaid on the electronic form that includes (i) a first affordance associated with a first category of information in a first user profile; (ii) a second affordance associated with a second category of information in the first user profile; and (iii) a third affordance associated with customizing information associated with the first user profile;

while displaying the autofill menu overlaid on the electronic form, detect, by the one or more input units, a second input directed to the autofill menu; and in response to detecting the second input:
in accordance with a determination that the second input is directed to the first affordance within the autofill menu overlaid on the electronic form, update the electronic form by populating at least two of the plurality of fields using information from the first user profile that corresponds to the first category of information;

in accordance with a determination that the second input is directed to the second affordance within the autofill menu overlaid on the electronic form, wherein the second category of information in the first user profile includes a combination of overlapping information and non-overlapping information with respect to the first category of information in the first user profile, update the electronic form by populating at least two of the plurality of fields using information from the first user profile that corresponds to the second category of information; and in accordance with a determination that the second input is directed to the third affordance within the autofill menu overlaid on the electronic form, enable display of, on the display unit, a customization menu overlaid on the electronic form, wherein the customization menu includes a plurality of affordances provided to edit information associated with the first user profile.

15. The electronic device of claim 14, wherein the first and second categories of information include one or more pieces of conflicting information from the first user profile.

16. The electronic device of claim 14, wherein the first input corresponds to selection of the first field, selection of an affordance in the first field, selection of an affordance adjacent to the first field, insertion of one or more characters into the first field, or selection of an affordance adjacent to a soft keyboard.

17. The electronic device of claim 14, wherein the customization menu enables editing of a custom autofill data set.

18. The electronic device of claim 17, wherein a descriptor is displayed adjacent to one of the autofill affordances corresponding to the custom autofill data set, and in response to customizing the custom autofill data set within the customization menu, adjusting the descriptor according to the customization applied to the custom autofill.

19. The electronic device of claim 14, wherein the autofill menu also includes two or more autofill affordances corresponding to autofill data sets associated with other user profiles.

20. The electronic device of claim 19, wherein the processing unit is further configured to:

enable display of, on the display unit, graphical representations associated with the other user profiles.

21. The electronic device of claim 14, wherein the processing unit is further configured to:
in response to detecting the first input, enable display of, on the display unit, an intermediate pane prior to displaying the autofill menu that includes a graphical software keyboard, a prediction bar, and an autofill affordance provided to display the first menu.

22. The electronic device of claim 21, wherein the prediction bar includes two or more autofill affordances corresponding to autofill data sets associated with the first user profile in accordance with a determination that the first field corresponds to a first field type, wherein the autofill profile sets are provided to fill at least two of the plurality of fields.

23. The electronic device of claim 21, wherein the prediction bar includes two or more sets associated with a category of information from the first user profile that corresponds to the first field in accordance with a determination that the first field corresponds to a second field type, wherein the two or more sets are provided to fill the first field.

24. The electronic device of claim 14, wherein the processing unit is further configured to:
detect a third input, by the one or more input devices, directed to a second field of the plurality of fields; and
in response to detecting the third input and in accordance with a determination that the third input is associated with the first user profile, enable display of, on the display unit, a second menu with a set of options corresponding to a category of information in the first user profile, wherein the set of options are provided to fill the second field.

25. The electronic device of claim 24, wherein the first field corresponds to a first field type and the second field corresponds to a second field type.

26. The non-transitory computer readable storage medium of claim 13, wherein the first and second categories of information include one or more pieces of conflicting information from the first user profile.

27. The non-transitory computer readable storage medium of claim 13, wherein the first input corresponds to selection of the first field, selection of an affordance in the first field, selection of an affordance adjacent to the first field, insertion of one or more characters into the first field, or selection of an affordance adjacent to a soft keyboard.

28. The non-transitory computer readable storage medium of claim 13, wherein the customization menu enables editing of a custom autofill data set.

29. The non-transitory computer readable storage medium of claim 13, wherein the autofill menu also includes two or more autofill affordances corresponding to autofill data sets associated with other user profiles.

30. The method of claim 1, wherein, in response to detecting the first input, the electronic form and the autofill menu are concurrently displayed on the display, and wherein the autofill menu at least partially overlaps a portion of the electronic form.

* * * * *